(12) United States Patent
Nakamura et al.

(10) Patent No.: US 9,674,549 B2
(45) Date of Patent: Jun. 6, 2017

(54) MOVING PICTURE CODING DEVICE, MOVING PICTURE CODING METHOD, MOVING PICTURE CODING PROGRAM, TRANSMITTING DEVICE, TRANSMISSION METHOD AND TRANSMISSION PROGRAM, AND MOVING PICTURE DECODING DEVICE, MOVING PICTURE DECODING METHOD, MOVING PICTURE DECODING PROGRAM, RECEIVING DEVICE, RECEPTION METHOD AND RECEPTION PROGRAM

(71) Applicant: JVC KENWOOD Corporation, Yokohama-shi (JP)

(72) Inventors: Hiroya Nakamura, Yokosuka (JP); Shigeru Fukushima, Yokosuka (JP); Hideki Takehara, Yokosuka (JP)

(73) Assignee: JCV KENWOOD Corporation, Yokohama-shi (JP)

( * ) Notice: Subject to any disclaimer, the term of this patent is extended or adjusted under 35 U.S.C. 154(b) by 381 days.

(21) Appl. No.: 14/226,268

(22) Filed: Mar. 26, 2014

(65) Prior Publication Data

US 2014/0205014 A1 Jul. 24, 2014

Related U.S. Application Data

(63) Continuation of application No. PCT/JP2012/006225, filed on Sep. 28, 2012.

(30) Foreign Application Priority Data

Sep. 28, 2011 (JP) .................................. 2011-212014
Sep. 28, 2011 (JP) .................................. 2011-212015

(Continued)

(51) Int. Cl.
*H04N 7/12* (2006.01)
*H04N 19/577* (2014.01)
(Continued)

(52) U.S. Cl.
CPC ......... *H04N 19/577* (2014.11); *H04N 19/105* (2014.11); *H04N 19/119* (2014.11); *H04N 19/52* (2014.11); *H04N 19/521* (2014.11)

(58) Field of Classification Search
None
See application file for complete search history.

(56) References Cited

U.S. PATENT DOCUMENTS

2014/0140408 A1* 5/2014 Lee .................. H04N 19/00587
375/240.16
2015/0181220 A1* 6/2015 Sugio ................... H04N 19/521
375/240.16

FOREIGN PATENT DOCUMENTS

JP 2011-147172 A 7/2011

OTHER PUBLICATIONS

Chen et al. ("MVP index parsing with fixed number of candidates", Document: JCTVC-F402, Joint Collaborative Team on Video Coding (JCTVC) of ITU-T SG16 WP3 and ISO/IEC JTC1/SC29/WG11, 6th Meeting: Torino, IT, Jul. 14-22, 2011).*

(Continued)

*Primary Examiner* — Dakshesh Parikh
(74) *Attorney, Agent, or Firm* — Venable LLP; Michael A. Sartori; Ilya A. Svetlov

(57) ABSTRACT

A motion vector predictor candidate constructing unit performs prediction based on a motion vector of one of coded blocks neighboring a coding target block in the same picture as the coding target block, constructs a plurality of motion vector predictor candidates, and adds the motion vector predictor candidates to a motion vector predictor candidate (Continued)

list. A motion vector predictor candidate number limiting unit limits the number of motion vector predictor candidates added to the motion vector predictor candidate list to a maximum candidate number according to a size of a prediction block. A motion vector predictor selecting unit selects a motion vector predictor from the motion vector predictor candidate list. A coding unit codes information representing an index of the selected motion vector predictor in the motion vector predictor candidate list.

5 Claims, 36 Drawing Sheets

(30) Foreign Application Priority Data

Sep. 27, 2012 (JP) ................................. 2012-214684
Sep. 27, 2012 (JP) ................................. 2012-214685

(51) Int. Cl.
| | |
|---|---|
| *H04N 19/105* | (2014.01) |
| *H04N 19/52* | (2014.01) |
| *H04N 19/119* | (2014.01) |
| *H04N 19/513* | (2014.01) |

(56) References Cited

OTHER PUBLICATIONS

Notification of Reasons for Refusal in Korean Patent Application No. 10-2014-7011156, dated Jul. 23, 2015.
J. Chen et al., "MVP index parsing with fixed number of candidates," Joint Collaborative Team on Video Coding (JCT-VC) of ITU-T SG16 WP3 and ISO/IEC JTC1/SC29/WG11, JCTVC-F402_r1, 6th Meeting: Torino, IT, Jul. 2011, pp. 1-17.
Y. Itani et al., "Improvement to AMVP/Merge process," Joint Collaborative Team on Video Coding (JCT-VC) of ITU-T SG16 WP3 and ISO/IEC JTC1/SC29/WG11, JCTVC-E064_r1, 5th Meeting: Geneva, CH, Mar. 2011, pp. 1-8.
T. Sugio et al., "Parsing Robustness for Merge/AMVP," Joint Collaborative Team on Video Coding (JCT-VC) of ITU-T SG16 WP3 and ISO/IEC JTC1/SC29/WG11, JCTVC-F470_r4, 6th Meeting: Torino, IT, Jul. 2011, pp. 1-15.
T. Sugio et al., "On MVP candidate list for AMVP/Merge," Joint Collaborative Team on Video Coding (JCT-VC) of ITU-T SG16 WP3 and ISO/IEC JTC1/SC29/WG11, JCTVC-I0134, 9th Meeting: Geneva, CH, May 2012, pp. 1-6.
International Search Report in PCT International Application No. PCT/JP2012/006225, dated Dec. 18, 2012.
International Preliminary Report on Patentability and Written Opinion in PCT International Application No. PCT/JP2012/006225, dated Apr. 1, 2014.
Notification of Reasons for Refusal in Japanese Patent Application No. 2012-214685, dated Nov. 5, 2013.

* cited by examiner

FIG.11

```
PREDICTION BLOCK
if (PredMode == MODE_INTER) {
    merge_flag [ x0 ][ y0 ]
    if( merge_flag[ x0 ][ y0 ] ) {
        merge_idx [ x0 ][ y0 ]
    } else {
        if( slice_type == B )
            inter_pred_flag[ x0 ][ y0 ]
        if( inter_pred_flag[ x0 ][ y0 ] == Pred_L0 || inter_pred_flag[ x0 ][ y0 ] == Pred_BI ) {
            if( num_ref_idx_l0_active_minus1 > 0 )
                ref_idx_l0[ x0 ][ y0 ]
            mvd_l0[ x0 ][ y0 ][ 0 ]
            mvd_l0[ x0 ][ y0 ][ 1 ]
            if ( NumMvpCand(L0) > 1))
                mvp_idx_l0[ x0 ][ y0 ]
        }
        if( inter_pred_flag[ x0 ][ y0 ] == Pred_L1 || inter_pred_flag[ x0 ][ y0 ] == Pred_BI ) {
            if( num_ref_idx_l1_active_minus1 > 0 )
                ref_idx_l1[ x0 ][ y0 ]
            mvd_l1[ x0 ][ y0 ][ 0 ]
            mvd_l1[ x0 ][ y0 ][ 1 ]
            if ( NumMvpCand(L1) > 1))
                mvp_idx_l1[ x0 ][ y0 ]
        }
        ...
    }
}
```

FIG.12

|  |  | MOTION VECTOR PREDICTOR CANDIDATE NUMBER | | |
|---|---|---|---|---|
|  |  | 1 | 2 | 3 |
| MVP INDEX mvpIdxLX | 0 | NO CODING | 0 | 0 |
| | 1 | – | 1 | 10 |
| | 2 | – | – | 11 |

MOVING PICTURE CODING DEVICE, MOVING PICTURE CODING METHOD, MOVING PICTURE CODING PROGRAM, TRANSMITTING DEVICE, TRANSMISSION METHOD AND TRANSMISSION PROGRAM, AND MOVING PICTURE DECODING DEVICE, MOVING PICTURE DECODING METHOD, MOVING PICTURE DECODING PROGRAM, RECEIVING DEVICE, RECEPTION METHOD AND RECEPTION PROGRAM

BACKGROUND OF THE INVENTION

1. Field of the Invention

The present invention relates to moving picture coding and decoding techniques, and more particularly, to moving picture coding and decoding techniques using motion compensation prediction.

2. Description of the Related Art

As a representative compression coding scheme of a moving picture, there is an MPEG-4 AVC/H.264 standard. In MPEG-4 AVC/H.264, motion compensation of partitioning a picture into a plurality of rectangular blocks and predicting a motion from a reference picture using an already coded or decoded picture as a reference picture is used. A technique of predicting a motion by motion compensation is referred to as inter prediction. In the inter prediction of MPEG-4 AVC/H.264, a plurality of pictures can be used as a reference picture, and an optimal reference picture is selected for each block from among the plurality of reference pictures, and then the motion compensation is performed. To this end, a reference index is allocated to each reference picture, and the reference picture is specified by the reference index. In a B picture, a maximum of two reference pictures are selected from coded or decoded reference pictures and used for the inter prediction. Prediction using the two reference pictures is classified into L0 prediction (list 0 prediction) mainly used as forward prediction and L1 prediction (list 1 prediction) mainly used as backward prediction.

Further, bi-prediction simultaneously using two inter predictions, that is, the L0 prediction and the L1 prediction is defined as well. In the bi-prediction, a final inter prediction picture signal is constructed by performing predictions of both directions, multiplying signals that have been subjected to the inter predictions of the L0 prediction and the L1 prediction by a weighting coefficient, adding an offset value, and causing the resultant signals to be superimposed on each other. For the weighting coefficient and the offset value used in the weighting prediction, a representative value is set and coded in units of pictures for each reference picture of each list. Examples of coding information related to the inter prediction include a prediction mode representing the L0 prediction, the L1 prediction, or the bi-prediction for each block, a reference index specifying a reference picture for each reference list of each block, and a motion vector representing a moving direction and a moving amount of a block, and this coding information is coded or decoded.

In a moving picture coding scheme in which motion compensation is performed, in order to reduce a coding amount of a motion vector constructed in each block, a prediction process is performed on a motion vector. In MPEG-4 AVC/H.264, a motion vector predictor is derived by performing prediction based on a neighboring block using the fact that a motion vector of a coding target has a strong correlation with a motion vector of a neighboring block, a motion vector difference that is a difference between the motion vector of the coding target and the motion vector predictor is derived, and the motion vector difference is coded, whereby a coding amount is reduced.

Specifically, as illustrated in FIG. 36A, a median value is derived based on motion vectors of neighboring blocks A, B, and C and set as a motion vector predictor, a coding amount of a motion vector is reduced by obtaining a difference between the motion vector and the motion vector predictor. Here, when the coding target block is different in size and shape from the neighboring block as illustrated in FIG. 36B, an uppermost block is decided as a prediction block when a plurality of neighboring blocks are on the left side, and a leftmost block is decided as a prediction block when a plurality of neighboring blocks are above the coding target block, and prediction is performed based on the motion vector of the decided prediction block.

Patent Literature 1: JP 2011-147172 A

However, in the method of the related art, since only one vector predictor is obtained, there are cases in which, depending on a picture, a prediction accuracy of a motion vector predictor is low, and the coding efficiency is not improved.

In this regard, the present inventors have recognized that it is necessary to further compress the coding information and reduce the entire coding amount in the moving picture coding scheme using the motion compensation prediction.

SUMMARY OF THE INVENTION

The present invention was made in light of the foregoing, and it is an object of the present invention to provide a moving picture coding technique capable of reducing a coding amount of a motion vector difference by deriving a motion vector predictor candidate and thus improving the coding efficiency. It is another object of the present invention to provide a moving picture coding technique capable of reducing a coding amount of coding information by deriving a coding information candidate and thus improving the coding efficiency.

In order to solve the above object, a moving picture coding device according to an aspect of the present invention is a moving picture coding device that codes a moving picture using a motion vector in units of blocks obtained by partitioning each picture, and includes a motion vector predictor candidate constructing unit (121) that derives a plurality of motion vector predictor candidates from a motion vector of one of coded blocks neighboring a coding target block in a same picture as the coding target block and a motion vector of one of blocks of a coded picture different from the coding target block, a motion vector predictor candidate adding unit (122) that adds a motion vector predictor candidate satisfying a certain condition among the plurality of motion vector predictor candidates to a motion vector predictor candidate list, a motion vector predictor candidate limiting unit (124) that repeatedly adds a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), a motion vector predictor selecting unit (126) that decides a motion vector predictor of the coding target block based on the motion vector predictor candidate list, and a coding unit (109) that codes information representing a position of the decided motion vector predictor in the motion vector predictor candidate list.

Another aspect of the present invention is a moving picture coding device. The device is a moving picture coding device that codes a moving picture using a motion vector in units of blocks obtained by partitioning each picture, and includes a motion vector predictor candidate constructing unit (121 and 122) that performs prediction based on a motion vector of one of coded blocks neighboring a coding target block in a same picture as the coding target block to construct a plurality of motion vector predictor candidates, and adds the plurality of motion vector predictor candidates to a motion vector predictor candidate list, a motion vector predictor candidate number limiting unit (124) that limits the number of the motion vector predictor candidates added to the motion vector predictor candidate list to a maximum candidate number according to a size of a prediction block, a motion vector predictor selecting unit (126) that decides a motion vector predictor of the coding target block based on the motion vector predictor candidate list, and a coding unit (109) that codes information representing a position of the decided motion vector predictor in the motion vector predictor candidate list.

Another aspect of the present invention is a moving picture coding method. The method is a moving picture coding method of coding a moving picture using a motion vector in units of blocks obtained by partitioning each picture, and includes a motion vector predictor candidate constructing step of deriving a plurality of motion vector predictor candidates from a motion vector of one of coded blocks neighboring a coding target block in a same picture as the coding target block and a motion vector of one of blocks of a coded picture different from the coding target block, a motion vector predictor candidate adding step of adding a motion vector predictor candidate satisfying a certain condition among the plurality of motion vector predictor candidates to a motion vector predictor candidate list, a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), a motion vector predictor selecting step of deciding a motion vector predictor of the coding target block based on the motion vector predictor candidate list, and a coding step of coding information representing a position of the decided motion vector predictor in the motion vector predictor candidate list.

Another aspect of the present invention is a transmitting device. The device includes a packet processing unit that packetizes a bitstream coded by a moving picture coding method of coding a moving picture using a motion vector in units of blocks obtained by partitioning each picture and obtains coding data and a transmitting unit that transmits the packetized coding data. The moving picture coding method includes a motion vector predictor candidate constructing step of deriving a plurality of motion vector predictor candidates from a motion vector of one of coded blocks neighboring a coding target block in a same picture as the coding target block and a motion vector of one of blocks of a coded picture different from the coding target block, a motion vector predictor candidate adding step of adding a motion vector predictor candidate satisfying a certain condition among the plurality of motion vector predictor candidates to a motion vector predictor candidate list, a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), a motion vector predictor selecting step of deciding a motion vector predictor of the coding target block based on the motion vector predictor candidate list, and a coding step of coding information representing a position of the decided motion vector predictor in the motion vector predictor candidate list.

Another aspect of the present invention is a transmission method. The method includes a packet processing step of packetizing a bitstream coded by a moving picture coding method of coding a moving picture using a motion vector in units of blocks obtained by partitioning each picture and obtaining coding data and a transmitting step of transmitting the packetized coding data. The moving picture coding method includes a motion vector predictor candidate constructing step of deriving a plurality of motion vector predictor candidates from a motion vector of one of coded blocks neighboring a coding target block in a same picture as the coding target block and a motion vector of one of blocks of a coded picture different from the coding target block, a motion vector predictor candidate adding step of adding a motion vector predictor candidate satisfying a certain condition among the plurality of motion vector predictor candidates to a motion vector predictor candidate list, a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), a motion vector predictor selecting step of deciding a motion vector predictor of the coding target block based on the motion vector predictor candidate list, and a coding step of coding information representing a position of the decided motion vector predictor in the motion vector predictor candidate list.

A moving picture decoding device according to an aspect of the present invention is a moving picture decoding device that decodes a bitstream obtained by coding a moving picture using a motion vector in units of blocks obtained by partitioning each picture, and includes a decoding unit (202) that decodes information representing a position of a motion vector predictor to be selected in a motion vector predictor candidate list, a motion vector predictor candidate constructing unit (221) that derives a plurality of motion vector predictor candidates from a motion vector of one of decoded blocks neighboring a decoding target block in a same picture as the decoding target block and a motion vector of one of blocks in a decoded picture different from the decoding target block, a motion vector predictor candidate adding unit (222) that adds a motion vector predictor candidate satisfying a certain condition among the plurality of motion vector predictor candidates to a motion vector predictor candidate list, a motion vector predictor candidate limiting unit (224) that repeatedly adds a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), and a motion vector predictor selecting unit (225) that selects a motion vector predictor of the decoding target block from the motion vector predictor candidate list based on the decoded information representing the position of the motion vector predictor to be selected.

Another aspect of the present invention is a moving picture decoding device. The device is a moving picture decoding device that decodes a bitstream obtained by coding a moving picture using a motion vector in units of blocks obtained by partitioning each picture, and includes a decoding unit (202) that decodes information representing a position of a motion vector predictor to be selected in a motion vector predictor candidate list, a motion vector predictor candidate constructing unit (221 and 222) that performs prediction based on a motion vector of one of decoded blocks neighboring a decoding target block in a same picture as the decoding target block to construct a plurality of motion vector predictor candidates, and adds the plurality of motion vector predictor candidates to a motion vector predictor candidate list, a motion vector predictor candidate number limiting unit (224) that limits the number of the motion vector predictor candidates added to the motion vector predictor candidate list to a maximum candidate number according to a size of a prediction block, and a motion vector predictor selecting unit (225) that selects a motion vector predictor of the decoding target block from the motion vector predictor candidate list based on the decoded information representing the position of the motion vector predictor to be selected in the motion vector predictor candidate list.

Another aspect of the present invention is a moving picture decoding method. The method is a moving picture decoding method of decoding a bitstream obtained by coding a moving picture using a motion vector in units of blocks obtained by partitioning each picture, and includes a decoding step of decoding information representing a position of a motion vector predictor to be selected in a motion vector predictor candidate list, a motion vector predictor candidate constructing step of deriving a plurality of motion vector predictor candidates from a motion vector of one of decoded blocks neighboring a decoding target block in a same picture as the decoding target block and a motion vector of one of blocks in a decoded picture different from the decoding target block, a motion vector predictor candidate adding step of adding a motion vector predictor candidate satisfying a certain condition among the plurality of motion vector predictor candidates to a motion vector predictor candidate list, a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), and a motion vector predictor selecting step of selecting a motion vector predictor of the decoding target block from the motion vector predictor candidate list based on the decoded information representing the position of the motion vector predictor to be selected.

Another aspect of the present invention is a receiving device. The device is a receiving device that receives and decodes a bitstream obtained by coding a moving picture, and includes a receiving unit that receives coding data obtained by packetizing a bitstream obtained by coding a moving picture using a motion vector in units of blocks obtained by partitioning each picture, a reconstructing unit that performs packet processing on the received coding data and reconstructs an original bitstream, a decoding unit (202) that decodes information representing a position of a motion vector predictor to be selected in a motion vector predictor candidate list from the reconstructed bitstream, a motion vector predictor candidate constructing unit (221) that derives a plurality of motion vector predictor candidates from a motion vector of one of decoded blocks neighboring a decoding target block in a same picture as the decoding target block and a motion vector of one of blocks in a decoded picture different from the decoding target block, a motion vector predictor candidate adding unit (222) that adds a motion vector predictor candidate satisfying a certain condition among the plurality of motion vector predictor candidates to a motion vector predictor candidate list, a motion vector predictor candidate limiting unit (224) that repeatedly adds a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), and a motion vector predictor selecting unit (225) that selects a motion vector predictor of the decoding target block from the motion vector predictor candidate list based on the decoded information representing the position of the motion vector predictor to be selected.

Another aspect of the present invention is a reception method. The method is a reception method of receiving and decoding a bitstream obtained by coding a moving picture, and includes a receiving step of receiving coding data obtained by packetizing a bitstream obtained by coding a moving picture using a motion vector in units of blocks obtained by partitioning each picture, a reconstructing step of performing packet processing on the received coding data and reconstructing an original bitstream, a decoding step of decoding information representing a position of a motion vector predictor to be selected in a motion vector predictor candidate list from the reconstructed bitstream, a motion vector predictor candidate constructing step of deriving a plurality of motion vector predictor candidates from a motion vector of one of decoded blocks neighboring a decoding target block in a same picture as the decoding target block and a motion vector of one of blocks in a decoded picture different from the decoding target block, a motion vector predictor candidate adding step of adding a motion vector predictor candidate satisfying a certain condition among the plurality of motion vector predictor candidates to a motion vector predictor candidate list, a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), and a motion vector predictor selecting step of selecting a motion vector predictor of the decoding target block from the motion vector predictor candidate list based on the decoded information representing the position of the motion vector predictor to be selected.

Further, an embodiment obtained by exchanging an arbitrary combination of the above components and an expression of the present invention among a method, a device, a system, a recording medium, a computer program, and the like is also effective as an aspect of the present invention.

BRIEF DESCRIPTION OF THE DRAWINGS

FIG. 11 is a diagram for describing a syntax of a bitstream at a prediction block level related to a motion vector prediction method;

FIG. 12 is a diagram for describing an example of entropy coding of a syntax element of a motion vector predictor index;

DETAILED DESCRIPTION OF THE INVENTION

The invention will now be described by reference to the preferred embodiments. This does not intend to limit the scope of the present invention, but to exemplify the invention.

The present embodiment relates to moving picture coding, and particularly, in moving picture coding in which a picture is partitioned into rectangular blocks having an arbitrary size and shape, and motion compensation is performed in units of blocks between pictures, in order to improve the coding efficiency, the coding amount is reduced by deriving a plurality of motion vector predictors from motion vectors of coded neighboring blocks, deriving a vector difference between a motion vector of a coding target block and a selected motion vector predictor, and coding the vector difference. Alternatively, the coding amount is reduced by estimating the coding information of the coding target block using the coding information of the coded neighboring block. Further, when a moving picture is decoded, a plurality of motion vector predictors are derived from motion vectors of decoded neighboring blocks, a motion vector of a decoding target block is derived based on a vector difference decoded from a bitstream and a selected motion vector predictor, and the motion vector is decoded. Alternatively, the coding information of the decoding target block is estimated using the coding information of the decoded neighboring block.

First, a technique and the terminology used in the present embodiment are defined.

(Tree Block and Coding Block)

Figure 3:
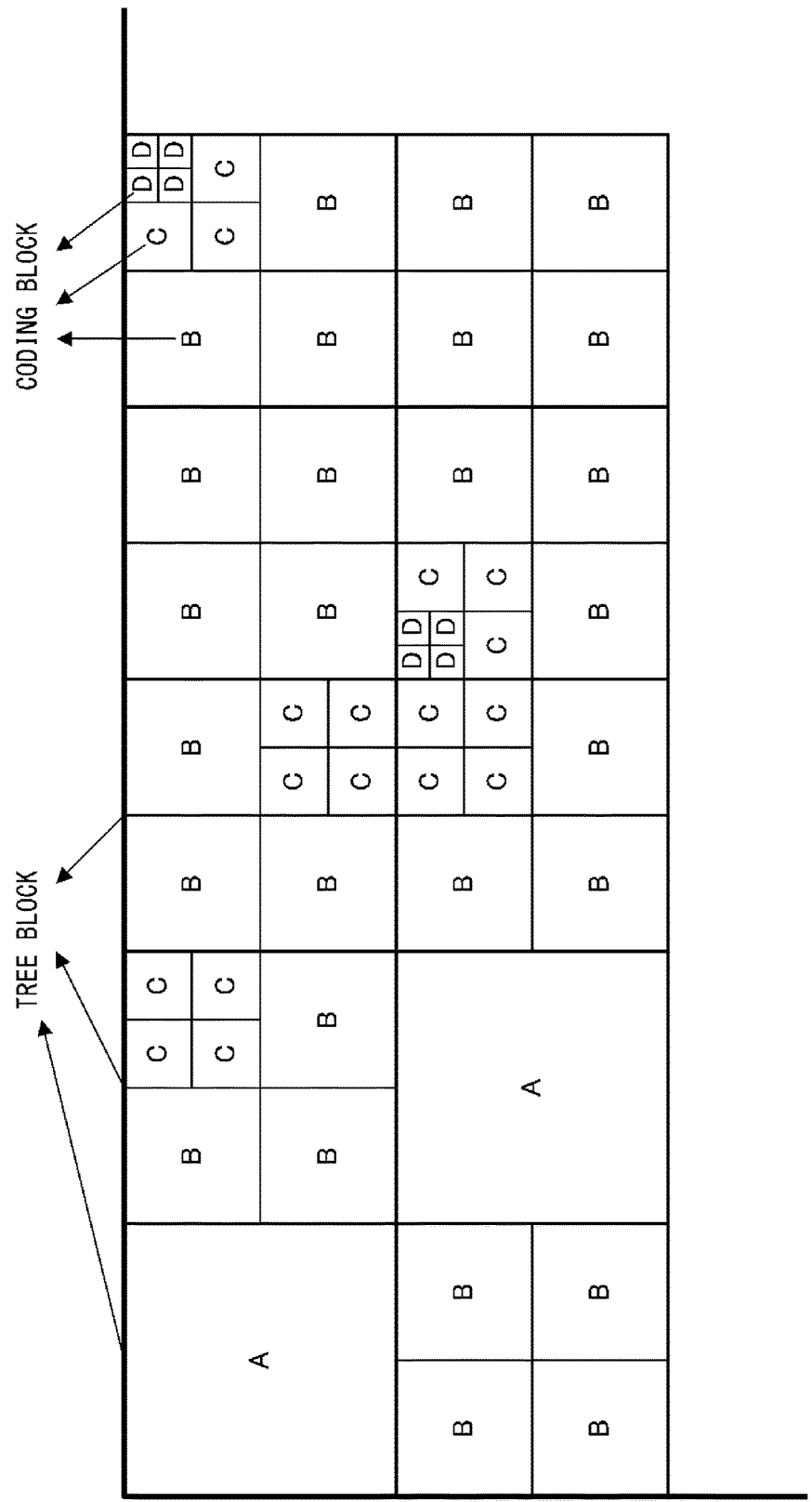
FIG. 3 is a diagram for describing a tree block and a coding block.

In an embodiment, a picture is equally partitioned in units of squares having the same arbitrary size as illustrated in FIG. 3. This unit is defined as a tree block, and used as a basic unit of address management for specifying a coding or decoding target block (a coding target block in a coding process, and a decoding target block in a decoding process, and this meaning is hereinafter used unless otherwise set forth herein) in a picture. Except a monochrome, the tree block is configured with one brightness signal and two color difference signals. The size of the tree block can be freely set as a power of 2 according to the picture size or the texture of the picture. The tree block can be partitioned into blocks having a small block size by hierarchically partitioning the brightness signal and the color difference signals in the tree block into four (partitioning the signals in half vertically and horizontally, respectively) as necessary according to the texture of the picture so that the coding process can be optimized. This block is defined as a coding block, and used as a basic unit for the coding and decoding processes. Except a monochrome, the coding block is configured with one brightness signal and two color difference signals. The maximum size of the coding block is the same as the tree block. A coding block having the minimum size of the coding block is referred to as a minimum coding block, and can be freely set as the size of a power of 2.

In FIG. 3, a coding block A is one coding block in which the tree block is not partitioned. A coding block B is one of coding blocks obtained by partitioning the tree block into four. A coding block C is one of coding blocks obtained by further partitioning one of blocks obtained by partitioning the tree block into four into four. A coding block D is one of coding blocks obtaining by further hierarchically partitioning one of blocks obtaining by partitioning the tree block into four into four twice, and is a coding block having the minimum size.

(Prediction Mode)

In units of coding blocks, switching is performed between intra prediction (MODE_INTRA) of performing prediction based on a decoded neighboring picture signal and inter prediction (MODE_INTER) of performing prediction based on a picture signal of a decoded picture. A mode identifying the intra prediction (MODE_INTRA) and the inter prediction (MODE_INTER) is defined as a prediction mode (PredMode). The prediction mode (PredMode) has a value of the intra prediction (MODE_INTRA) or the inter prediction (MODE_INTER), and can be selected and coded.

(Partition Mode, Prediction Block, and Prediction Unit)

When a picture is partitioned into blocks and then the intra prediction (MODE_INTRA) and the inter prediction (MODE_INTER) are performed, in order to further reduce a unit in which switching is performed between the intra prediction method and the inter prediction method, a coding block is partitioned as necessary, and prediction is performed. A mode identifying a partition method of the brightness signal and the color difference signal of the coding block is defined as a partition mode (Part Mode). Further, a block obtained by the partition is defined as a prediction block. As illustrated in FIGS. 4A to 4D, four kinds of partition modes (Part Mode) are defined according to the partition method of the brightness signal of the coding block. The partition mode (Part Mode) in which the brightness signal of the coding block is regarded as one prediction block without partition (FIG. 4A) is defined as 2N×2N partition (PART_2N×2N), the partition mode (Part Mode) in which the brightness signal of the coding block is partitioned into two prediction blocks in the horizontal direction (FIG. 4B) is defined as 2N×N partition (PART_2N×N), the partition mode (Part Mode) in which the brightness signal of the coding block is partitioned into two prediction blocks in the vertical direction as coding blocks (FIG. 4C) is defined as N×2N partition (PART_N×2N), and the partition mode (Part Mode) in which the brightness signal of the coding block is equally partitioned in the horizontal direction and the vertical direction, that is, partitioned into four prediction blocks (FIG. 4D) is defined as N×N partition (PART_N×N). Further, except the N×N partition (PART_N×N) of the intra prediction (MODE_INTRA), the color difference signal is also partitioned at the same vertical and horizontal partition ratios as the brightness signal for each partition mode (Part Mode).

In the coding block, in order to specify each prediction block, numbers starting from zero (0) are allocated to prediction blocks present in the coding block in coding order. This number is defined as a partition index PartIdx. A number described in each prediction block of a coding block in FIGS. 4A to 4D represents the partition index PartIdx of the prediction block. In the 2N×N partition (PART_2N×N) illustrated in FIG. 4B, the partition index PartIdx of the upper prediction block is set to 0, and the partition index PartIdx of the lower prediction block is set to 1. In the N×2N partition (PART_N×2N) illustrated in FIG. 4C, the partition index PartIdx of the left prediction block is set to 0, and the partition index PartIdx of the right prediction block is set to 1. In the N×N partition (PART_N×N) in FIG. 4D, the partition index PartIdx of the upper left prediction block is set to 0, the partition index PartIdx of the upper right prediction block is set to 1, the partition index PartIdx of the lower left prediction block is set to 2, and the partition index PartIdx of the lower right prediction block is set to 3.

When the prediction mode (PredMode) is the inter prediction (MODE_INTER), for the coding blocks other than the coding block D that is the minimum coding block, the 2N×2N partition (PART_2N×2N), the 2N×N partition (PART_2N×N), and the N×2N partition (PART_N×2N) are defined as the partition mode (Part Mode), and for only the coding block D that is the minimum coding block, the N×N partition (PART_N×N) is defined as the partition mode (Part Mode) in addition to the 2N×2N partition (PART_2N×2N), 2N×N partition (PART_2N×N), and N×2N partition (PART_N×2N). The reason why the N×N partition (PART_N×N) is not defined for the coding blocks other than the minimum coding block is because in the coding blocks other than the minimum coding block, small coding blocks can be expressed by partitioning the coding block into four.

(Positions of Tree Block, Coding Block, Prediction Block, and Transform Block)

The position of each block such as the tree block, the coding block, the prediction block, and the transform block of the present embodiment is represented by two-dimensional coordinates in which the position of a pixel of an uppermost left brightness signal of a screen of a brightness signal is set as an original point (0, 0), and the position of a pixel of an uppermost left brightness signal included in a region of each block is (x, y). In a coordinate axis direction, the right direction in the horizontal direction and the downward direction in the vertical direction are positive directions, and a unit is one pixel unit of a brightness signal. Not only when a color difference format in which the brightness signal is the same in the picture size (the number of pixels) as the color difference signal is 4:4:4 but also when a color difference format in which the brightness signal is different in the picture size (the number of pixels) from the color difference signal is 4:2:0 or 4:2:2, the position of each block of a color difference signal is represented by coordinates of a pixel of a brightness signal included in a region of each block, and a unit is one pixel of a brightness signal. Thus, the position of each block of a color difference signal can be specified, and a relation between a block of a brightness signal and the position of a block of a color difference signal also becomes apparent by a comparison of coordinate values.

(Prediction Block Group)

A group configured with a plurality of prediction blocks is defined as a prediction block group. FIGS. 5 to 8 are diagrams for describing a prediction block group that neighbors a prediction block of a coding or decoding target in the same picture as the prediction block of the coding or decoding target. FIG. 9 is a diagram for describing a coded or decoded prediction block group present at the same position as or the position nearby the prediction block of the coding or decoding target in an already decoded picture which is temporally different from the prediction block of the coding or decoding target. The prediction block group will be described with reference to FIGS. 5 to 9.

Figure 5:
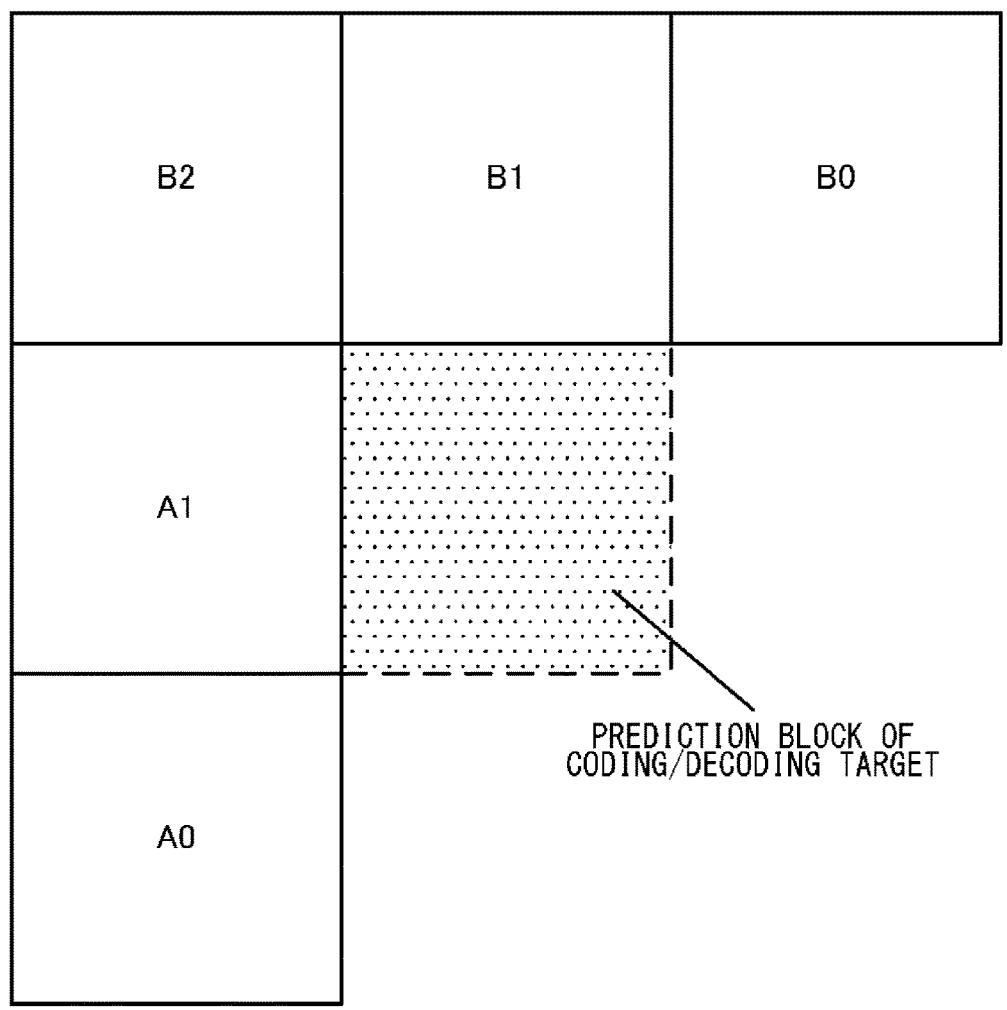
FIG. 5 is a diagram for describing a prediction block group.

A first prediction block group configured with a prediction block A1 neighboring the left side of the prediction block of the coding or decoding target in the same picture as the prediction block of the coding or decoding target and a prediction block A0 neighboring a lower left vertex of the prediction block of the coding or decoding target as illustrated in FIG. 5 is defined as a prediction block group neighboring the left side.

Figure 6:
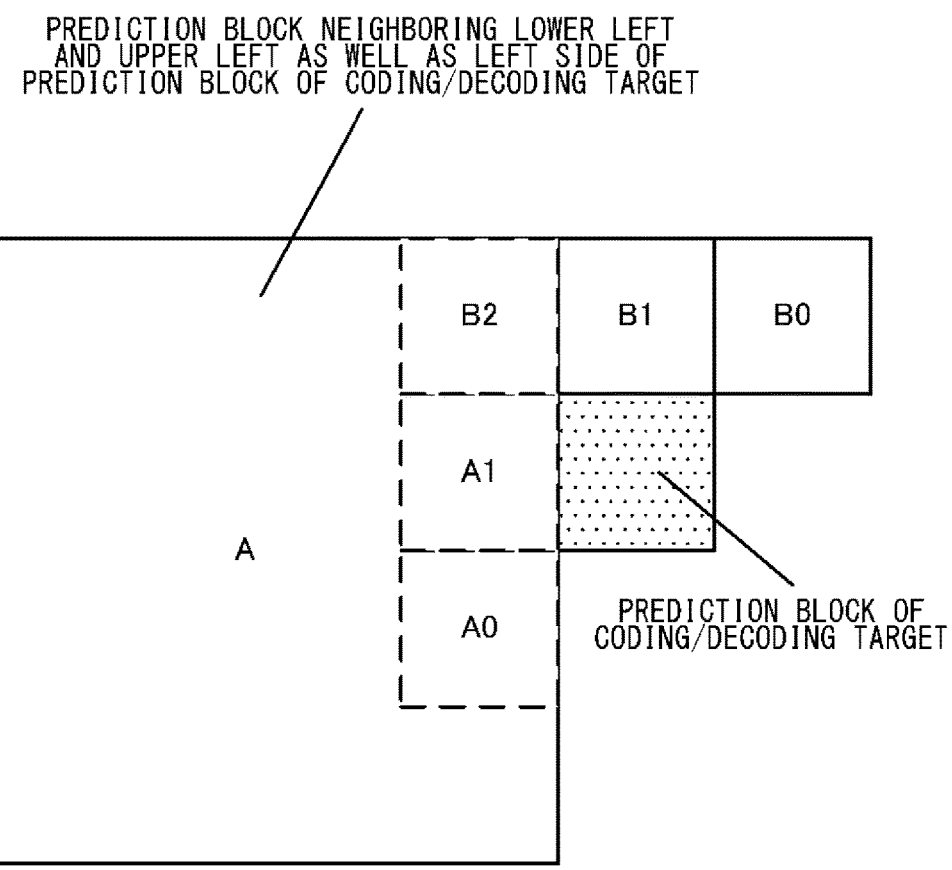
FIG. 6 is a diagram for describing a prediction block group.

Further, as illustrated in FIG. 6, even when the prediction block neighboring the left side of the prediction block of the coding or decoding target is larger in size than the prediction block of the coding or decoding target, according to the above condition, when the prediction block A neighboring the left side neighbors the left side of the prediction block of the coding or decoding target, the prediction block is defined as a prediction block A1, and when the prediction block A neighboring the left side neighbors a lower left vertex of the prediction block of the coding or decoding target, the prediction block is defined as a prediction block A0. In the example of FIG. 6, the prediction block A0 and the prediction block A1 are the same prediction block.

Figure 7:
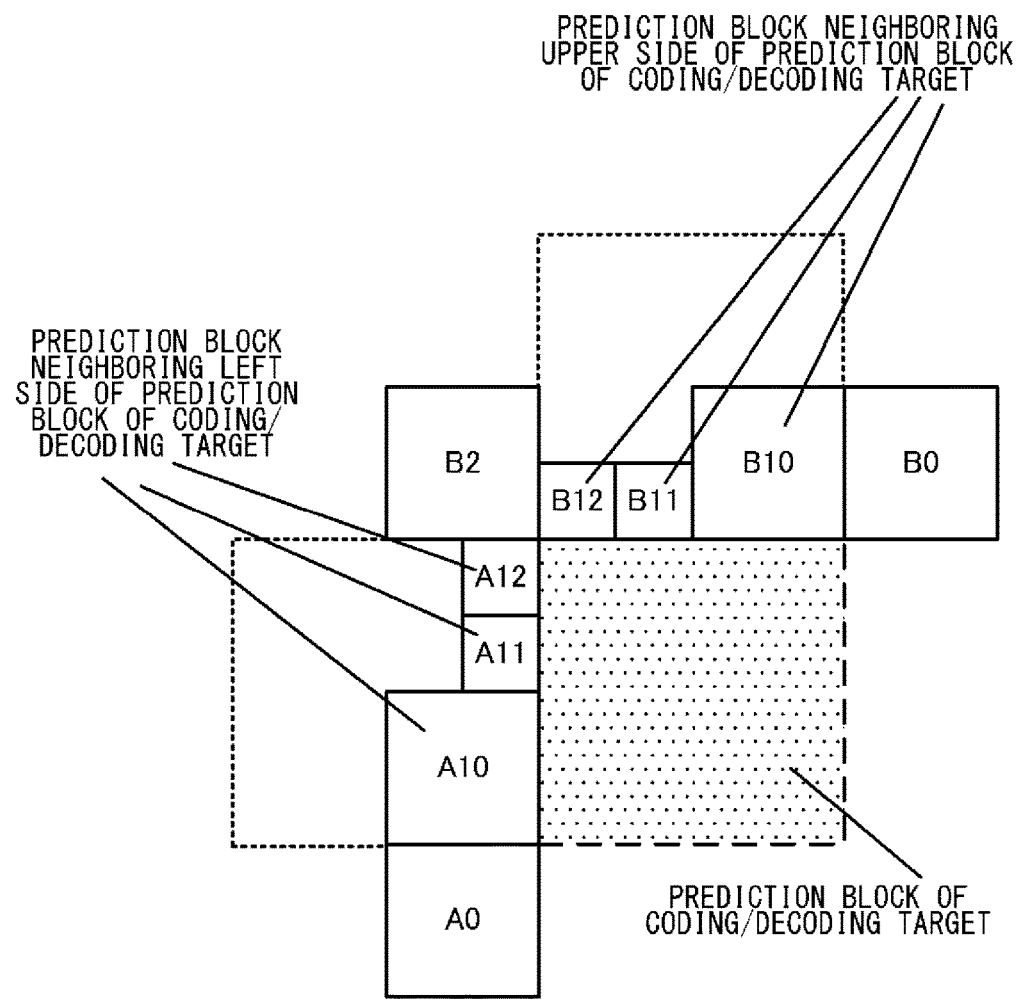
FIG. 7 is a diagram for describing a prediction block group.

Further, as illustrated in FIG. 7, when there are a plurality of prediction blocks neighboring the left side of the prediction block of the coding or decoding target that are smaller in size than the prediction block of the coding or decoding target, in the present embodiment, only a prediction block A10 located at the lowest position among the prediction blocks neighboring the left side is defined as the prediction block A1 neighboring the left side.

A second prediction block group configured with a prediction block B1 neighboring the upper side of the prediction block of the coding or decoding target in the same picture as the prediction block of the coding or decoding target, a prediction block B0 neighboring the upper right vertex of the prediction block of the coding or decoding target, and a prediction block B2 neighboring the upper left vertex of the prediction block of the coding or decoding target is defined as a prediction block group neighboring the upper side.

Figure 8:
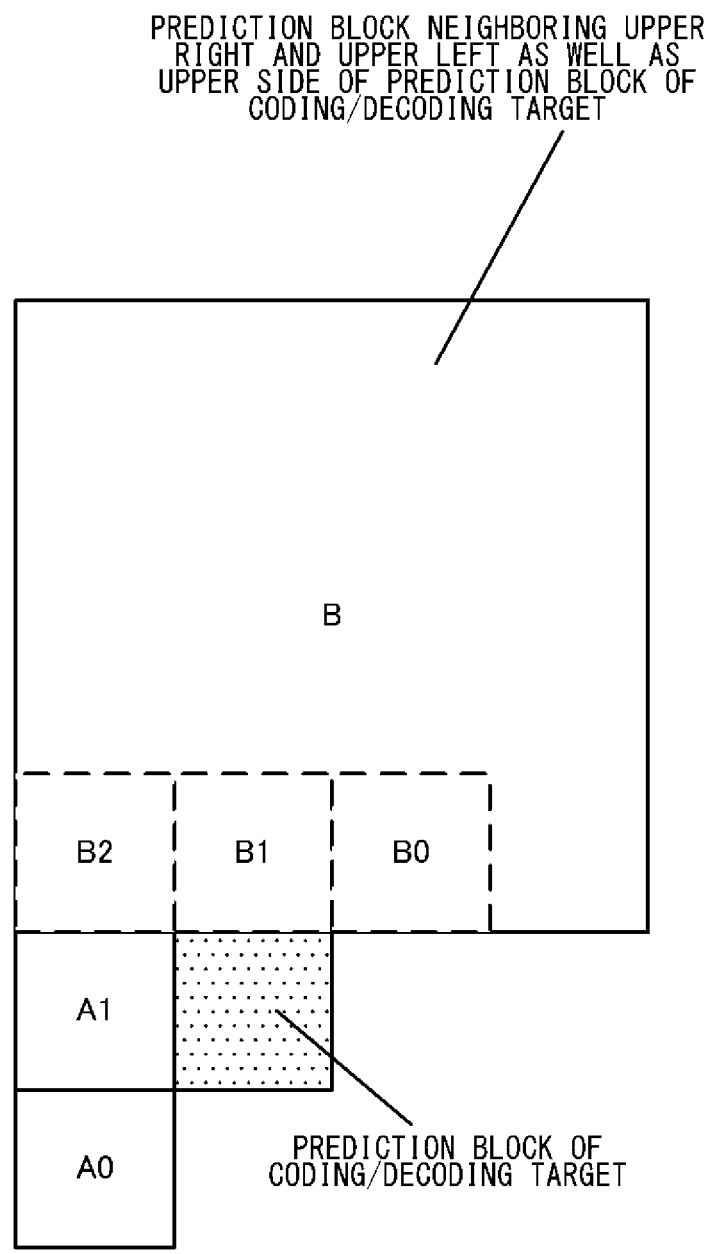
FIG. 8 is a diagram for describing a prediction block group.
Figure 9:
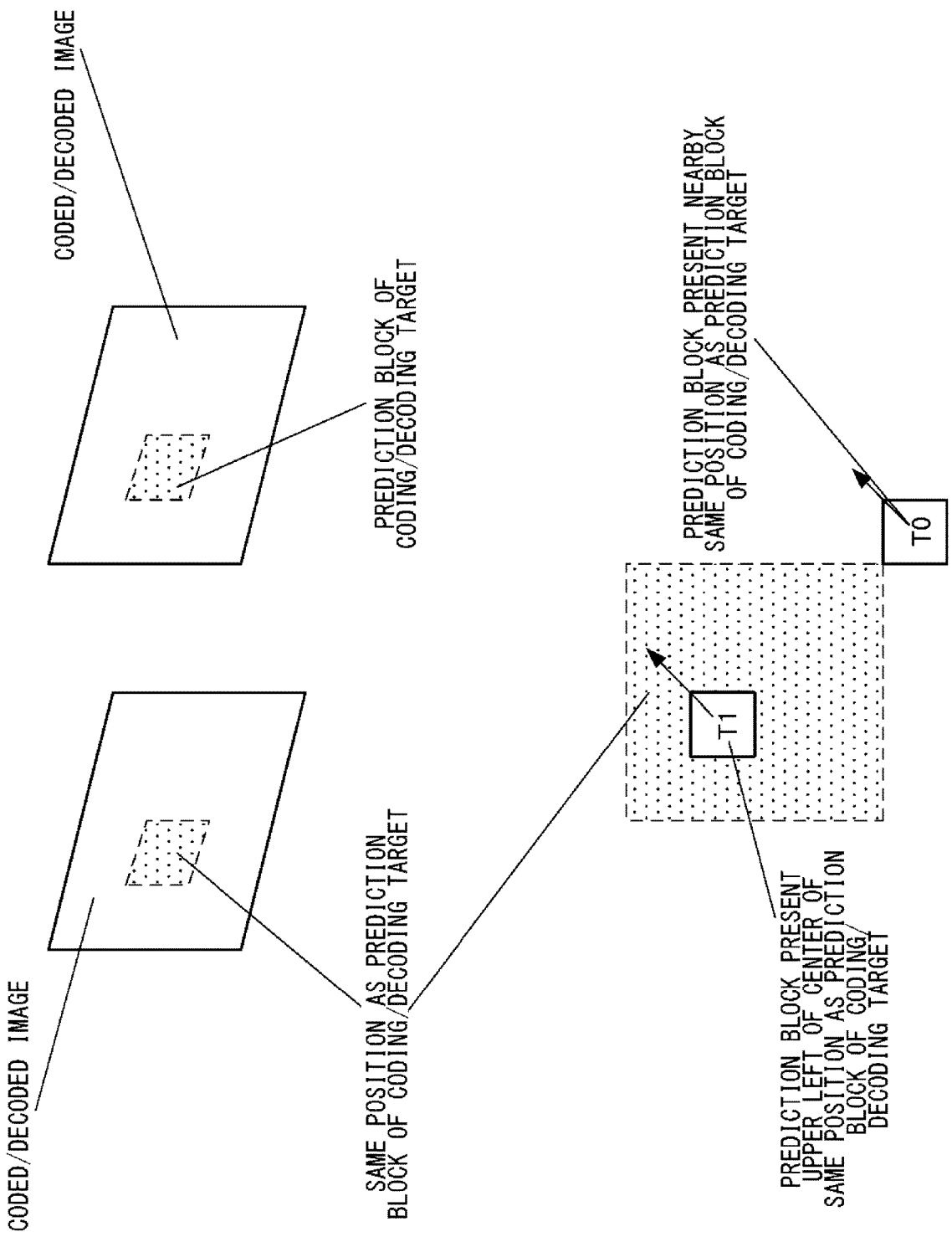
FIG. 9 is a diagram for describing a prediction block group.

Further, as illustrated in FIG. 8, even when the prediction block neighboring the upper side of the prediction block of the coding or decoding target is larger in size than the prediction block of the coding or decoding target, according to the above condition, the prediction block is defined as the prediction block B1 when the prediction block B neighboring the upper side neighbors the upper side of the prediction block of the coding or decoding target, the prediction block is defined as the prediction block B0 when the prediction block B neighboring the upper side neighbors the upper right vertex of the prediction block of the coding or decoding target, and the prediction block is defined as the prediction block B2 when the prediction block B neighboring the upper side neighbors the upper left vertex of the prediction block of the coding or decoding target. In the example of FIG. 8, the prediction block B0, the prediction block B1, and the prediction block B2 are the same prediction block.

Further, as illustrated in FIG. 7, when there are a plurality of prediction blocks neighboring the upper side of the prediction block of the coding or decoding target that are smaller in size than the prediction block of the coding or decoding target, in an embodiment, only a rightmost prediction block B10 among the prediction blocks neighboring the upper side is defined as the prediction block B1 neighboring the upper side.

As illustrated in FIG. 9, a third prediction block group configured with already coded or decoded prediction block groups T0 and T1 present at the same position as or the position nearby the prediction block of the coding or decoding target in a coded or decoded picture that is temporally different from the prediction block of the coding or decoding target is defined as a temporally different prediction block group.

(Inter Prediction Mode and Reference List)

In the embodiment of the present invention, in the inter prediction in which prediction is performed based on a picture signal of a decoded picture, a plurality of decoded pictures can be used as a reference picture. In order to specify a reference picture selected from among a plurality of reference pictures, a reference index is given to each prediction block. In the B slice, the inter prediction can be performed by selecting two arbitrary reference pictures for each prediction block, and there are L0 prediction (Pred_L0), L1 prediction (Pred_L1), and bi-prediction (Pred_BI) as the inter prediction mode. The reference picture is managed by L0 (a reference list 0) and L1 (a reference list 1) of a list structure, and the reference picture can be specified by designating the reference index of L0 or L1. The L0 prediction (Pred_L0) is inter prediction in which the reference picture managed by L0 is referred to, the L1 prediction (Pred_L1) is inter prediction in which the reference picture managed by L1 is referred to, and the bi-prediction (Pred_BI) is inter prediction in which both the L0 prediction and the L1 prediction are performed, and one reference picture managed by each of L0 and L1 is referred to. In the inter prediction of the P slice, only the L0 prediction can be used, and in the inter prediction of the B slice, the L0 prediction, the L1 prediction, and the bi-prediction (Pred_BI) in which the L0 prediction and the L1 prediction are averaged or weighted and added can be used. In a subsequent process, a constant or a variable in which a suffix LX (X is 0 or 1) is appended to an output is assumed to be processed for each of L0 and L1.

(POC)

A POC is a variable associated with a picture to be coded, and a value that increases by one in the output order of pictures is set as the POC. Based on the POC value, it is possible to determine whether it is the same picture, determine an anteroposterior relation of pictures in the output order, or derive a distance between pictures. For example, when two pictures have the same POC value, the two pictures can be determined to be the same picture. When two pictures have different POC values, a picture having a smaller POC value can be determined as a picture to be first output in terms of time, and a POC difference between two pictures is a distance between pictures in a time axis direction.

Figure 1:
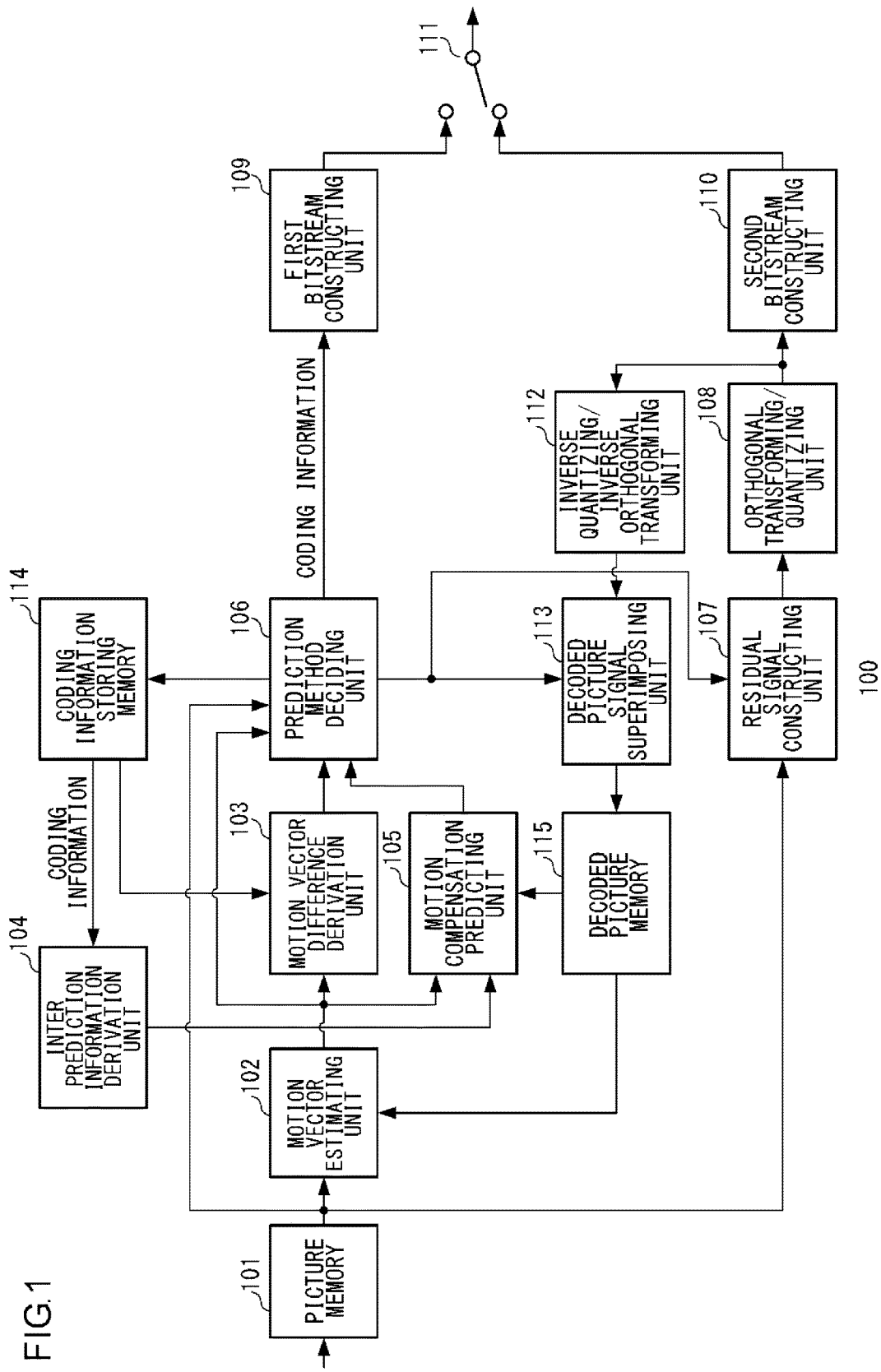
FIG. 1 is a block diagram illustrating a configuration of a moving picture coding device that implements a motion vector prediction method according to an embodiment.

Hereinafter, the embodiment of the present invention will be described with reference to the appended drawings. FIG. 1 is a block diagram illustrating a configuration of a moving picture coding device according to the embodiment of the present invention. The moving picture coding device according to the embodiment includes a picture memory 101, a motion vector estimating unit 102, a motion vector difference derivation unit 103, an inter prediction information estimating unit 104, a motion compensation predicting unit 105, a prediction method deciding unit 106, a residual signal constructing unit 107, an orthogonal transforming/quantizing unit 108, a first bitstream constructing unit 109, a second bitstream constructing unit 110, a multiplexing unit 111, an inverse quantizing/inverse orthogonal transforming unit 112, a decoded picture signal superimposing unit 113, a coding information storing memory 114, and a decoded picture memory 115.

The picture memory 101 temporarily stores picture signals of a coding target picture supplied in the order of photographing/display times. The picture memory 101 supplies the stored picture signals of the coding target picture to the motion vector estimating unit 102, the prediction method deciding unit 106, and the residual signal constructing unit 107 in units of certain pixel blocks. At this time, the picture signals of the picture stored in the order of photographing/display times are rearranged in the coding order and then output from the picture memory 101 in units of pixel blocks.

The motion vector estimating unit 102 detects a motion vector of each prediction block size and each prediction mode in units of prediction blocks, for example, by block matching between the picture signal supplied from the picture memory 101 and the reference picture supplied from the decoded picture memory 115, and supplies the detected motion vector to the motion compensation predicting unit 105, the motion vector difference derivation unit 103, and the prediction method deciding unit 106.

The motion vector difference derivation unit 103 derives a plurality of motion vector predictor candidates using coding information of already coded picture signals stored in the coding information storing memory 114, adds the plurality of motion vector predictor candidates to a motion vector predictor list which will be described later, selects an optimal motion vector predictor from among the plurality of motion vector predictor candidates added to the motion vector predictor list, derives a motion vector difference based on the motion vector detected by the motion vector estimating unit 102 and the motion vector predictor, and supplies the derived motion vector difference to the prediction method deciding unit 106. Further, a motion vector predictor index specifying the motion vector predictor selected from the motion vector predictor candidates added to the motion vector predictor list is supplied to the prediction method deciding unit 106. A detailed configuration and operation of the motion vector difference derivation unit 103 will be described later.

The inter prediction information estimating unit 104 estimates inter prediction information of a merge mode. The merge mode refers to a mode of using inter prediction information of a coded neighboring prediction block which has been subjected to inter prediction or a prediction block of a different picture which has been subjected to inter prediction without coding inter prediction information of a corresponding prediction block such as a prediction mode, a reference index (information specifying a reference picture used in motion compensation prediction from a plurality of reference pictures added to a reference list), and a motion vector of a corresponding prediction block. The inter prediction information estimating unit 104 derives a plurality of merge candidates (inter prediction information candidates) using coding information of an already coded prediction block stored in the coding information storing memory 114, adds the plurality of merge candidates to a merge candidate list, selects an optimal merge candidate from among the plurality of merge candidates added to the merge candidate list, supplies inter prediction information of the selected merge candidate such as a prediction mode, a reference index, and a motion vector to the motion compensation predicting unit 105, and supplies a merge index specifying the selected merge candidate to the prediction method deciding unit 106.

The motion compensation predicting unit 105 constructs a prediction picture signal based on the reference picture using the motion vector detected by the motion vector estimating unit 102 and the inter prediction information estimating unit 104 through motion compensation prediction, and supplies the prediction picture signal to the prediction method deciding unit 106. In the L0 prediction and the L1 prediction, one-way prediction is performed. In case of the bi-prediction (Pred_BI), a prediction picture signal is constructed by performing a two-way prediction, adaptively multiplying signals which have been subjected to inter predictions of the L0 prediction and the L1 prediction by a weighting coefficient, and adding and superimposing an offset value.

The prediction method deciding unit 106 evaluates a coding amount of the motion vector difference, a distortion amount between the prediction picture signal and the picture signal, and the like, decides the prediction mode PredMode for determining whether the prediction method is the inter prediction (PRED_INTER) or the intra prediction (PRED_INTRA) in units of optimal coding blocks from a plurality of prediction methods and the partition mode Part Mode, decides whether a prediction method is a merge mode or the like in units of prediction blocks in the inter prediction (PRED_INTER), decides the merge index when the prediction method is the merge mode or the inter prediction flag, the motion vector predictor index, the reference indices of L0 and L1, the motion vector difference, and the like when the prediction method is not the merge mode, and supplies the decided coding information to the first bitstream constructing unit 109.

Further, the prediction method deciding unit 106 stores information representing the decided prediction method and coding information including the motion vector according to the decided prediction method and the like in the coding information storing memory 114. Here, examples of the coding information to be stored include the prediction mode PredMode, the partition mode Part Mode, flags predFlagL0 and predFlagL1 representing whether the L0 prediction and the L1 prediction are used, reference indices refIdxL0 and refIdxL1 of L0 and L1, motion vectors mvL0 and mvL1 of L0 and L1, and the like. Here, when the prediction mode PredMode is the intra prediction (PRED_INTRA), both the flag predFlagL0 representing whether the L0 prediction is used and the flag predFlagL1 representing whether the L1 prediction is used are 0. However, when the prediction mode PredMode is the inter prediction (MODE_INTER) and the inter prediction mode is the L0 prediction (Pred_L0), the flag predFlagL0 representing whether the L0 prediction is used is 1, and the flag predFlagL1 representing whether the L1 prediction is used is 0. When the inter prediction mode is the L1 prediction (Pred_L1), the flag predFlagL0 representing whether the L0 prediction is used is 0, and the flag predFlagL1 representing whether the L1 prediction is used is 1. When the inter prediction mode is the bi-prediction (Pred_BI), both the flag predFlagL0 representing whether the L0 prediction is used and the flag predFlagL1 representing whether the L1 prediction is used are 1. The prediction method deciding unit 106 supplies the prediction picture signal according to the decided prediction mode to the residual signal constructing unit 107 and the decoded picture signal superimposing unit 113.

The residual signal constructing unit 107 constructs a residual signal by performing subtraction of the picture signal to be coded and the prediction picture signal, and supplies the residual signal to the orthogonal transforming/quantizing unit 108.

The orthogonal transforming/quantizing unit 108 constructs a residual signal which has been subjected to orthogonal transform and quantization by performing orthogonal transform and quantization on the residual signal according to a quantization parameter, and supplies the residual signal to the second bitstream constructing unit 110 and the inverse quantizing/inverse orthogonal transforming unit 112. Further, the orthogonal transforming/quantizing unit 108 supplies the quantization parameter to the coding information storing memory 114.

The first bitstream constructing unit 109 codes coding information according to the prediction method decided by the prediction method deciding unit 106 in units of coding blocks and prediction blocks in addition to information in units of sequences, pictures, slices, and coding blocks. Specifically, when the prediction mode PredMode of each coding block is the inter prediction (PRED_INTER), the first bitstream constructing unit 109 constructs a first bitstream by coding coding information such as a flag used to determine whether it is the merge mode, and information related to the merge index when it is the merge mode, and information related to the inter prediction mode, the reference index, the motion vector predictor index, and the motion vector difference when it is not the merge mode according to a specified syntax rule which will be described later, and supplies the first bitstream to the multiplexing unit 111. Further, when the number of the motion vector predictor candidates added to the motion vector predictor list is 1, the motion vector predictor index mvp_idx can be specified as 0 and thus is not coded. In the present embodiment, the motion vector predictor candidate number is set according to the size of the prediction block of the coding target as will be described later. Thus, the first bitstream constructing unit 109 sets the motion vector predictor candidate number according to the size of the prediction block of the coding target, and codes the motion vector predictor index when the set candidate number is larger than 1.

The second bitstream constructing unit 110 constructs a second bitstream by performing entropy coding on the residual signal which has been subjected to the orthogonal transform and quantization according to the specified syntax rule, and supplies the second bitstream to the multiplexing unit 111. The multiplexing unit 111 multiplexes the first bitstream and the second bitstream according to the specified syntax rule, and outputs a bitstream.

The inverse quantizing/inverse orthogonal transforming unit 112 derives a residual signal by performing inverse quantization and inverse orthogonal transform on the residual signal which has been subjected to the orthogonal transform and quantization supplied from the orthogonal transforming/quantizing unit 108, and supplies the residual signal to the decoded picture signal superimposing unit 113. The decoded picture signal superimposing unit 113 constructs a decoded picture by causing the prediction picture signal according to the decision made by the prediction method deciding unit 106 to be superimposed on the residual signal which has been subjected to the inverse quantization and inverse orthogonal transform by the inverse quantizing/inverse orthogonal transforming unit 112, and stores the decoded picture in the decoded picture memory 115. Further, there are cases in which the decoded picture is subjected to a filtering process of reducing distortion such as block distortion caused by coding and then stored in the decoded picture memory 115.

Figure 2:
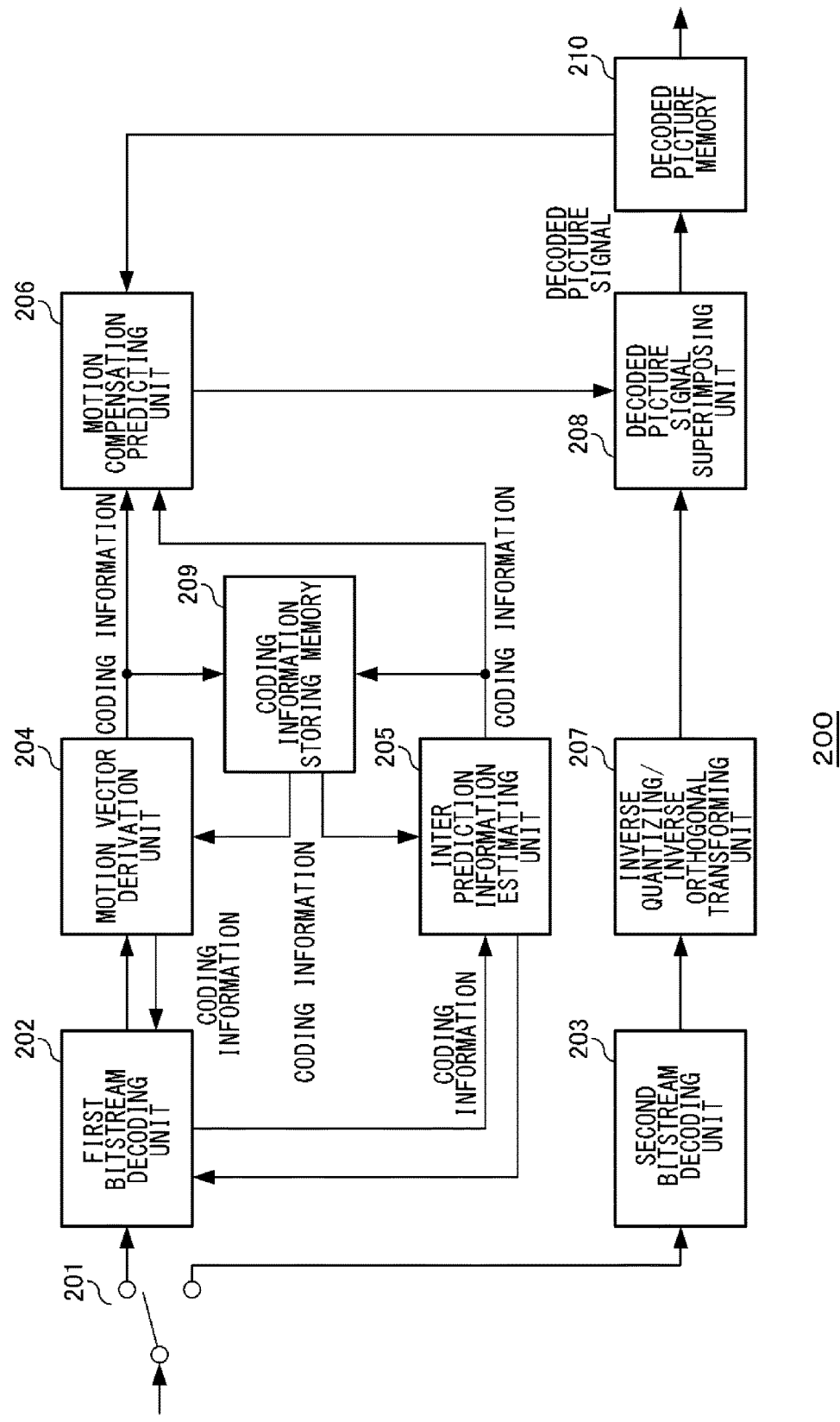
FIG. 2 is a block diagram illustrating a configuration of a moving picture decoding device that implements a motion vector prediction method according to an embodiment.

FIG. 2 is a block diagram illustrating a configuration of a moving picture decoding device according to the embodiment of the present invention which corresponds to the moving picture coding device of FIG. 1. The moving picture decoding device according to the embodiment includes a demultiplexing unit 201, a first bitstream decoding unit 202, a second bitstream decoding unit 203, a motion vector derivation unit 204, an inter prediction information estimating unit 205, a motion compensation predicting unit 206, an inverse quantizing/inverse orthogonal transforming unit 207, a decoded picture signal superimposing unit 208, a coding information storing memory 209, and a decoded picture memory 210.

The decoding process of the moving picture decoding device of FIG. 2 corresponds to the decoding process performed in the moving picture coding device of FIG. 1, and thus the respective components of the motion compensation predicting unit 206, the inverse quantizing/inverse orthogonal transforming unit 207, the decoded picture signal superimposing unit 208, the coding information storing memory 209, and the decoded picture memory 210 of FIG. 2 have functions corresponding to the respective components of the motion compensation predicting unit 105, the inverse quantizing/inverse orthogonal transforming unit 112, the decoded picture signal superimposing unit 113, the coding information storing memory 114, and the decoded picture memory 115 of the moving picture coding device of FIG. 1.

A bitstream supplied to the demultiplexing unit 201 is demultiplexed according to the specified syntax rule, and then demultiplexed bitstream is supplied to the first bitstream decoding unit 202 and the second bitstream decoding unit 203.

The first bitstream decoding unit 202 decodes the supplied bitstream, and obtains information in units of sequences, pictures, slices, and coding blocks and coding information in units of prediction blocks. Specifically, coding information related to the prediction mode PredMode for determining whether it is the inter prediction (PRED_INTER) or the intra prediction (PRED_INTRA) in units of coding blocks, the partition mode Part Mode, the flag for determining whether it is the merge mode when it is the inter prediction (PRED_INTER), the merge index when it is the merge mode, and the inter prediction mode, the motion vector predictor index, and the motion vector difference when it is not the merge mode is decoded according to the specified syntax rule which will be described later, and the coding information is supplied to the motion vector derivation unit 204 or the inter prediction information estimating unit 205. Further, when it is not the merge mode and one motion vector predictor candidate is added to the motion vector predictor list which will be described later, the motion vector predictor index can be specified as 0, and thus the motion vector predictor index is not coded, and the motion vector predictor index is set to 0. In the present embodiment, the motion vector predictor candidate number is set according to the size of the prediction block of the decoding target as will be described later. Thus, the first bitstream decoding unit 202 sets the motion vector predictor candidate number according to the size of the prediction block of the decoding target, and decodes the motion vector predictor index when the set candidate number is larger than 1.

The second bitstream decoding unit 203 decodes the supplied bitstream, derives the residual signal which has been subjected to the orthogonal transform and quantization, and supplies the residual signal which has been subjected to the orthogonal transform and quantization to the inverse quantizing/inverse orthogonal transforming unit 207.

The motion vector derivation unit 204 derives a plurality of the motion vector predictor candidates using coding information of an already decoded picture signal stored in the coding information storing memory 209 when the prediction block of the decoding target is not in the merge mode, adds the plurality of the motion vector predictor candidates to the motion vector predictor list which will be described later, selects the motion vector predictor according to the motion vector predictor index decoded and supplied by the first bitstream decoding unit 202 from among the plurality of the motion vector predictor candidates added to the motion vector predictor list, derives the motion vector based on the vector difference decoded by the first bitstream decoding unit 202 and the selected motion vector predictor, supplies the motion vector to the motion compensation predicting unit 206 together with other coding information, and stores the motion vector in the coding information storing memory 209. Here, examples of the coding information of the prediction block to be supplied and stored include the prediction mode PredMode, the partition mode Part Mode, the flags predFlagL0 and predFlagL1 representing whether the L0 prediction and the L1 prediction are used, the reference indices refIdxL0 and refIdxL1 of L0 and L1, and the motion vectors mvL0 and mvL1 of L0 and L1. Here, when the prediction mode is the intra prediction (PRED_INTRA), both the flag predFlagL0 representing whether the L0 prediction is used and the flag predFlagL1 representing whether the L1 prediction is used are 0. However, when the prediction mode PredMode is the inter prediction (MODE_INTER) and the inter prediction mode is the L0 prediction (Pred_L0), the flag predFlagL0 representing whether the L0 prediction is used is 1, and the flag predFlagL1 representing whether the L1 prediction is used is 0. When the inter prediction mode is the L1 prediction (Pred_L1), the flag predFlagL0 representing whether the L0 prediction is used is 0, and the flag predFlagL1 representing whether the L1 prediction is used is 1. When the inter prediction mode is the bi-prediction (Pred_BI), both the flag predFlagL0 representing whether the L0 prediction is used and the flag predFlagL1 representing whether the L1 prediction is used are 1. A detailed configuration and operation of the motion vector derivation unit 204 will be described later.

The inter prediction information estimating unit 205 estimates the inter prediction information of the merge mode when the prediction block of the decoding target is in the merge mode. The inter prediction information estimating unit 205 derives a plurality of merge candidates using coding information of an already decoded prediction block stored in the coding information storing memory 114, adds the plurality of merge candidates to the merge candidate list, selects a merge candidate corresponding to the merge index decoded and supplied by the first bitstream decoding unit 202 from among the plurality of merge candidates added to the merge candidate list, supplies inter prediction information of the selected merge candidate such as the prediction mode PredMode, the partition mode Part Mode, the flags predFlagL0 and predFlagL1 representing whether the L0 prediction and the L1 prediction are used, the reference indices refIdxL0 and refIdxL1 of L0 and L1, and the motion vectors mvL0 and mvL1 of L0 and L1 to the motion compensation predicting unit 206, and stores the inter prediction information in the coding information storing memory 209.

The motion compensation predicting unit 206 constructs the prediction picture signal based on the reference picture using the motion vector derived by the motion vector derivation unit 204 through the motion compensation prediction, and supplies the prediction picture signal to the decoded picture signal superimposing unit 208. In case of the bi-prediction (Pred_BI), the final prediction picture signal is constructed by adaptively multiplying two motion compensation prediction picture signals of the L0 prediction and the L1 prediction by a weighting coefficient and causing the signals to be superimposed on each other.

The inverse quantizing/inverse orthogonal transforming unit 207 performs inverse orthogonal transform and inverse quantization on the residual signal which has been subjected to the orthogonal transform and quantization and decoded by the first bitstream decoding unit 202, and obtains a residual signal which has been subjected to inverse orthogonal transform and inverse quantization.

The decoded picture signal superimposing unit 208 decodes a decoded picture signal by causing the prediction picture signal which has been subjected to the motion compensation prediction by the motion compensation predicting unit 206 to be superimposed on the residual signal which has been subjected to the inverse orthogonal transform and inverse quantization by the inverse quantizing/inverse orthogonal transforming unit 207, and stores the decoded picture signal in the decoded picture memory 210. When the decoded picture signal is stored in the decoded picture memory 210, there are cases in which the decoded picture is subjected to a filtering process of reducing distortion such as block distortion caused by coding and then stored in the decoded picture memory 210.

(Syntax)

Next, a syntax will be described as a common rule of coding and decoding of a bitstream of a moving picture which is coded by the moving picture coding device employing the motion vector prediction method according to the present embodiment and decoded by the decoding device.

Figure 10:
FIG. 10 is a diagram for describing a syntax of a bitstream at a slice level related to a motion vector prediction method.

FIG. 10 illustrates a first syntax structure described in a slice header in units of slices in a bitstream constructed according to the present embodiment. Here, only syntax elements related to the present embodiment are illustrated. When a slice type is B, a flag collocated_from_l0_flag representing whether a reference picture used by a picture colPic of a different time used to derive the motion vector predictor candidate or the merge candidate in the time direction is added to a reference list of L0 or a reference list of L1 of a picture including a prediction block of a processing target is set. The details of the flag collocated_from_l0_flag will be described later.

The above syntax element may be set to a picture parameter set describing syntax element set in units of pictures.

FIG. 11 illustrates a syntax pattern described in units of prediction blocks. When the value of the prediction mode PredMode of the prediction block is the inter prediction (MODE_INTER), merge_flag [x0][y0] representing whether it is the merge mode is set. Here, x0 and y0 are an index representing the position of an upper left pixel of a prediction block in a picture of a brightness signal, and merge_flag [x0][y0] is a flag representing whether it is the merge mode of a prediction block positioned at (x0, y0) in a picture.

Next, when merge_flag [x0][y0] is 1, it means that it is the merge mode, and a syntax element merge_idx [x0][y0] serving as an index of a merge list which is a list of merge candidates to be referred to is set. Here, x0 and y0 are indices representing the position of an upper left pixel of a prediction block in a picture, and merge_idx [x0][y0] is a merge index of a prediction block positioned at (x0, y0) in a picture.

Meanwhile, when merge_flag [x0][y0] is 0, it means that it is not the merge mode, and when the slice type is B, a syntax element inter_pred_flag[x0][y0] identifying the inter prediction mode is set, and the L0 prediction (Pred_L0), the L1 prediction (Pred_L1), and the bi-prediction (Pred_BI) are identified by this syntax element. For each of L0 and L1, syntax elements ref_idx_l0[x0][y0] and ref_idx_l1[x0][y0] of the reference index for specifying a reference picture and syntax elements mvd_l0[x0][y0][j] and mvd_l1[x0][y0][j] of the motion vector difference which are the difference between the motion vector of the prediction block and the motion vector predictor obtained by motion vector detection are set. Here, x0 and y0 are indices representing the position of an upper left pixel of a prediction block in a picture, ref_idx_l0[x0][y0] and mvd_l0[x0][y0][j] are a reference index of L0 of a prediction block positioned at (x0, y0) in a picture and a motion vector difference thereof, respectively, and ref_idx_l1[x0][y0] and mvd_l1[x0][y0][j] are a reference index of L1 of a prediction block positioned at (x0, y0) in a picture and a motion vector difference thereof, respectively. Further, j represents a component of a motion vector difference, and j of 0 represents an x component, and j of 1 represents a y component. Next, when a candidate number of a motion vector difference set according to the size of a prediction block of a coding or decoding target is larger than 1, syntax elements mvp_idx_l0[x0][y0] and mvp_idx_l1[x0][y0] serving as an index of a motion vector predictor list which is a list of motion vector predictor candidates to be referred to are set. Here, x0 and y0 are indices representing the position of an upper left pixel of a prediction block in a picture, mvp_idx_l0[x0][y0] and mvp_idx_l1[x0][y0] are motion vector predictor indices of L0 and L1 of a prediction block positioned at (x0, y0) in a picture. NumMVPCand (LX) represents a function of deriving a total of the number of motion vector predictor candidates of a prediction block in a prediction direction LX (X is 0 or 1), and the same value as a final candidate number finalNumMVPCand specified according to the size of a prediction block of a coding or decoding target which will be described later is set. FIG. 12 illustrates exemplary entropy codes of the syntax elements mvp_idx_l0[x0][y0] and mvp_idx_l1[x0][y0] of a motion vector predictor index of every specified motion vector predictor candidate number. A motion vector predictor index mvp_idx_lx[x0][y0] is coded by a prediction method of a motion vector when a motion vector predictor candidate number NumMVPCand (LX) is larger than 1. This is because when a total of the number of motion vector predictor candidates is 1, it is the motion vector predictor, and thus the motion vector predictor candidate to be referred to is decided even without transmitting mvp_idx_lx[x0][y0]. When the motion vector predictor candidate number NumMVPCand (LX) is 2, codes of the syntax elements mvp_idx_l0[x0][y0] and mvp_idx_l1[x0][y0] of the motion vector predictor index is "0" when the motion vector predictor index is 0, and the codes of the syntax elements mvp_idx_l0[x0][y0] and mvp_idx_l1[x0][y0] of the motion vector predictor index are "1" when the motion vector predictor index is 1. When the motion vector predictor candidate number NumMVPCand (LX) is 3, the codes of the syntax elements mvp_idx_l0[x0][y0] and mvp_idx_l1[x0][y0] of the motion vector predictor index are "0" when the motion vector predictor index is 0, the codes of the syntax elements mvp_idx_l0[x0][y0] and mvp_idx_l1[x0][y0] of the motion vector predictor index are "10" when the motion vector predictor index is 1, and the codes of the syntax elements mvp_idx_l0[x0][y0] and mvp_idx_l1[x0][y0] of the motion vector predictor index are "11" when the motion vector predictor index is 2. In the embodiment of the present invention, the motion vector predictor candidate number is set according to the size of a prediction block of a coding or decoding target, and the details thereof will be described later.

The motion vector prediction method according to the embodiment is performed in the motion vector difference derivation unit 103 of the moving picture coding device of FIG. 1 and the motion vector derivation unit 204 of the moving picture decoding device of FIG. 2.

The motion vector prediction method according to the embodiment will be described with reference to the drawings. The motion vector prediction method is performed in both the coding and decoding processes in units of prediction blocks configuring a coding block. When the prediction mode of a prediction block is the inter prediction (MODE_INTER) and it is not the merge mode, the motion vector prediction method is performed to derive a motion vector predictor using a coded motion vector used to derive a motion vector difference to be coded from a motion vector of a coding target in case of coding and is performed to derive a motion vector predictor using a decoded motion vector used to derive a motion vector of a decoding target in case of decoding.

(Prediction of Motion Vector in Coding)

An operation of the motion vector prediction method according to the embodiment in the moving picture coding device that codes a bitstream of a moving picture based on the above-described syntax will be described. When the motion compensation prediction is performed in units of slices, that is when the slice type is the P slice (one-way prediction slice) or the B slice (two-way prediction slice), the motion vector prediction method is applied to a prediction block in which the prediction mode of a prediction block in a slice is the inter prediction (MODE_INTER), it is not the merge mode, and a motion vector difference is coded or decoded.

Figure 13:
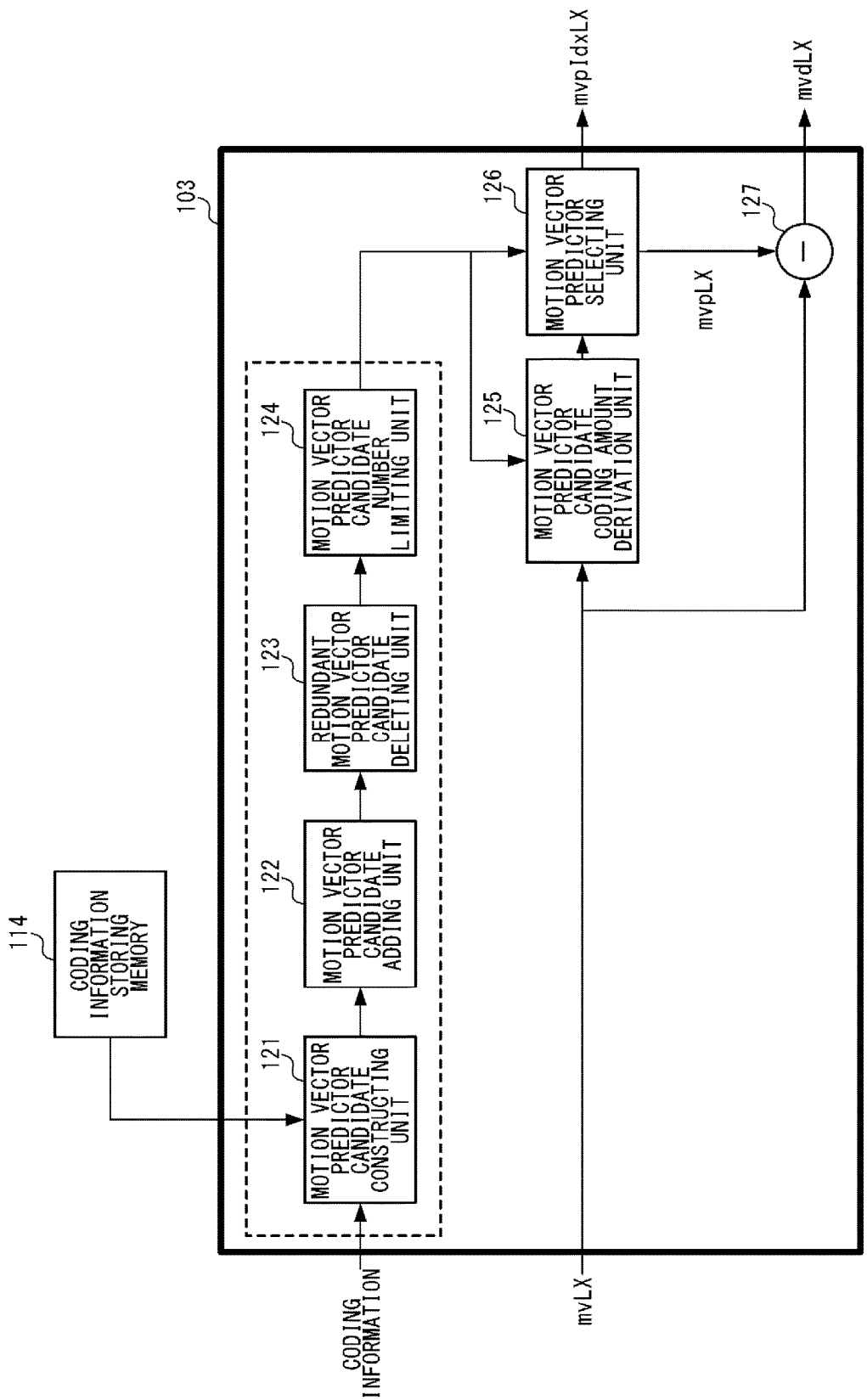
FIG. 13 is a block diagram illustrating a detailed configuration of a motion vector difference derivation unit of FIG. 1.

FIG. 13 is a diagram illustrating a detailed configuration of the motion vector difference derivation unit 103 of the moving picture coding device of FIG. 1. A portion surrounded by a bold frame line of FIG. 13 illustrates the motion vector difference derivation unit 103.

Further, a portion surrounded by a bold dotted line thereinside illustrates an operating unit of the motion vector prediction method which will be described later, is similarly installed even in the moving picture decoding device corresponding to the moving picture coding device according to the embodiment, and configured to obtain the same derivation result that is consistent in coding and decoding. Next, the motion vector prediction method in coding will be described with reference to the drawing.

In the present embodiment, a final candidate number finalNumMVPCand of the motion vector predictor is set according to the size of a prediction block of a coding or decoding target. The motion vector difference derivation unit 103 sets finalNumMVPCand to a number smaller than the latter when the size of a prediction block of a brightness signal of a coding target is smaller than or equal to a specified size sizePUNumMVPCand, and sets finalNum- MVPCand to a number larger than the former when the size of a prediction block of a brightness signal of a coding target is neither smaller than nor equal to a size sizePUNumMVPCand. In the present embodiment, the specified size sizePUNumMVPCand is set to 8×8, and finalNumMVPCand is set to 1 when the size of a prediction block of a brightness signal of a coding or decoding target is smaller than or equal to the specified size sizePUNumMVPCand and finalNumMVPCand is set to 2 in the other cases.

When the size of a prediction block is small, the number of prediction blocks per unit area is large, and thus the number of processes of deleting a redundant motion vector predictor candidate which will be described later and the number of processes of coding the motion vector predictor index described above increase.

In this regard, in the present embodiment, when a prediction block of a coding or decoding target is smaller than or equal to a specified size, the final candidate number finalNumMVPCand is set to 1, and the process of deleting the redundant motion vector predictor candidate and the process of coding and decoding the motion vector predictor index are skipped, and thus the processing amount is reduced. Further, when the final candidate number finalNumMVPCand is 1, it is unnecessary to code the motion vector predictor index, and thus the processing amount of entropy coding can be reduced.

The motion vector difference derivation unit 103 includes a motion vector predictor candidate constructing unit 121, a motion vector predictor candidate adding unit 122, a redundant motion vector predictor candidate deleting unit 123, a motion vector predictor candidate number limiting unit 124, a motion vector predictor candidate coding amount derivation unit 125, a motion vector predictor selecting unit 126, and a motion vector subtracting unit 127.

The motion vector difference derivation process of the motion vector difference derivation unit 103 derives a motion vector difference of a motion vector used in the inter prediction method selected in a coding target block for each of L0 and L1. Specifically, in the case in which the prediction mode PredMode of the coding target block is the inter prediction (MODE_INTER), when the inter prediction mode of the coding target block is the L0 prediction (Pred_L0), a motion vector predictor list mvpListL0 of L0 is derived, a motion vector predictor mvpL0 is selected, and a motion vector difference mvdL0 of a motion vector of L0 is derived. When the inter prediction mode of the coding target block (Pred_L1) is the L1 prediction, a motion vector predictor list mvpListL1 of L1 is derived, a motion vector predictor mvpL1 is selected, and a motion vector difference mvdL1 of a motion vector of L1 is derived. When the inter prediction mode of the coding target block is the bi-prediction (Pred_BI), both the L0 prediction and the L1 prediction are performed, the motion vector predictor list mvpListL0 of L0 is derived, the motion vector predictor mvpL0 of L0 is selected, the motion vector difference mvdL0 of the motion vector mvL0 of L0 is derived, and further, the motion vector predictor list mvpListL1 of L1 is derived, the motion vector predictor mvpL1 of L1 is derived, and the motion vector difference mvdL1 of the motion vector mvL1 of L1 is derived.

The motion vector difference derivation process is performed on each of L0 and L1, but is a process common to L0 and L1. Thus, in the following description, L0 and L1 are represented as LX common thereto. In the process of deriving the motion vector difference of L0, X is 0, and in the process of deriving the motion vector difference of L1, X is 1. Further, when information of the other list other than LX is referred to during the process of deriving the motion vector difference of LX, the other list is represented as LY.

The motion vector predictor candidate constructing unit 121 derives motion vectors mvLXA, mvLXB, and mvLXCol for each prediction block group from the three prediction block groups of the prediction block group (the prediction block group (A0 and A1 of FIG. 5) neighboring the left side of a prediction block in the same picture as a prediction block of a coding target) neighboring the upper side, the prediction block group (the prediction block group (B0, B1, and B2) of FIG. 5) neighboring the upper side of the prediction block in the same picture as the prediction block of the coding target) neighboring the left side, and the prediction block group of a different time (the already coded prediction block group (T0 and T1 of FIG. 9) present at the same position as or the position nearby the prediction block in a picture temporally different from the prediction block of the coding target) for each of L0 and L1, and supplies the motion vectors mvLXA, mvLXB, and mvLXCol to the motion vector predictor candidate adding unit 122 as the motion vector predictor candidates. Hereinafter, mvLXA and mvLXB are referred to as a spatial motion vector predictor, and mvLXCol is referred to as a temporal motion vector predictor. When the motion vector predictor candidate is derived, coding information of a coded prediction block stored in the coding information storing memory 114 such as a prediction mode, a reference index of each reference list, a POC of a reference picture, and a motion vector.

The motion vector predictor candidates mvLXA, mvLXB, and mvLXCol may be derived by performing scaling according to a relation between a POC of a coding or decoding target picture (which is a coding target picture in the coding process and a decoding target picture in the decoding process, and this meaning is hereinafter used unless otherwise set forth herein) and a POC of a reference picture.

The motion vector predictor candidate constructing unit 121 performs condition determination which will be described later on prediction blocks in each prediction block group in a certain order for each prediction block group, selects motion vectors of prediction blocks satisfying a condition first, and uses the selected motion vectors as the motion vector predictor candidates mvLXA, mvLXB, and mvLXCol.

The condition determination which will be described later is performed on each of prediction blocks in the order from bottom to top (the order of A0 and A1 from A0 in FIG. 5) in the prediction block group neighboring the left side when the motion vector predictor is derived from the prediction block group neighboring the left side, in the order from right to left (the order of B0, B1, and B2 from B0 in FIG. 5) in the prediction block group neighboring the upper side when the motion vector predictor is derived from the prediction block group neighboring the upper side, and in the order of T0 and T1 from T0 in FIG. 9 when the motion vector predictor is derived from the prediction block group of a different time, motion vectors of prediction blocks satisfying a condition first are selected, and mvLXA, mvLXB, and mvLXCol are set as the motion vector predictor candidates.

In other words, in the prediction block group neighboring the left side, a prediction block on the bottom is highest in the priority order, and the priority order is given upwards, and in the prediction block group neighboring the upper side, a rightmost prediction block is highest in the priority order, and the priority order is given leftwards. In the prediction block group of a different time, the prediction block of T0 is highest in the priority order, and the priority order is given in the order of T0 and T1.

(Explanation of Condition Determination Loop of Spatial Prediction Block)

In scan methods 1, 2, 3, and 4 which will be described later, respective condition determinations are applied to each of neighboring prediction blocks in the prediction block group neighboring the left side and the prediction block group neighboring the upper side in the priority order of the following condition determinations 1, 2, 3, and 4. Here, only in a scan method 5 which will be described later, respective condition determinations are applied in the priority order of the condition determinations 1, 3, 2, and 4.

The condition determination 1: prediction using the reference list LX and the reference index, that is, the reference picture which are the same as those of the motion vector of LX of the motion vector difference derivation target of the prediction block of the coding or decoding target is being performed even in the neighboring prediction block.

The condition determination 2: prediction using the reference list LY different from but the same reference picture as those of the motion vector of LX of the motion vector difference derivation target of the prediction block of the coding or decoding target is being performed in the neighboring prediction block.

The condition determination 3: prediction using the same reference list LX as but the reference picture different from those of the motion vector of LX of the motion vector difference derivation target of the prediction block of the coding or decoding target is being performed in the neighboring prediction block.

The condition determination 4: prediction using the reference list LY and the reference picture which are different from those of the motion vector of LX of the motion vector difference derivation target of the prediction block of the coding or decoding target is being performed in the neighboring prediction block.

When any one of the above conditions is satisfied, a motion vector satisfying a condition is determined to be present in a corresponding prediction block, and subsequent condition determination is not performed. Further, when either condition of the condition determination 1 and the condition determination 2 is satisfied, the motion vector of the neighboring prediction block corresponds to the same reference picture, and is used as the motion vector predictor candidate without change, but when either condition of the condition determination 3 and the condition determination 4 is satisfied, the motion vector of the neighboring prediction block corresponds to the different reference picture, the motion vector predictor candidate is derived based on the motion vector by scaling.

As a loop method of scanning a spatial prediction block, the following five methods can be set according to a method of conducting the above four condition determinations. The respective methods are different in appropriateness and a maximum processing amount of a vector predictor, and one of the methods is selected and set in light of appropriateness and a maximum processing amount of a vector predictor. The scan method 1 will be described later in detail with reference to flowcharts of FIGS. 19 to 23, but a detailed description of the other scan methods 2 to 5 is omitted since a person skilled in the art can appropriately design the processes of performing the scan methods 2 to 5 based on the process of performing the scan method 1. Here, a loop process of scanning a spatial prediction block in the moving picture coding device will be described, but the same process can be performed in the moving picture decoding device.

Scan Method 1:

A motion vector predictor for which a scaling operation using the same reference picture is unnecessary is preferentially determined, two of the four condition determinations are performed on each prediction block, and when a condition is not satisfied, the condition determination of a neighboring prediction block is performed. In a first round, the condition determination of the condition determination 1 and the condition determination 2 is performed, and in a round of a next prediction block, the condition determination of the condition determination 3 and the condition determination 4 is performed.

Specifically, the condition determination is performed in the following priority order (here, N is A or B):

1. the condition determination 1 of a prediction block N0 (the same reference list LX, the same reference picture)
2. the condition determination 2 of the prediction block N0 (the different reference list LY, the same reference picture)
3. the condition determination 1 of a prediction block N1 (the same reference list LX, the same reference picture)
4. the condition determination 2 of the prediction block N1 (the different reference list LY, the same reference picture)
5. the condition determination 1 of the prediction block N2 (the same reference list LX, the same reference picture) only for the prediction block group neighboring the upper side
6. the condition determination 2 of the prediction block N2 (the different reference list LY, the same reference picture) only for the prediction block group neighboring the upper side
7. the condition determination 3 of the prediction block N0 (the same reference list LX, the different reference picture)
8. the condition determination 4 of the prediction block N0 (the different reference list LY, the different reference picture)
9. the condition determination 3 of the prediction block N1 (the same reference list LX, the different reference picture)
10. the condition determination 4 of the prediction block N1 (the different reference list LY, the different reference picture)
11. the condition determination 3 of the prediction block N2 (the same reference list LX, the different reference picture) only for the prediction block group neighboring the upper side
12. the condition determination 4 of the prediction block N2 (the different reference list LY, the different reference picture) only for the prediction block group neighboring the upper side According to the scan method 1, since the motion vector predictor for which the scaling operation using the same reference picture is unnecessary is likely to be selected, an effect of increasing a possibility that the coding amount of the motion vector difference is reduced is obtained. Further, since a maximum of the number of rounds of the condition determination is 2, when hardware implementation is considered, the number of memory accesses to the coding information of the prediction block is smaller than in the scan method 2 which will be described later, and complexity is reduced.

Scan Method 2:

One of the four condition determinations is performed on each prediction block, and when a condition is not satisfied, the condition determination of a neighboring prediction block is performed. The condition determination is performed four times on each prediction block and then ends.

Specifically, the condition determination is performed in the following priority order (here, N is A or B):

1. the condition determination 1 of the prediction block N0 (the same reference list LX, the same reference picture)
2. the condition determination 1 of the prediction block N1 (the same reference list LX, the same reference picture)
3. the condition determination 1 of the prediction block N2 (the same reference list LX, the same reference picture) only for the prediction block group neighboring the upper side
4. the condition determination 2 of the prediction block N0 (the different reference list LY, the same reference picture)
5. the condition determination 2 of the prediction block N1 (the different reference list LY, the same reference picture)
6. the condition determination 2 of the prediction block N2 (the different reference list LY, the same reference picture) only for the prediction block group neighboring the upper side
7. the condition determination 3 of the prediction block N0 (the same reference list LX, the different reference picture)
8. the condition determination 3 of the prediction block N1 (the same reference list LX, the different reference picture)
9. the condition determination 3 of the prediction block N2 (the same reference list LX, the different reference picture) only for the prediction block group neighboring the upper side
10. the condition determination 4 of the prediction block N0 (the different reference list LY, the different reference picture)
11. the condition determination 4 of the prediction block N1 (the different reference list LY, the different reference picture)
12. the condition determination 4 of the prediction block N2 (the different reference list LY, the different reference picture) only for the prediction block group neighboring the upper side According to the scan method 2, since the motion vector predictor for which the scaling operation using the same reference picture is unnecessary is likely to be selected, an effect of increasing a possibility that the coding amount of the motion vector difference is reduced is obtained. Further, a maximum of the number of rounds of the condition determination is 4, and when hardware implementation is considered, the number of memory accesses to the coding information of the prediction block is larger than in the scan method 1, but the motion vector predictor of the same reference list is likely to be selected.

Scan Method 3:

In a first round, the condition determination of the condition determination 1 is performed on each prediction block, and when a condition is not satisfied, the condition determination of a neighboring prediction block is performed. In a next round, the condition determination is performed on each prediction block in the order of the condition determination 2, the condition determination 3, and the condition determination 4, and then proceeds to the neighbor.

Specifically, the condition determination is performed in the following priority order (here, N is A or B):

1. the condition determination 1 of the prediction block N0 (the same reference list LX, the same reference picture)
2. the condition determination 1 of the prediction block N1 (the same reference list LX, the same reference picture)
3. the condition determination 1 of the prediction block N2 (the same reference list LX, the same reference picture) only for the prediction block group neighboring the upper side
4. the condition determination 2 of the prediction block N0 (the different reference list LY, the same reference picture)
5. the condition determination 3 of the prediction block N0 (the same reference list LX, the different reference picture)
6. the condition determination 4 of the prediction block N0 (the different reference list LY, the different reference picture)
7. the condition determination 2 of the prediction block N1 (the different reference list LY, the same reference picture)
8. the condition determination 3 of the prediction block N1 (the same reference list LX, the different reference picture)
9. the condition determination 4 of the prediction block N1 (the different reference list LY, the different reference picture)
10. the condition determination 2 of the prediction block N2 (the different reference list LY, the same reference picture) only for the prediction block group neighboring the upper side
11. the condition determination 3 of the prediction block N2 (the same reference list LX, the different reference picture) only for the prediction block group neighboring the upper side
12. the condition determination 4 of the prediction block N2 (the different reference list LY, the different reference picture) only for the prediction block group neighboring the upper side According to the scan method 3, since the motion vector predictor for which the scaling operation using the same reference list and the same reference picture is unnecessary is likely to be selected, an effect of increasing a possibility that the coding amount of the motion vector difference is reduced is obtained. Further, since a maximum of the number of rounds of the condition determination is 2, when hardware implementation is considered, the number of memory accesses to the coding information of the prediction block is smaller than in the scan method 2, and complexity is reduced.

Scan Method 4:

The condition determination of the same prediction block is preferentially performed, the four condition determinations are performed within one prediction block, and when any one of all conditions is not satisfied, a motion vector satisfying a condition is determined not to be present in the corresponding prediction block, and the condition determination of the next prediction block is performed.

Specifically, the condition determination is performed in the following priority order (here, N is A or B):

1. the condition determination 1 of the prediction block N0 (the same reference list LX, the same reference picture)
2. the condition determination 2 of the prediction block N0 (the different reference list LY, the same reference picture)

3. the condition determination 3 of the prediction block N0 (the same reference list LX, the different reference picture)

4. the condition determination 4 of the prediction block N0 (the different reference list LY, the different reference picture)

5. the condition determination 1 of the prediction block N1 (the same reference list LX, the same reference picture)

6. the condition determination 2 of the prediction block N1 (the different reference list LY, the same reference picture)

7. the condition determination 3 of the prediction block N1 (the same reference list LX, the different reference picture)

8. the condition determination 4 of the prediction block N1 (the different reference list LY, the different reference picture)

9. the condition determination 1 of the prediction block N2 (the same reference list LX, the same reference picture) only for the prediction block group neighboring the upper side 10. the condition determination 2 of the prediction block N2 (the different reference list LY, the same reference picture) only for the prediction block group neighboring the upper side 11. the condition determination 3 of the prediction block N2 (the same reference list LX, the different reference picture) only for the prediction block group neighboring the upper side 12. the condition determination 4 of the prediction block N2 (the different reference list LY, the different reference picture) only for the prediction block group neighboring the upper side According to the scan method 4, since a maximum of the number of rounds of the condition determination is 1, when hardware implementation is considered, the number of memory accesses to the coding information of the prediction block is smaller than in the scan method 1, the scan method 2, and the scan method 3, and complexity is reduced.

Scan Method 5:

Similarly to the scan method 4, the condition determination of the same prediction block is preferentially performed, the four condition determinations are performed within one prediction block, and when anyone of all conditions is not satisfied, a motion vector satisfying a condition is determined not to be present in the corresponding prediction block, and the condition determination of the next prediction block is performed. Here, in the condition determination within the prediction block, the same reference picture is preferentially considered in the scan method 4, but the same reference list is preferentially considered in the scan method 5.

Specifically, the condition determination is performed in the following priority order (here, N is A or B):

1. the condition determination 1 of the prediction block N0 (the same reference list LX, the same reference picture)

2. the condition determination 3 of the prediction block N0 (the same reference list LX, the different reference picture)

3. the condition determination 2 of the prediction block N0 (the different reference list LY, the same reference picture)

4. the condition determination 4 of the prediction block N0 (the different reference list LY, the different reference picture)

5. the condition determination 1 of the prediction block N1 (the same reference list LX, the same reference picture)

6. the condition determination 3 of the prediction block N1 (the same reference list LX, the different reference picture)

7. the condition determination 2 of the prediction block N1 (the different reference list LY, the same reference picture)

8. the condition determination 4 of the prediction block N1 (the different reference list LY, the different reference picture)

9. the condition determination 1 of the prediction block N2 (the same reference list LX, the same reference picture) only for the prediction block group neighboring the upper side 10. the condition determination 3 of the prediction block N2 (the same reference list LX, the different reference picture) only for the prediction block group neighboring the upper side 11. the condition determination 2 of the prediction block N2 (the different reference list LY, the same reference picture) only for the prediction block group neighboring the upper side 12. the condition determination 4 of the prediction block N2 (the different reference list LY, the different reference picture) only for the prediction block group neighboring the upper side According to the scan method 5, further, it is possible to reduce the number of references to the reference list of the prediction block compared to the scan method 4, and it is possible to reduce complexity by reducing the number of accesses to a memory and a processing amount of the condition determination or the like. Further, similarly to the scan method 4, since a maximum of the number of rounds of the condition determination is 1, when hardware implementation is considered, the number of memory accesses to the coding information of the prediction block is smaller than in the scan method 1, the scan method 2, and the scan method 3, and complexity is reduced.

Then, the motion vector predictor candidate adding unit 122 stores the derived motion vector predictor candidates mvLXA, mvLXB, and mvLXCol in the motion vector predictor list mvpListLX.

Then, the redundant motion vector predictor candidate deleting unit 123 determines the motion vector predictor candidates having the same motion vector value by compares the motion vector values of the motion vector predictor candidates stored in the motion vector predictor list mvpListLX of LX, and updates the motion vector predictor list mvpListLX so that the motion vector predictor candidates are not redundant by saving one of the motion vector predictor candidates determined to have the same motion vector value while deleting the remaining motion vector predictor candidates from the motion vector predictor list mvpListLX. Here, when the specified final candidate number finalNumMVPCand is 1, the present redundancy determination process may be omitted.

The motion vector predictor candidate number limiting unit 124 counts the number of motion vector predictor candidates added to the motion vector predictor list mvpListLX of LX, and sets the counted motion vector predictor candidate number as a value of the candidate number obtained by counting the motion vector predictor candidate number numMVPCandLX of LX.

Further, the motion vector predictor candidate number limiting unit 124 limits the motion vector predictor candidate number numMVPCandLX of LX added to the motion vector predictor list mvpListLX of LX to the final candidate number finalNumMVPCand specified according to the size of the prediction block.

In the present embodiment, the final candidate number finalNumMVPCand is specified according to the size of a prediction block. This is because when the number of motion vector predictor candidates added to the motion vector predictor list varies according to construction state of the motion vector predictor list, it is difficult to perform entropy decoding on the motion vector predictor index unless the motion vector predictor list is constructed at the decoding side. Further, when the entropy decoding depends on the construction state of the motion vector predictor list including the motion vector predictor candidate mvLXCol derived from a prediction block of a picture of a different time, there is a problem in that when an error occurs when a bitstream of another picture is decoded, it is difficult to normally continue entropy decoding on a bitstream of a current picture due to influence of the error. When a fixed number is specified as the final candidate number finalNum-MVPCand according to the size of a prediction block, it is possible to perform entropy decoding on the motion vector predictor index independently of construction of the motion vector predictor list, and even when an error occurs when a bitstream of another picture is decoded, it is possible to continue entropy decoding on a bitstream of a current picture without influence of the error.

When the motion vector predictor candidate number numMVPCandLX of LX is smaller than the specified final candidate number finalNumMVPCand, the motion vector predictor candidate number limiting unit 124 limits the motion vector predictor candidate number to the specified value by adding the motion vector having the value of (0, 0) (both horizontal and vertical components are 0) to the motion vector predictor list mvpListLX until the motion vector predictor candidate number numMVPCandLX is equal to the final candidate number finalNumMVPCand. In this case, the motion vector having the value of (0, 0) may be redundantly added, but the decoding side can decide the motion vector predictor regardless of a value which the motion vector predictor index has within a range of from 0 (to a specified candidate number−1). However, when the motion vector predictor candidate number numMVPCandLX of LX is larger than the specified final candidate number finalNumMVPCand, the motion vector predictor candidate number is limited to the specified value by deleting all elements added to an index larger than finalNumMVPCand-1 from the motion vector predictor list mvpListLX and causing the motion vector predictor candidate number numMVPCandLX of LX to be equal to the final candidate number finalNumMVPCand. The updated motion vector predictor list mvpListLX is supplied to the motion vector predictor candidate coding amount derivation unit 125 and the motion vector predictor selecting unit 126.

Meanwhile, the motion vector estimating unit 102 of FIG. 1 detects the motion vector mvLX of LX (X=0 or 1) for each prediction block. The motion vector mvLX is supplied to the motion vector predictor candidate coding amount derivation unit 125 together with the motion vector predictor candidate of the updated motion vector predictor list mvpListLX.

The motion vector predictor candidate coding amount derivation unit 125 derives the motion vector difference with the motion vector mvLX for each of the motion vector predictor candidates mvpListLX[i] stored in the motion vector predictor list mvpListLX of LX (X=0 or 1), derives the coding amount necessary to code the motion vector difference, and supplies the derived coding amount to the motion vector predictor selecting unit 126.

The motion vector predictor selecting unit 126 selects the motion vector predictor candidate mvpListLX[i] that is smallest in the coding amount of each motion vector predictor candidate among the elements added to the motion vector predictor list mvpListLX of LX as the motion vector predictor mvpLX of LX. When there are a plurality of motion vector predictor candidates which are smallest in the generated coding amount in the motion vector predictor list mvpListLX, the motion vector predictor candidate mvpListLX[i] represented by an index i having the smallest number in the motion vector predictor list mvpListLX is selected as the optimal motion vector predictor mvpLX of LX. The selected motion vector predictor mvpLX is supplied to the motion vector subtracting unit 127. Further, the index i in the motion vector predictor list corresponding to the selected motion vector predictor mvpLX is output as the motion vector predictor index mvpIdxLX of LX.

Finally, the motion vector subtracting unit 127 derives the motion vector difference mvdLX of LX by subtracting the selected motion vector predictor mvpLX of LX from the motion vector mvLX of LX, and outputs the motion vector difference mvdLX.

$$mvdLX=mvLX-mvpLX$$

Referring back to FIG. 1, the motion compensation predicting unit 105 obtains the prediction picture signal by performing motion compensation according to the motion vector mvLX of LX (X=0 or 1) supplied from the motion vector estimating unit 102 with reference to the picture signal of the decoded picture stored in the decoded picture memory 115, and supplies the prediction picture signal to the prediction method deciding unit 106.

The prediction method deciding unit 106 decides the prediction method. The coding amount and coding distortion are derived for each prediction mode, and a prediction block size and a prediction mode which are smallest in the generated coding amount and the coding distortion are decided. The motion vector difference mvdLX of LX supplied from the motion vector subtracting unit 127 of the motion vector difference derivation unit 103 and the motion vector predictor index mvpIdxLX of LX representing the motion vector predictor supplied from the motion vector predictor selecting unit 126 are coded, and the coding amount of motion information is derived. Further, the coding amount of the prediction residual signal obtained by coding the prediction residual signal between the prediction picture signal supplied from the motion compensation predicting unit 105 and the coding target picture signal supplied from the picture memory 101 is derived. A total generated coding amount is derived by adding the coding amount of the motion information to the coding amount of the prediction residual signal, and used as a first evaluation value.

Further, after the prediction residual signal is coded, the prediction residual signal is decoded in order to evaluate the distortion amount, and coding distortion is derived as a ratio representing an error with an original picture signal occurring due to coding. The total generated coding amount is compared with the coding distortion each time motion compensation is performed, and a prediction block size and a prediction mode which are smallest in the generated coding amount and the coding distortion are decided. The above-described motion vector prediction method is performed on the motion vector mvLX according to the decided prediction mode of the prediction block size, and the index mvpIdxLX representing the motion vector predictor is coded as the syntax element mvp_idx_lX[i] represented by a second syntax pattern of a prediction block unit. Here, the derived generated coding amount is preferably obtained by simulating the coding process, but may be obtained by approximation or estimation.

(Prediction of Motion Vector in Decoding)

An operation of the motion vector prediction method according to the present invention in the moving picture decoding device that decodes a bitstream of a coded moving picture based on the above-described syntax will be described.

Figure 14:
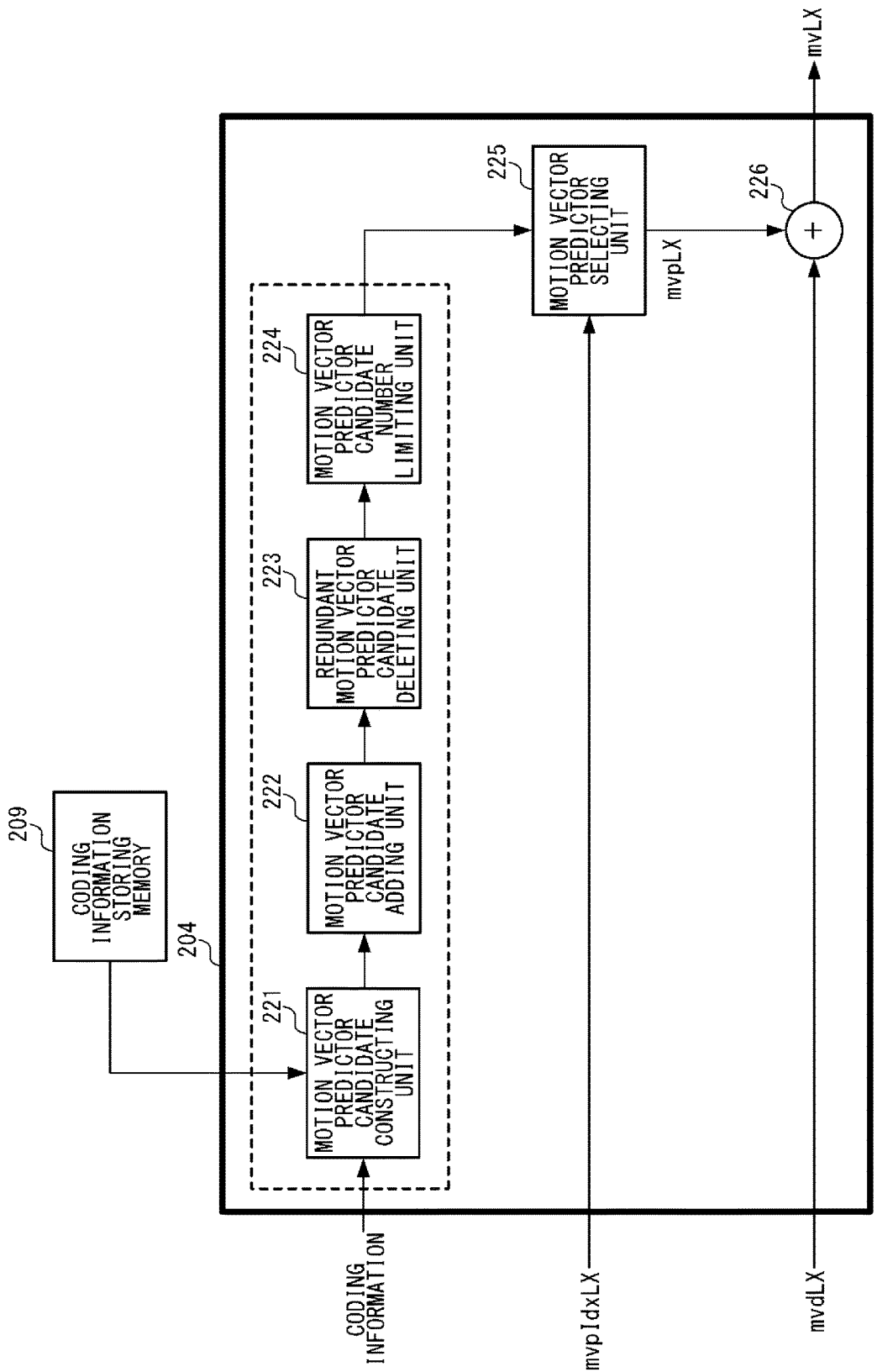
FIG. 14 is a block diagram illustrating a detailed configuration of a motion vector derivation unit of FIG. 2.

When the motion vector prediction method according to the embodiment is performed, the process is performed by the motion vector derivation unit 204 of the moving picture decoding device of FIG. 2. FIG. 14 is a diagram illustrating a detailed configuration of the motion vector derivation unit 204 of the moving picture decoding device of FIG. 2 corresponding to the moving picture coding device according to the embodiment. A portion surrounded by a bold frame line of FIG. 14 illustrates the motion vector derivation unit 204. Further, a portion surrounded by a bold dotted line thereinside illustrates an operating unit of the motion vector prediction method which will be described later, is similarly installed even in the corresponding moving picture coding device, and configured to obtain the same determination result that is consistent in coding and decoding. Next, the motion vector prediction method in decoding will be described with reference to the drawing.

In the present embodiment, due to the reason described at the coding side, similarly to the coding side, at the decoding side, the final candidate number finalNumMVPCand of the motion vector predictor is set according to the size of a prediction block of a decoding target. In the motion vector derivation unit 204, when the size of a prediction block of a brightness signal of a decoding target is smaller than or equal to the specified size sizePUNumMVPCand, finalNumMVPCand is set to a number smaller than the latter, and when the size of a prediction block of a brightness signal of a decoding target is neither smaller than nor equal to the specified size sizePUNumMVPCand, finalNumMVPCand is set to a number larger than the former. In the present embodiment, the specified size sizePUNumMVPCand is set to 8×8, and finalNumMVPCand is set to 1 when the size of a prediction block of a brightness signal of a decoding target is smaller than or equal to the specified size sizePUNumMVPCand and finalNumMVPCand is set to 2 in the other cases.

The motion vector derivation unit 204 includes a motion vector predictor candidate constructing unit 221, a motion vector predictor candidate adding unit 222, a redundant motion vector predictor candidate deleting unit 223, a motion vector predictor candidate number limiting unit 224, a motion vector predictor selecting unit 225, and a motion vector adding unit 226.

The motion vector derivation process of the motion vector derivation unit 204 derives the motion vector used in the inter prediction for each of L0 and L1. Specifically, in the case in which the prediction mode PredMode of the decoding target block is the inter prediction (MODE_INTER), when the inter prediction mode of the decoding target block is the L0 prediction (Pred_L0), the motion vector predictor list mvpListL0 of L0 is derived, the motion vector predictor mvpL0 is selected, and the motion vector mvL0 of L0 is derived. When the inter prediction mode of the decoding target block is the L1 prediction (Pred_L1), the motion vector predictor list mvpListL1 of L1 is derived, the motion vector predictor mvpL1 is selected, and the motion vector mvL1 of L1 is derived. When the inter prediction mode of the decoding target block is the bi-prediction (Pred_BI), both the L0 prediction and the L1 prediction are performed, the motion vector predictor list mvpListL0 of L0 is derived, the motion vector predictor mvpL0 of L0 is selected, and the motion vector mvL0 of L0 is derived, and further, the motion vector predictor list mvpListL1 of L1 is derived, the motion vector predictor mvpL1 of L1 is derived, and the motion vector mvL1 of L1 is derived.

Similarly to the coding side, the decoding side performs the motion vector derivation process on each of L0 and L1, but is a process common to L0 and L1. Thus, in the following description, L0 and L1 are represented as LX common thereto. In the process of deriving the motion vector of L0, X is 0, and in the process of deriving the motion vector of L1, X is 1. Further, when information of the other list other than LX is referred to during the process of deriving the motion vector of LX, the other list is represented as LY.

The motion vector predictor candidate constructing unit 221, the motion vector predictor candidate adding unit 222, the redundant motion vector predictor candidate deleting unit 223, and the motion vector predictor candidate number limiting unit 224 in the motion vector derivation unit 204 are configured to perform the same operation as the motion vector predictor candidate constructing unit 121, the motion vector predictor candidate adding unit 122 and the redundant motion vector predictor candidate deleting unit 123, and the motion vector predictor candidate number limiting unit 124 in the motion vector difference derivation unit 103 at the coding side, and thus the same motion vector predictor candidate which is consistent in coding and decoding can be obtained at the coding side and the decoding side.

The motion vector predictor candidate constructing unit 221 performs the same process as the motion vector predictor candidate constructing unit 121 of FIG. 13 at the coding side. Motion vectors of a decoded prediction block neighboring a decoding target block in the same picture as the decoding target block and a decoded prediction block or the like present at the same position as or the position nearby a decoding target block in a different picture which are decoded and stored in the coding information storing memory 209 are read from the coding information storing memory 209. The motion vector predictor candidates mvLXA, mvLXB, and mvLXCol are constructed for each prediction block group from motion vectors of decoded other blocks read from the coding information storing memory 209 and then supplied to the motion vector predictor candidate adding unit 222.

The motion vector predictor candidates mvLXA, mvLXB, and mvLXCol may be derived by scaling according to a reference index. Further, since the motion vector predictor candidate constructing unit 221 performs the same process as the motion vector predictor candidate constructing unit 121 of FIG. 13 at the coding side, the condition determination of the scan methods 1, 2, 3, 4, and 5 for deriving the motion vector predictor which is described for the motion vector predictor candidate constructing unit 121 of FIG. 13 at the coding side can be applied to the motion vector predictor candidate constructing unit 221, and thus a detailed description thereof is omitted.

Then, the motion vector predictor candidate adding unit 222 performs the same process as the motion vector predictor candidate adding unit 122 of FIG. 13 at the coding side. The derived motion vector predictor candidates mvLXA, mvLXB, and mvLXCol are stored in the motion vector predictor list mvpListLX of LX.

Then, the redundant motion vector predictor candidate deleting unit 223 performs the same process as the redundant motion vector predictor candidate deleting unit 123 of FIG. 13 at the coding side. The motion vector predictor candidates having the same motion vector value are determined from among the motion vector predictor candidates stored in the motion vector predictor list mvpListLX of LX, and the motion vector predictor list mvpListLX is updated so that the motion vector predictor candidates are not redundant by saving one of the motion vector predictor candidates determined to have the same motion vector value while deleting the remaining motion vector predictor candidates from the motion vector predictor list mvpListLX. Here, when the specified final candidate number finalNumMVPCand is 1, the present redundancy determination process may be omitted.

Then, the motion vector predictor candidate number limiting unit 224 performs the same process as the motion vector predictor candidate number limiting unit 124 of FIG. 13 at the coding side. The motion vector predictor candidate number limiting unit 224 counts the number of elements added to the motion vector predictor list mvpListLX, and sets the counted number as a value of the candidate number obtained by counting the motion vector predictor candidate number numMVPCandLX of LX.

Further, due to the reason described at the coding side, the motion vector predictor candidate number limiting unit 224 limits the motion vector predictor candidate number numMVPCandLX of LX added to the motion vector predictor list mvpListLX to the final candidate number finalNumMVPCand specified according to the size of the prediction block. When the motion vector predictor candidate number numMVPCandLX of LX is smaller than the specified final candidate number finalNumMVPCand, the motion vector predictor candidate number is limited to the specified value by adding the motion vector having the value of (0, 0) to the motion vector predictor list mvpListLX until the motion vector predictor candidate number numMVPCandLX is equal to the final candidate number finalNumMVPCand. In this case, the motion vector having the value of (0, 0) may be redundantly added, but the decoding side can decide the motion vector predictor regardless of a value which the motion vector predictor index has within a range of 0 to a specified value −1. However, when the motion vector predictor candidate number numMVPCandLX of LX is larger than the specified final candidate number finalNumMVPCand, the motion vector predictor candidate number is limited to the specified value by deleting all elements added to an index larger than finalNumMVPCand-1 from the motion vector predictor list mvpListLX and causing the motion vector predictor candidate number numMVPCandLX of LX to be equal to the final candidate number finalNumMVPCand. The updated motion vector predictor list mvpListLX is supplied to the motion vector predictor selecting unit 225.

Meanwhile, the motion vector difference mvdLX of LX (X=0 or 1) of each prediction block decoded by the first bitstream decoding unit 202 is supplied to the motion vector adding unit 226. The motion vector predictor index mvpIdxLX of the motion vector predictor of LX decoded by the first bitstream decoding unit 202 is supplied to the motion vector predictor selecting unit 225. Here, when the specified final candidate number finalNumMVPCand is 1, the motion vector predictor index mvpIdxLX of the motion vector predictor of LX is neither coded nor supplied to the motion vector predictor selecting unit 225.

The motion vector predictor selecting unit 225 is supplied with the motion vector predictor index mvpIdxLX of LX decoded by the first bitstream decoding unit 202, and extracts the motion vector predictor candidate mvpListLX [mvpIdxLX] corresponding to the supplied index mvpIdxLX from the motion vector predictor list mvpListLX as the motion vector predictor mvpLX of LX. Here, when the specified final candidate number finalNumMVPCand is 1, a single motion vector predictor candidate mvpListLX[0] in which the index i of the motion vector predictor list mvpListLX is added to 0 is extracted. The supplied motion vector predictor candidate is supplied to the motion vector adding unit 226 as the motion vector predictor mvpLX.

Finally, the motion vector adding unit 226 derives the motion vector mv of LX by adding the motion vector difference mvdLX of LX decoded and supplied by the first bitstream decoding unit 202 to the motion vector predictor mvpLX of LX, and outputs the motion vector mvLX.

$$mvLX=mvpLX+mvdLX$$

As described above, the motion vector mvLX of LX is derived for each prediction block. A prediction picture signal is constructed by the motion compensation using the motion vector, and a decoded picture signal is constructed by adding the prediction picture signal to the decoded prediction residual signal.

Figure 15:
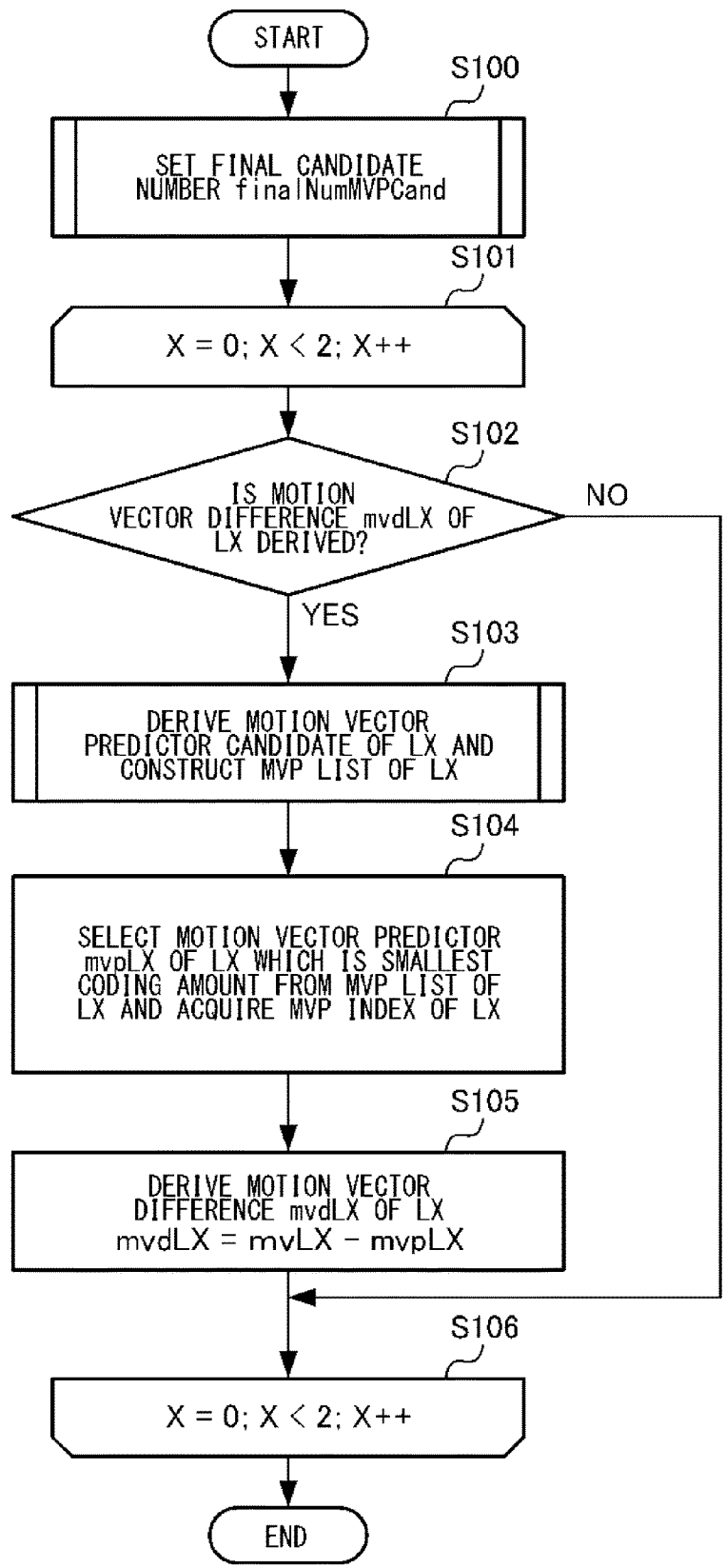
FIG. 15 is a flowchart illustrating a motion vector difference derivation process procedure of the motion vector difference derivation unit of FIG. 1.
Figure 16:
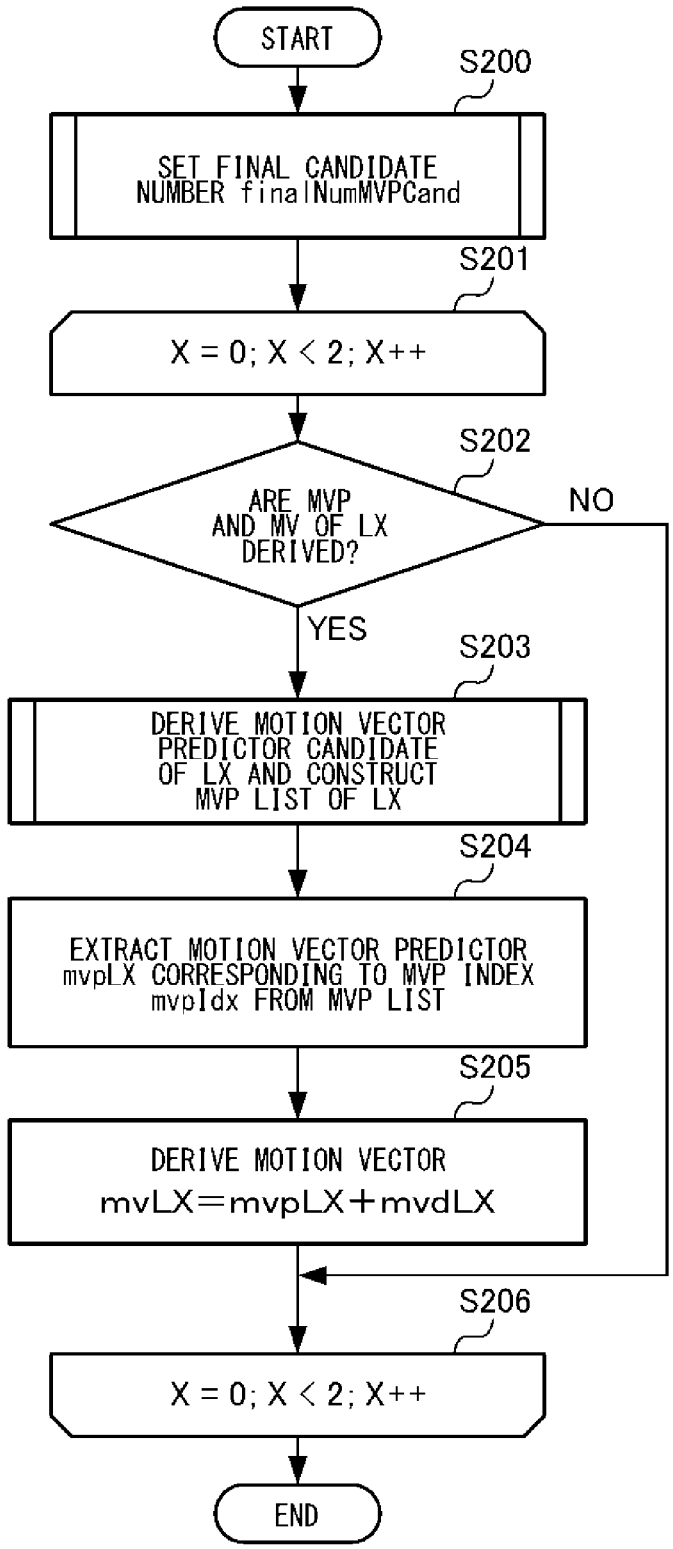
FIG. 16 is a flowchart illustrating a motion vector derivation process procedure of the motion vector derivation unit of FIG. 2.

The process procedures of the motion vector difference derivation unit 103 of the moving picture coding device and the motion vector derivation unit 204 of the moving picture decoding device will be described with reference to flow-charts of FIGS. 15 and 16. FIG. 15 is a flowchart illustrating a motion vector difference derivation process procedure performed by the moving picture coding device, and FIG. 16 is a flowchart illustrating a motion vector derivation process procedure performed by the moving picture decoding device.

The motion vector difference derivation process procedure at the coding side will be described with reference to FIG. 15. At the coding side, first, the motion vector difference derivation unit 103 sets the final candidate number finalNumMVCand of the motion vector predictor candidates (S100). A detailed process procedure of step S100 will be described later with reference to a flowchart of FIG. 17.

Then, the motion vector difference derivation unit 103 derives the motion vector difference of the motion vector used in the inter prediction selected in the coding target block for each of L0 and L1 (S101 to S106). Specifically, in the case in which the prediction mode PredMode of the coding target block is the inter prediction (MODE_INTER), when the inter prediction mode is the L0 prediction (Pred_L0), the motion vector predictor list mvpListL0 of L0 is derived, the motion vector predictor mvpL0 is selected, the motion vector difference mvdL0 of the motion vector mvL0 of L0 is derived. When the inter prediction mode of the coding target block is the L1 prediction (Pred_L1), the motion vector predictor list mvpListL1 of L1 is derived, the motion vector predictor mvpL1 is selected, and the motion vector difference mvdL1 of the motion vector mvL1 of L1 is derived. When the inter prediction mode of the coding target block is the bi-prediction (Pred_BI), both the L0 prediction and the L1 prediction are performed, the motion vector predictor list mvpListL0 of L0 is derived, the motion vector predictor mvpL0 of L0 is selected, and the motion vector difference mvdL0 of the motion vector mvL0 of L0 is derived, and further the motion vector predictor list mvpListL1 of L1 is derived, the motion vector predictor mvpL1 of L1 is derived, and the motion vector difference mvdL1 of the motion vector mvL1 of L1 is derived.

The motion vector difference derivation process is performed on each of L0 and L1, but it is a process common to L0 and L1. Thus, in the following description, L0 and L1 are represented as LX common thereto. In the process of deriving the motion vector difference of L0, X is 0, and in the process of deriving the motion vector difference of L1, X is 1. Further, when information of the other list other than LX is referred to during the process of deriving the motion vector difference of LX, the other list is represented as LY.

When the motion vector difference mvdLX of LX is derived (YES in S102), the motion vector predictor candidate of LX is derived to construct the motion vector predictor list mvpListLX of LX (S103). In the motion vector difference derivation unit 103, the motion vector predictor candidate constructing unit 121 derives a plurality of motion vector predictor candidates, the motion vector predictor candidate adding unit 122 adds the derived motion vector predictor candidate to the motion vector predictor list mvpListLX, the redundant motion vector predictor candidate deleting unit 123 deletes an unnecessary motion vector predictor candidate, and the motion vector predictor candidate number limiting unit 124 sets the motion vector predictor candidate number numMVPCandLX of LX added to the motion vector predictor list mvpListLX, limits the motion vector predictor candidate number numMVPCandLX of LX added to the motion vector predictor list mvpListLX to the specified final candidate number finalNumMVPCand, and constructs the motion vector predictor list mvpListLX. A detailed process procedure of step S103 will be described later with reference to a flowchart of FIG. 18.

Then, the motion vector predictor candidate coding amount derivation unit 125 and the motion vector predictor selecting unit 126 select the motion vector predictor mvpLX of LX from the motion vector predictor list mvpListLX of LX (S104). First, the motion vector predictor candidate coding amount derivation unit 125 derives each motion vector difference that is a difference between the motion vector mvLX and each motion vector predictor candidate mvpListLX[i] stored in the motion vector predictor list mvpListLX, and derives the coding amount when the motion vector difference is coded for each element of the motion vector predictor list mvpListLX, and the motion vector predictor selecting unit 126 selects the motion vector predictor candidate mvpListLX[i] which is smallest in the coding amount of each the motion vector predictor candidate from among the elements added to the motion vector predictor list mvpListLX as the motion vector predictor mvpLX. When there are a plurality of motion vector predictor candidates which are smallest in the generated coding amount in the motion vector predictor list mvpListLX, the motion vector predictor candidate mvpListLX[i] represented by an index i having a small number in the motion vector predictor list mvpListLX is selected as the optimal the motion vector predictor mvpLX of LX.

Then, the motion vector subtracting unit 127 derives the motion vector difference mvdLX of LX by subtracting the selected motion vector predictor mvpLX of LX from the motion vector mvLX of LX (S105).

$$mvdLX = mvLX - mvpLX$$

Next, the motion vector derivation process procedure at the decoding side will be described with reference to FIG. 16. At the decoding side, the motion vector derivation unit 204 derives the motion vector used in the inter prediction for each of L0 and L1 (S201 to S206). Specifically, in the case in which the prediction mode PredMode of the decoding target block is the inter prediction (MODE_INTER), when the inter prediction mode of the decoding target block is the L0 prediction (Pred_L0), the motion vector predictor list mvpListL0 of L0 is derived, the motion vector predictor mvpL0 is selected, and the motion vector mvL0 of L0 is derived. When the inter prediction mode of the decoding target block is the L1 prediction (Pred_L1), the motion vector predictor list mvpListL1 of L1 is derived, the motion vector predictor mvpL1 is selected, and the motion vector mvL1 of L1 is derived. When the inter prediction mode of the decoding target block is the bi-prediction (Pred_BI), both the L0 prediction and the L1 prediction are performed, the motion vector predictor list mvpListL0 of L0 is derived, the motion vector predictor mvpL0 of L0 is selected, and the motion vector mvL0 of L0 is derived, and further, the motion vector predictor list mvpListL1 of L1 is derived, the motion vector predictor mvpL1 of L1 is derived, and the motion vector mvL1 of L1 is derived.

Similarly to the coding side, the decoding side performs the motion vector derivation process for each of L0 and L1, but it is a process common to L0 and L1. Thus, in the following description, L0 and L1 are represented as LX common thereto. In the process of deriving the motion vector of L0, X is 0, and in the process of deriving the motion vector of L1, X is 1. Further, when information of the other list other than LX is referred to during the process of deriving the motion vector of LX, the other list is represented as LY.

When the motion vector mvLX of LX is derived (YES in S202), the motion vector predictor candidate of LX is derived to construct the motion vector predictor list mvpListLX of LX (S203). In the motion vector derivation unit 204, the motion vector predictor candidate constructing unit 221 derives a plurality of motion vector predictor candidates, the motion vector predictor candidate adding unit 222 adds the derived motion vector predictor candidate to the motion vector predictor list mvpListLX, the redundant motion vector predictor candidate deleting unit 223 deletes an unnecessary motion vector predictor candidate, the motion vector predictor candidate number limiting unit 224 sets the motion vector predictor candidate number numMVPCandLX of LX added to the motion vector predictor list mvpListLX, limits the motion vector predictor candidate number numMVPCandLX of LX added to the motion vector predictor list mvpListLX to the specified final candidate number finalNumMVPCand, and constructs the motion vector predictor list mvpListLX. A detailed process procedure of step S203 will be described later with reference to a flowchart of FIG. 18.

Then, the motion vector predictor selecting unit 225 extracts the motion vector predictor candidate mvpListLX[mvpIdxLX] corresponding to the motion vector predictor index mvpIdxLX decoded by the first bitstream decoding unit 202 from the motion vector predictor list mvpListLX as the selected motion vector predictor mvpLX (S204). Here, when the maximum candidate number finalNumCandLX is 1, a single motion vector predictor candidate mvpListLX[0] added to the motion vector predictor list mvpListLX is extracted as the selected motion vector predictor mvpLX.

Then, the motion vector adding unit 226 derives the motion vector mvLX of LX by adding the motion vector difference mvdLX of LX decoded and supplied by the first bitstream decoding unit 202 to the motion vector predictor mvpLX of LX (S205 of FIG. 16).

$$mvLX = mvpLX + mvdLX$$

Next, a process of setting the final candidate number of the motion vector predictor which is common to S100 of FIG. 15 and S200 of FIG. 16 will be described in detail.

Figure 17:
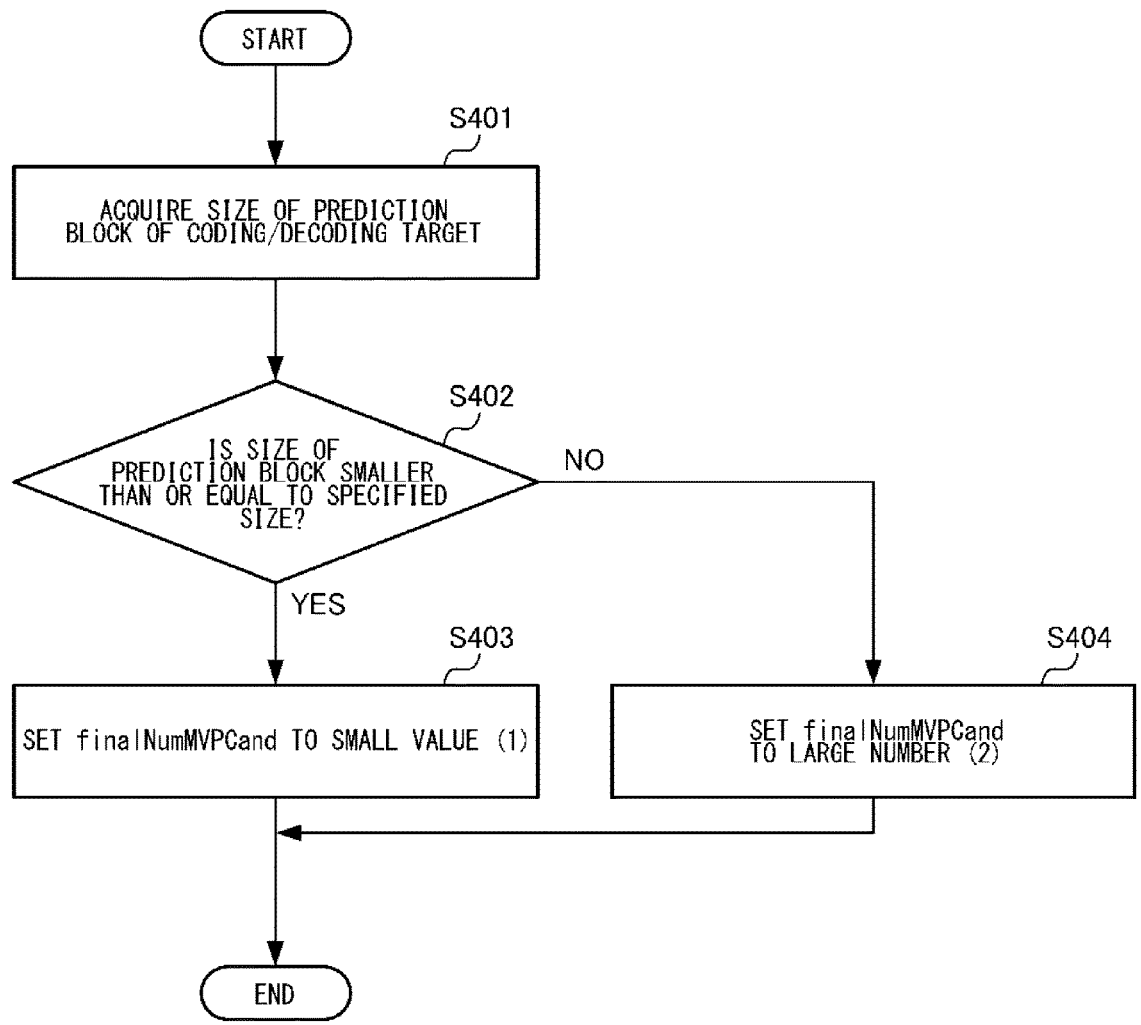
FIG. 17 is a flowchart illustrating a process procedure of setting a final candidate number of a motion vector predictor.

The motion vector predictor candidate number limiting unit 124 and the motion vector predictor candidate number limiting unit 224 set the final candidate number finalNumMVPCand of the motion vector predictor according to the size of the prediction block of the coding or decoding target FIG. 17 is a flowchart illustrating the process procedure of setting the final candidate number of the motion vector predictor.

First, the size of the prediction block of the coding or decoding target is acquired (S401). When the size of the prediction block of the coding or decoding target is smaller than or equal to the specified size sizePUNumMVPCand (YES in S402), finalNumMVPCand is set to a number smaller than the latter (S403), and when the size of the prediction block of the coding or decoding target is neither smaller than nor equal to the specified size sizePUNumMVPCand, finalNumMVPCand is set to a number larger than the former (S404). In the present embodiment, the specified size sizePUNumMVPCand is set to 8×8, and finalNumMVPCand is set to 1 when the size of the prediction block of the brightness signal of the coding or decoding target is smaller than or equal to the specified size sizePUNumMVPCand and finalNumMVPCand is set to 2 in the other cases. Further, the specified size sizePUNumMVPCand may be a fixed value or may be set by preparing a syntax element in units of sequences, pictures, or slices. Further, sizes in which values obtained by multiplying the width by the height are equal to each other such as 8×4 and 4×8 are regarded as the same size. In other words, when the specified size sizePUNumMVPCand is set to 8×4, 4×8 is regarded to be set as well. Further, when it is determined in step S402 that the size of the prediction block of the coding or decoding target is less than the specified size sizePUNumMVPCand, finalNumMVPCand may be set to a number smaller than the latter, and when it is determined in step S402 that the size of the prediction block of the coding or decoding target is larger than or equal to the specified size sizePUNumMVPCand, finalNumMVPCand may be set to a number larger than the former.

Next, a process procedure of deriving the motion vector predictor candidate and constructing the motion vector predictor list which is common to S103 of FIG. 15 and S203 of FIG. 16 will be described with reference to a flowchart of FIG. 18.

(Motion Vector Prediction Method)

Figure 18:
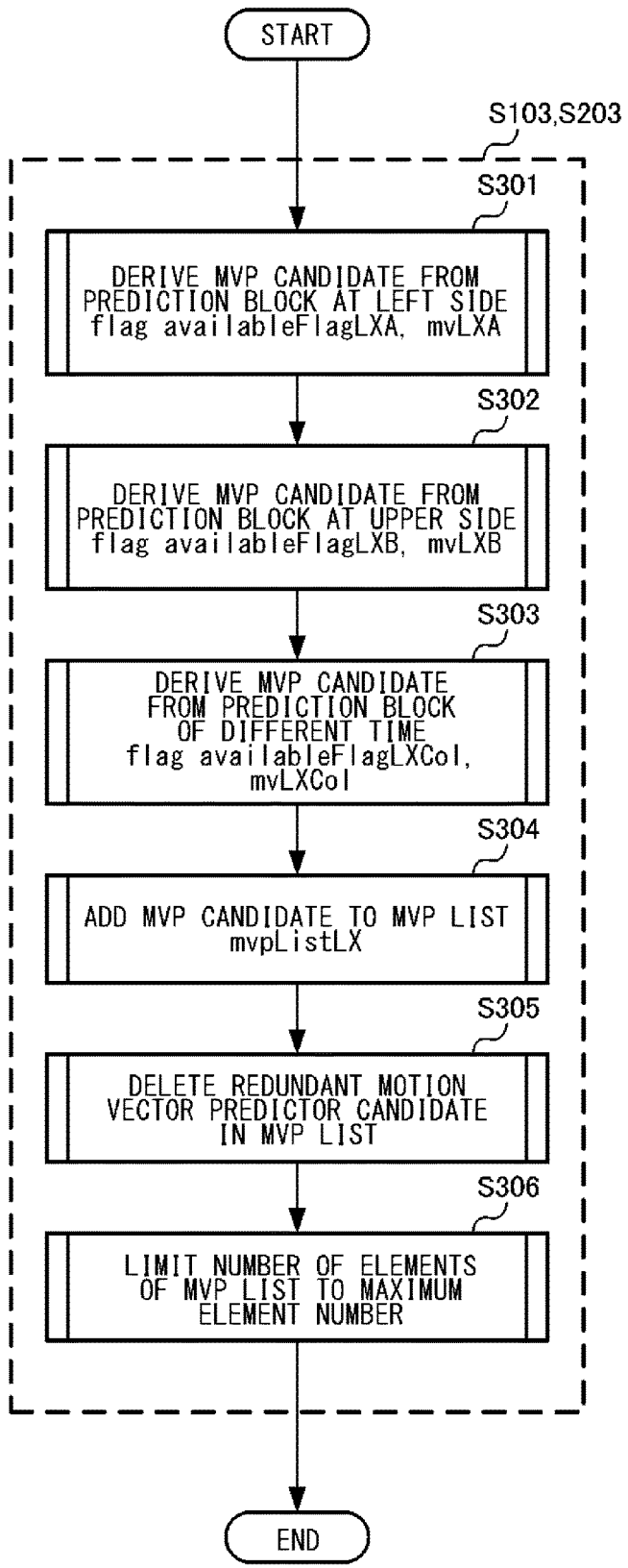
FIG. 18 is a flowchart illustrating a process procedure of deriving a motion vector predictor candidate and constructing a motion vector predictor list.

FIG. 18 is a flowchart illustrating the process procedure of the motion vector predictor candidate constructing units 121 and 221, the motion vector predictor candidate adding units 122 and 222, the motion vector predictor redundancy candidate deleting units 123 and 223, and the motion vector predictor candidate number limiting units 124 and 224 which have the common function in the motion vector difference derivation unit 103 of the moving picture coding device and the motion vector derivation unit 204 of the moving picture decoding device.

The motion vector predictor candidate constructing unit 121 and 221 derive a motion vector predictor candidate from a prediction block neighboring the left side, and derive a flag availableFlagLXA representing whether the motion vector predictor candidate of the prediction block neighboring the left side can be used, a motion vector mvLXA, a reference index refIdxA, and a list ListA (S301 of FIG. 18). Further, in case of L0, X is 0, and in case of L1, X is 1 (the same applies hereinafter). Then, the motion vector predictor candidate constructing units 121 and 221 derive a motion vector predictor candidate from a prediction block neighboring the upper side, and derive a flag availableFlagLXB representing whether the motion vector predictor candidate of the prediction block neighboring the upper side can be used, a motion vector mvLXB, a reference index refIdxB, and a list ListB (S302 of FIG. 18). Steps S301 and S302 of FIG. 18 are a common process except that the position of the neighboring block to be referred to and the number of the neighboring blocks are different, and the common derivation process procedure of deriving a flag availableFlagLXN representing whether the motion vector predictor candidate of the prediction block can be used, a motion vector mvLXN, a reference index refIdxN, and ListN (N is A or B, and the same applies hereinafter) will be described later in detail with reference to flowcharts of FIGS. 19 to 23.

Then, the motion vector predictor candidate constructing units 121 and 221 derive a motion vector predictor candidate from a prediction block of a picture of a different time, and derive a flag availableFlagLXCol representing whether the motion vector predictor candidate of the prediction block of the picture of the different time can be used, a motion vector mvLXCol, a reference index refIdxCol, and a list ListCol (S303 of FIG. 18). The derivation process procedure of step S303 will be described later in detail with reference to flowcharts of FIGS. 24 to 30.

Then, the motion vector predictor candidate adding units 122 and 222 construct the motion vector predictor list mvpListLX, and adds vector predictor candidates mvLXA, mvLXB, and mvLXCol of LX (S304 of FIG. 18). The addition process procedure of step S304 will be described later in detail with reference to a flowchart of FIG. 31.

Then, when a plurality of motion vector candidates have the same value or values close to each other in the motion vector predictor list mvpListLX, the motion vector predictor redundancy candidate deleting units 123 and 223 determine the motion vector candidates as the redundant motion vector candidate, and delete the redundant motion vector candidates except the motion vector candidate having the lowest order, that is, having the smallest index i (S305 of FIG. 18). The deletion process procedure of step S305 will be described later in detail with reference to a flowchart of FIG. 32.

Then, the motion vector predictor candidate number limiting units 124 and 224 count the number of elements added to the motion vector predictor list mvpListLX, set the number as the motion vector predictor candidate number numMVPCandLX of LX, and limit the motion vector predictor candidate number numMVPCandLX of LX added to the motion vector predictor list mvpListLX to the specified final candidate number finalNumMVPCand (S306 of FIG. 18). The limiting process procedure of step S306 will be described later in detail with reference to a flowchart of FIG. 33.

A process of deriving the motion vector predictor candidates from the prediction blocks neighboring the left side and the upper side in steps S301 and S302 of FIG. 18 will be described in detail.

The motion vector predictor candidates are derived from neighboring prediction blocks neighboring a prediction block (a prediction block of a processing target in FIGS. 5, 6, 7, and 8) defined to perform motion compensation on the coding block inside in the same picture as illustrated in FIGS. 5, 6, 7, and 8.

The motion vector predictor candidate is selected from each of a prediction block group A including a prediction block Ak (k=0, 1), that is, A0 and A1, neighboring the left side of the prediction block of the processing target and a prediction block group B including a prediction block Bk (k=0, 1, 2), that is, B0, B1, and B2, neighboring the upper side thereof.

Figure 19:
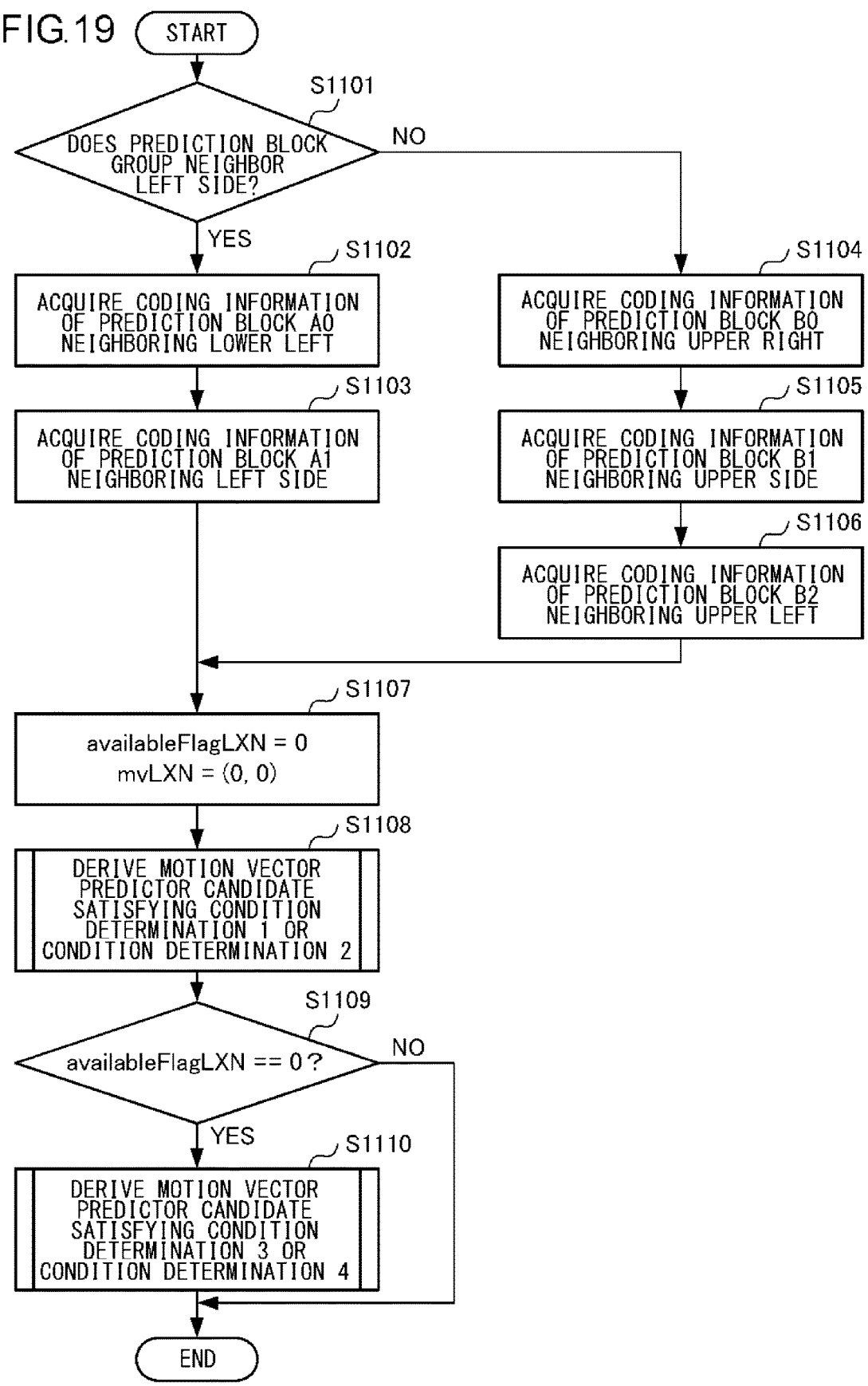
FIG. 19 is a flowchart illustrating a motion vector predictor candidate derivation process procedure.

Next, a method of deriving the motion vector predictor candidate from a prediction block group N neighboring the left side and the upper side which is the process procedure of steps S301 and S302 of FIG. 18 will be described. FIG. 19 is a flowchart illustrating the process procedure of deriving the motion vector predictor candidate in S301 and S302 of FIG. 18 by the scan method 1. 0 or 1 representing a reference list is input as a suffix X, and A (the left side) or B (the upper side) representing a region of a neighboring prediction block group is input as N.

In order to derive the motion vector predictor candidate from the prediction block at the left side (S301 of FIG. 18), A is set as N in FIG. 19, and in order to derive the motion vector predictor candidate from the prediction blocks A0 and A1 neighboring the left side of the prediction block of the coding or decoding target and derive the motion vector predictor candidate from the prediction block at the upper side (S302 of FIG. 18), B is set as N in FIG. 19, and the motion vector predictor candidates are derived from the prediction blocks B0, B1, and B2 neighboring the upper side in the following procedure.

First, the prediction block neighboring the prediction block of the coding or decoding target is specified, and when each prediction block Nk (k=0, 1, 2, and here, 2 is used only for the prediction block group at the upper side) can be used, the coding information stored in the coding information storing memory 114 or the coding information storing memory 209 is derived. Here, examples of the coding information of the neighboring prediction block Nk to be derived include a prediction mode PredMode, a flag predFlagLX [xNk][yNk] representing whether LX is used, a reference index refIdxLX [xNk][yNk] of LX, and a motion vector mvLX [xNk][yNk] of LX. When the prediction block group (N=A) neighbors the left side of the prediction block of the coding or decoding target (YES in S1101), coding information specifying the prediction block A0 neighboring the lower left and the prediction block A1 neighboring the left is derived (S1102 and S1103), and when the prediction block group (N=B) neighbors the upper side of the prediction block of the coding or decoding target (NO in S1101), coding information specifying the prediction block B0 neighboring the upper right, the prediction block B1 neighboring the upper side, and the prediction block B2 neighboring the upper left is derived (S1104, S1105, and S1106). Further, the neighboring prediction block Nk is positioned inside the slice including the prediction block of the coding or decoding target, it is possible to use the neighboring prediction block Nk, and when the neighboring prediction block Nk is positioned outside the slice, it is difficult to use the neighboring prediction block Nk.

Then, a flag availableFlagLXN representing whether the motion vector predictor is selected from the prediction block group N is set to 0, and a motion vector mvLXN representing a prediction block group N is set to (0, 0) (S1107).

Then, the motion vector predictor candidate satisfying the condition determination 1 or the condition determination 2 is derived (S1108). Among the neighboring prediction blocks N0, N1, and N2 (N2 is used only for the prediction block group B neighboring the upper side) of the prediction block group N (N is A or B), a prediction block having a motion vector of the same reference picture is searched for through the same reference list LX as the reference list LX set as a current target in the prediction block of the coding or decoding target or the reference list LY (Y=!X: when a reference list set as a current target is L0, the opposite reference list is L1, and when a reference list set as a current target is L1, the opposite reference list is L0) opposite to the reference list LX set as a current target in the prediction block of the coding or decoding target, and the corresponding motion vector is used as the motion vector predictor candidate.

Figure 20:
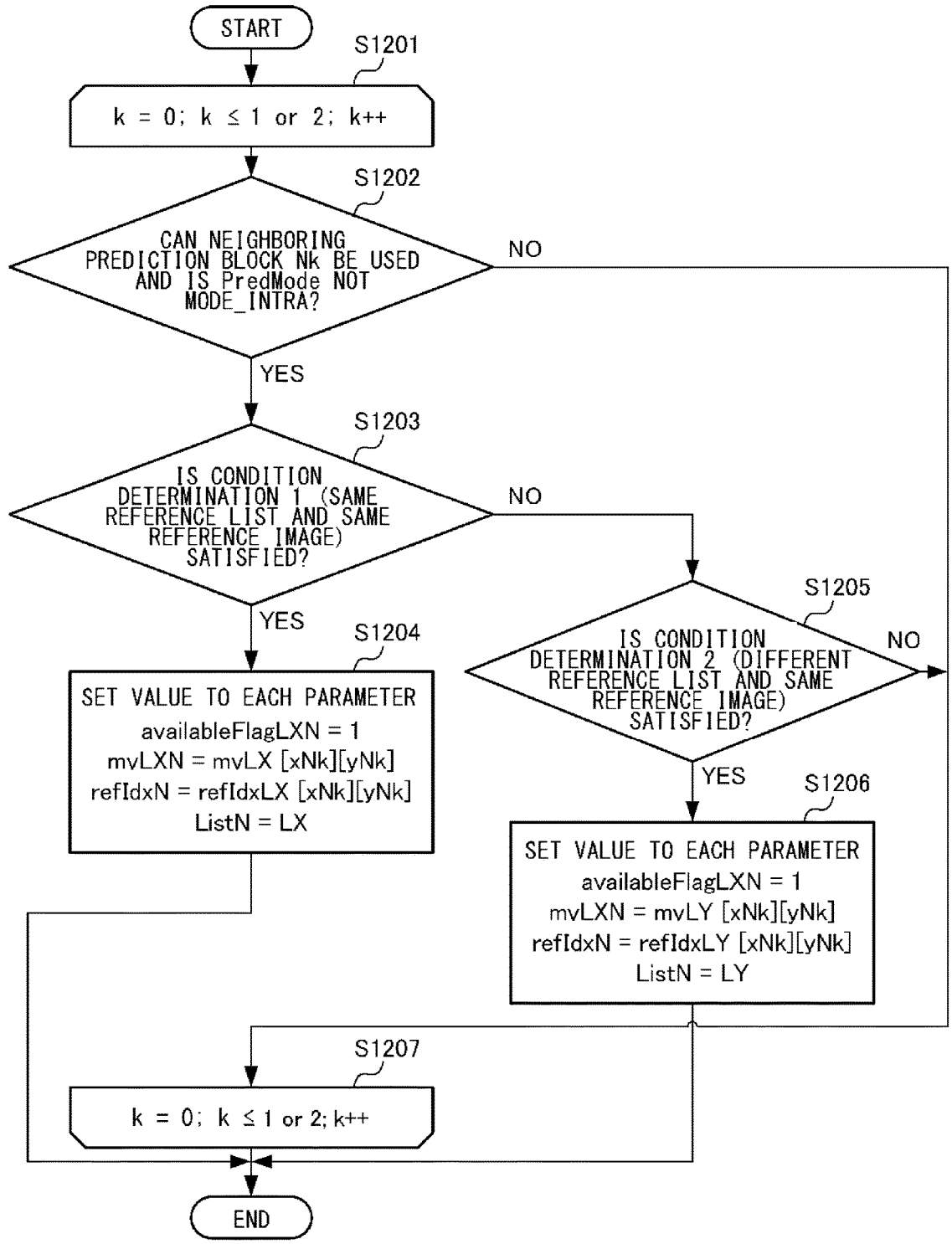
FIG. 20 is a flowchart illustrating a motion vector predictor candidate derivation process procedure.

FIG. 20 is a flowchart illustrating the derivation process procedure of step S1108 of FIG. 19. The following process is performed on the neighboring prediction block Nk (k=0, 1, 2, and here, 2 is used only for the prediction block group neighboring the upper side) in the order of 0, 1, and 2 which are k (S1201 to S1207). The following process is performed in the order of A0 and A1 from top to bottom when N is A, and performed in the order of B0, B1, and B2 from the right to the left when N is B.

When the neighboring prediction block Nk can be used and the prediction mode PredMode of the prediction block Nk is not the intra (MODE_INTRA) (YES in S1202), the condition determination of the condition determination 1 is performed (S1203). When the flag predFlagLX [xNk][yNk] representing whether LX of the neighboring prediction block Nk is used is 1, that is, the inter prediction is performed on the neighboring prediction block Nk using the same motion vector of LX as the derivation target, and the reference index refIdxLX[xNk][yNk] of LX of the neighboring prediction block Nk is identical to the index refIdxLX of the prediction block of the processing target, that is, the inter prediction is performed on the neighboring prediction block Nk using the same reference picture in the LX prediction (YES in S1203), the process proceeds to step S1204, and otherwise (NO in S1203), the condition determination of step S1205 is performed.

When the determination result of step S1203 is YES, the flag availableFlagLXN is set to 1, the motion vector predictor mvLXN of the prediction block group N is set to the same value of the motion vector mvLX[xNk][yNk] of LX of the neighboring prediction block Nk, the reference index refIdxN of the prediction block group N is set to the same value as the reference index refIdxLX[xNk][yNk] of LX of the neighboring prediction block Nk, and the reference list ListN of the prediction block group N is set to LX (S1204), and the present motion vector predictor candidate derivation process ends.

However, when the determination result of step S1203 is NO, the condition determination of the condition determination 2 is performed (S1205). When the flag predFlagLY representing whether LY of the neighboring prediction block Nk is used is 1, that is, the inter prediction is performed on the neighboring prediction block Nk using the motion vector of LY different from the derivation target, and the POC of the reference picture of the reference list LY opposite to the reference list LX set as a current target in the neighboring prediction block Nk is identical to the POC of the reference picture of LX of the prediction block of the processing target, that is, the inter prediction is performed on the neighboring prediction block Nk using the same reference picture in the LY prediction (YES in S1205), the process proceeds to step S1206, and the flag availableFlagLXN is set to 1, the motion vector predictor mvLXN of the prediction block group N is set to the same value as the motion vector mvLY[xNk][yNk] of LY of the neighboring prediction block Nk, the reference index refIdxN of the prediction block group N is set to the same value of the reference index refIdxLY[xNk][yNk] of LY of the neighboring prediction block Nk, and the reference list ListN of the prediction block group N is set to LY (S1206), and then the present motion vector predictor candidate derivation process ends.

When the above conditions are not satisfied, that is, when the determination result of S1203 is NO or when the determination result of S1205 is NO, k is increased by 1, and then the process (S1201 to S1207) of the next neighboring prediction block is performed, and repeated until availableFlagLXN is 1 or the process of the neighboring block A1 or B2 ends.

Then, referring back to the flowchart of FIG. 19, when availableFlagLXN is 0 (YES in S1109), that is, when the motion vector predictor candidate is not derived in step S1108, the motion vector predictor candidate satisfying the condition determination 3 or the condition determination 4 is derived (S1110). Among the neighboring blocks N0, N1, and N2 (N2 is used only for the prediction block group B neighboring the upper side) of the prediction block group N (N is A or B), a prediction block having a motion vector of the same reference picture is searched for through the same reference list LX as the reference list LX set as a current target in the prediction block of the coding or decoding target or the reference list LY (Y=!X: when a reference list set as a current target is L0, the opposite reference list is L1, and when a reference list set as a current target is L1, the opposite reference list is L0) opposite to the reference list LX set as a current target in the prediction block of the coding or decoding target, and the corresponding motion vector is used as the motion vector predictor candidate.

Figure 21:
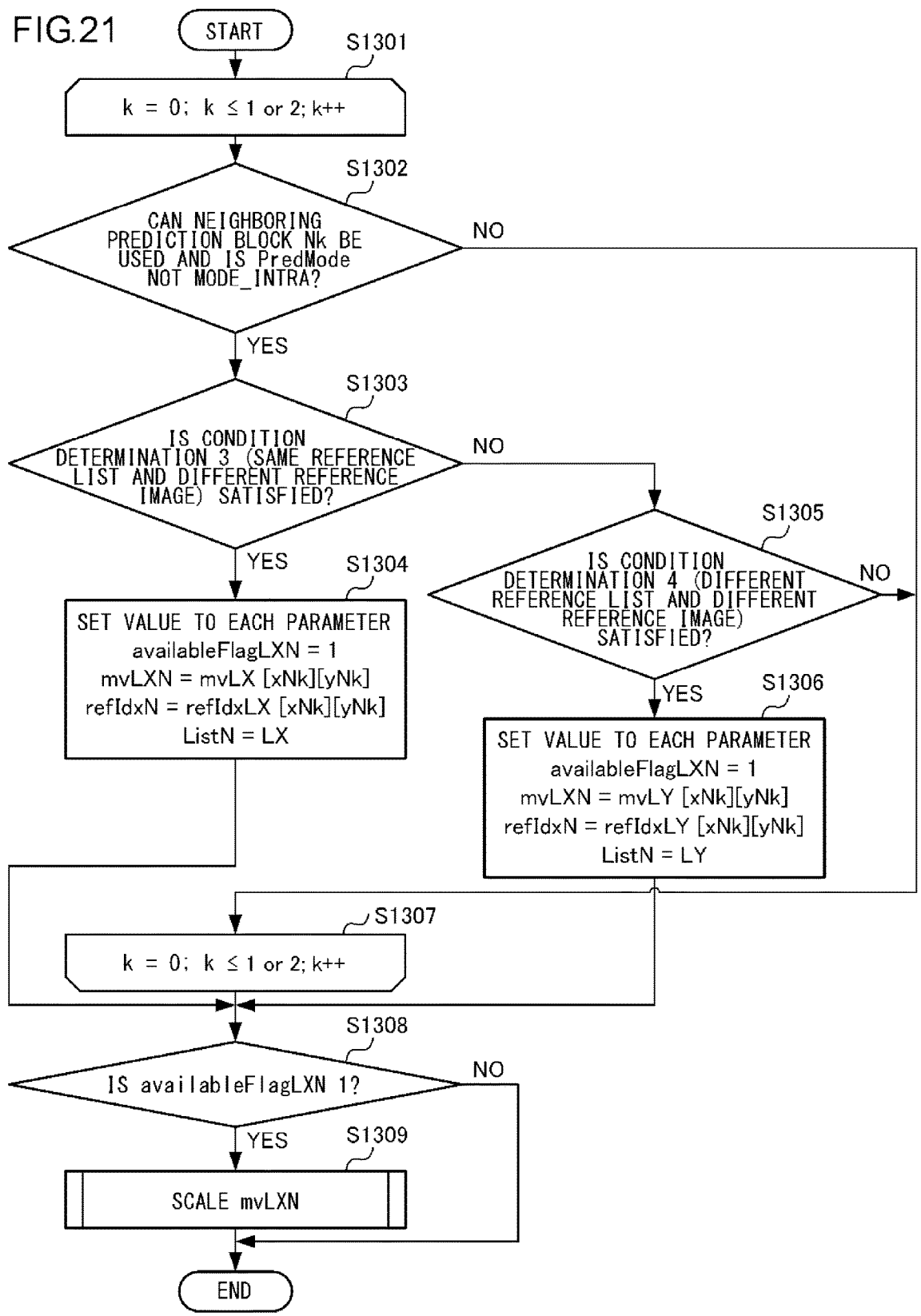
FIG. 21 is a flowchart illustrating a motion vector predictor candidate derivation process procedure.

FIG. 21 is a flowchart illustrating the derivation process procedure of step S1110 of FIG. 19. The following process is performed on the neighboring prediction block Nk (k=0, 1, 2, and here, 2 is used only for the prediction block group neighboring the upper side) in the order of 0, 1, and 2 which are k (S1301 to S1307). The following process is performed in the order of A0 and A1 from top to bottom when N is A, and performed in the order of B0, B1, and B2 from the right to the left when N is B.

When the neighboring prediction block Nk can be used and the prediction mode PredMode of the prediction block Nk is not the intra (MODE_INTRA) (YES in S1302), the condition determination of the condition determination 3 is performed (S1303). When the flag predFlagLX [xNk][yNk] representing whether LX of the neighboring prediction block Nk is used is 1, that is, the inter prediction is performed on the neighboring prediction block Nk using the same motion vector of LX as the derivation target, the process proceeds to step S1304, and otherwise (NO in S1303), the condition determination of step S1305 is performed.

When the determination result of step S1303 is YES, the flag availableFlagLXN is set to 1, mvLXN of the prediction block group N is set to the same value as the motion vector mvLX[xNk][yNk] of LX of the neighboring prediction block Nk, the reference index refIdxN of the prediction block group N is set to the same value as the reference index refIdxLX[xNk][yNk] of LX of the neighboring prediction block Nk, and the reference list ListN of the prediction block group N is set to LX (S1304), and the process proceeds to step S1308.

When the determination result of step S1303 is NO, the condition determination of the condition determination 4 is performed (S1305). When the flag predFlagLY representing whether LY of the neighboring prediction block Nk is used is 1, that is, the inter prediction is performed on the neighboring prediction block Nk using the motion vector of LY different from the derivation target (YES in S1305), the flag availableFlagLXN is set to 1, the motion vector predictor mvLXN of the prediction block group N is set to the same value as the motion vector mvLY[xNk][yNk] of LY of the neighboring prediction block Nk, the motion vector predictor mvLXN of the prediction block group N is set to the same value as the motion vector mvLY[xNk][yNk] of LY of the neighboring prediction block Nk, the reference index refIdxN of the prediction block group N is set to the same value as the reference index refIdxLY[xNk][yNk] of LY of the neighboring prediction block Nk, and the reference list ListN of the prediction block group N is set to LY (S1306), and the process proceeds to step S1308.

However, when the above conditions are not satisfied (NO in S1303 or NO in S1305), k is increased by 1, the process (S1301 to S1307) of the next neighboring prediction block is performed, and repeated until availableFlagLXN is 1 or the process of the neighboring block A1 or B2 ends, and then the process proceeds to step S1308.

Then, when availableFlagLXN is 1 (YES in S1308), mvLXN is scaled (S1309). The scaling process procedure of the spatial motion vector predictor candidate of step S1309 will be described with reference to FIGS. 22 and 23.

Figure 22:
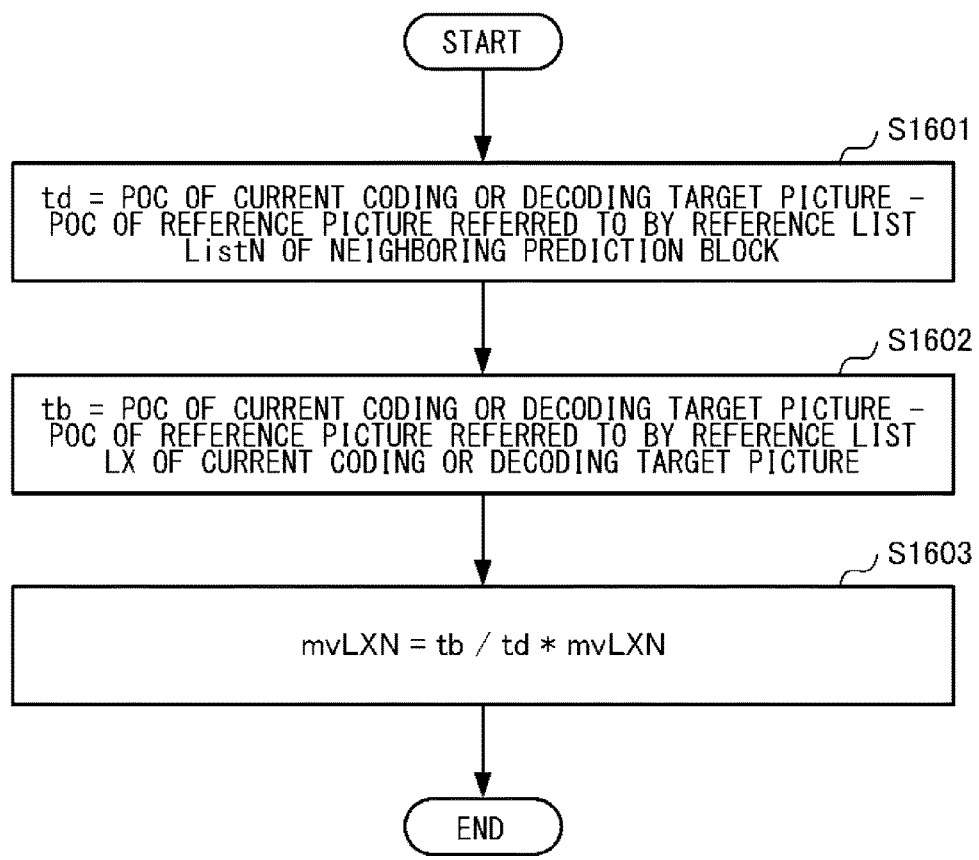
FIG. 22 is a flowchart illustrating a motion vector scaling process procedure.

FIG. 22 is a flowchart illustrating the scaling process procedure of the motion vector of step S1309 of FIG. 21.

An inter-picture distance td is derived by subtracting the POC of the reference picture referred to by the list ListN of the neighboring prediction block from the POC of the current coding or decoding target picture (S1601). Further, when the reference picture referred to by the list ListN of the neighboring prediction block is earlier in the display order than the current coding or decoding target picture, the inter-picture distance td has a positive value, whereas when the reference picture referred to by the reference list ListN of the neighboring prediction block is later in the display order than the current coding or decoding target picture, the inter-picture distance td has a negative value.

$td = POC$ of current coding or decoding target picture $- POC$ of reference picture referred to by list ListN of neighboring prediction block An inter-picture distance tb is derived by subtracting the POC of the reference picture referred to by the list LX of the current coding or decoding target picture from the POC of the current coding or decoding target picture (S1602). Further, when the reference picture referred to by the list LX of the current coding or decoding target picture is earlier in the display order than the current coding or decoding target picture, the inter-picture distance tb has a positive value, whereas when the reference picture referred to by the list LX of the current coding or decoding target picture is later in the display order than the current coding or decoding target picture, the inter-picture distance tb has a negative value.

$tb = POC$ of current coding or decoding target picture $- POC$ of reference picture referred to by reference list $LX$ of current coding or decoding target picture Then, a scaled motion vector mvLXN is obtained by performing the scaling operation process by multiplying a scaling coefficient tb/td by mvLXN by the following formula (S1603).

$$mvLXN = tb/td * mvLXN$$

Figure 23:
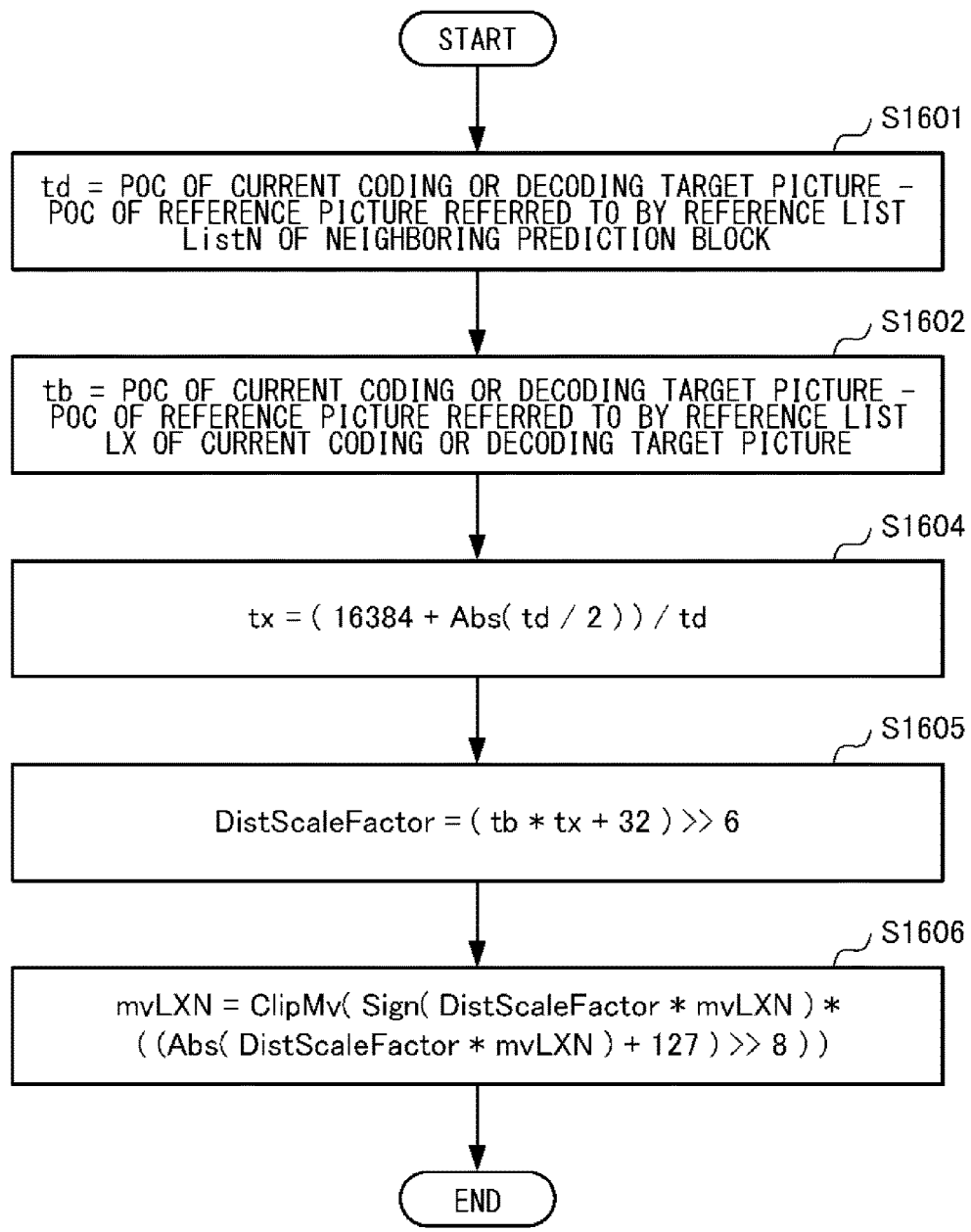
FIG. 23 is a flowchart illustrating a motion vector scaling process procedure by an integer operation.

FIG. 23 illustrates an example of performing the scaling operation of step S1603 through an integer accuracy operation. The process of steps S1604 to S1606 of FIG. 23 corresponds to the process of step S1603 of FIG. 22.

First, similarly to the flowchart of FIG. 22, the inter-picture distance td and the inter-picture distance tb are derived (S1601 and S1602).

Then, a variable tx is derived by the following formula (S1604).

$$tx=(16384+Abs(td/2))/td$$

Then, a scaling coefficient DistScaleFactor is derived by the following formula (S1605).

$$DistScaleFactor=(tb*tx+32)>>6$$

Then, a scaled motion vector mvLXN is obtained by the following formula (S1606).

$$mvLXN=ClipMv(Sign(DistScaleFactor*mvLXN)*\\((Abs(DistScaleFactor*mvLXN)+127)>>8))$$

Figure 24:
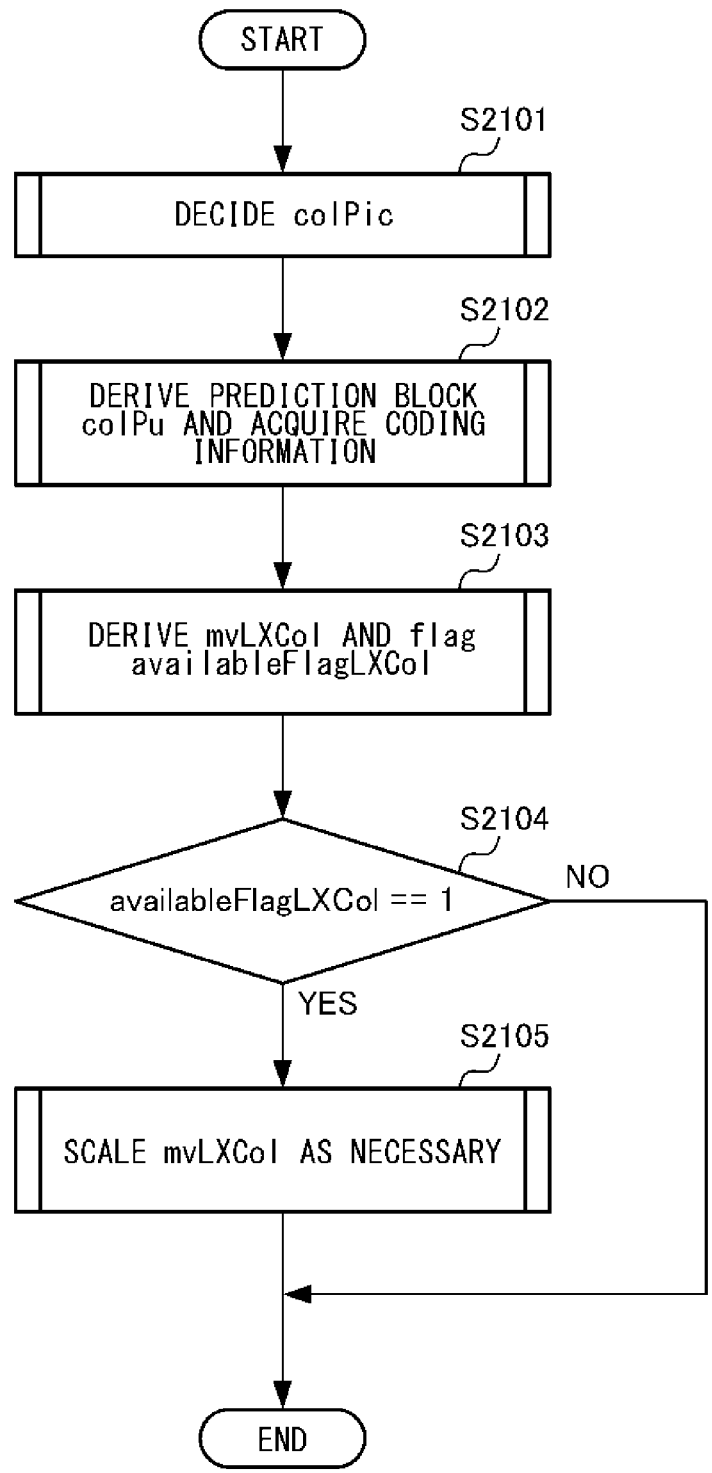
FIG. 24 is a flowchart illustrating a motion vector predictor candidate derivation process procedure.

Next, a method of deriving the motion vector predictor candidate from the prediction block of the picture of the different time in S303 of FIG. 18 will be described in detail. FIG. 24 is a flowchart for describing the motion vector predictor candidate derivation process procedure of step S303 of FIG. 18.

First, the picture colPic of the different time is derived based on slice_type and collocated_from_l0_flag (S2101 of FIG. 24).

Figure 25:
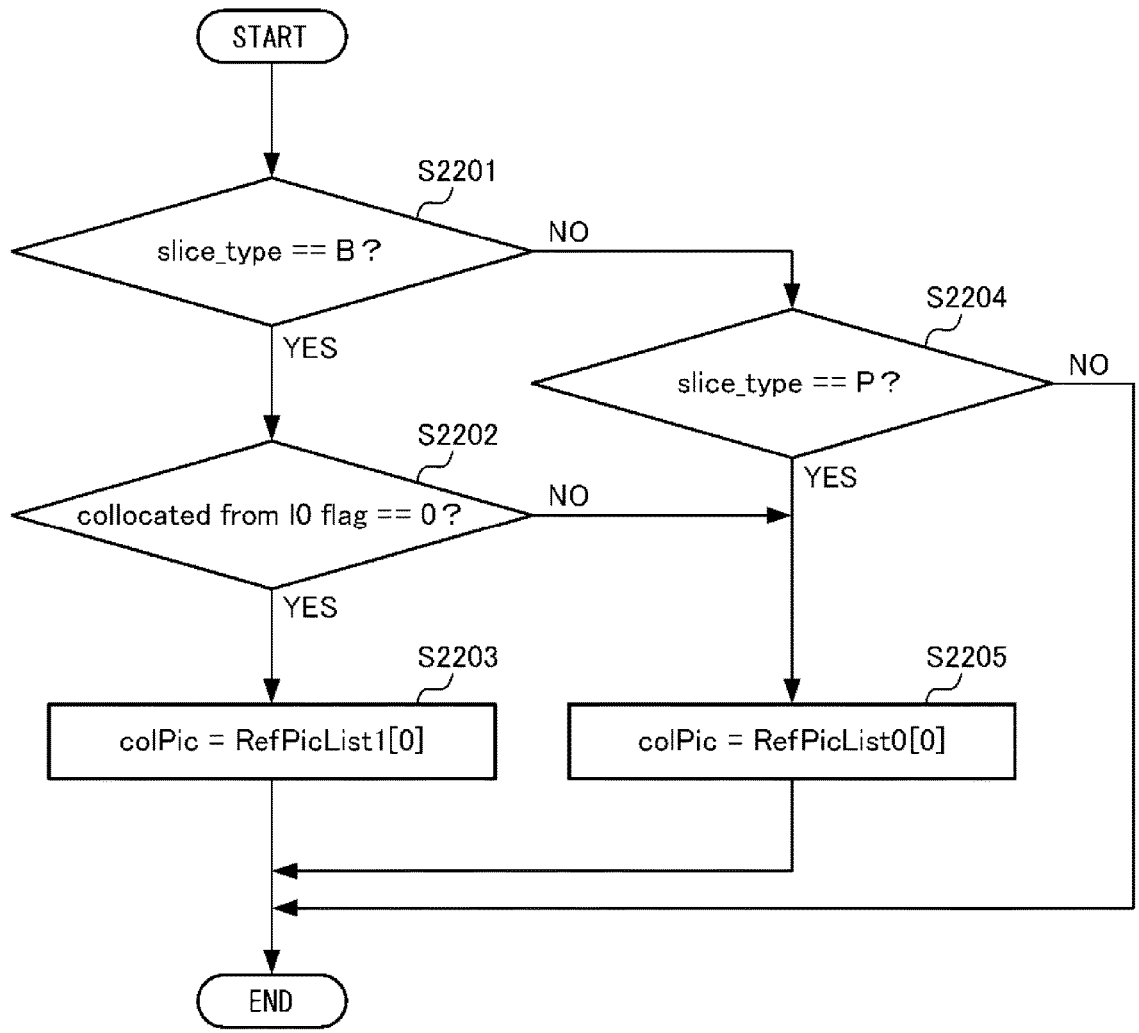
FIG. 25 is a flowchart illustrating a derivation process procedure of a picture of a different time.

FIG. 25 is a flowchart for describing the derivation process procedure of the picture colPic of the different time in step S2101 of FIG. 24. When slice_type is B and the flag collocated_from_l0_flag is 0 (YES in S2201 and YES in S2202 in FIG. 25), the picture of RefPicList1[0], that is, the picture in which the reference index of the reference list L1 is 0 is the picture colPic of the different time (S2203 of FIG. 25). Otherwise, that is, when the flag collocated_from_l0_flag is 1 (NO in S2201, NO in S2202, and NO in S2204 in FIG. 25), the picture of RefPicList0[0], that is, the picture in which the reference index of the reference list L0 is 0 is the picture colPic of the different time (S2205 of FIG. 25).

Next, referring back to the flowchart of FIG. 24, a prediction block colPU of the different time is derived, and coding information is derived (S2102 of FIG. 24).

Figure 26:
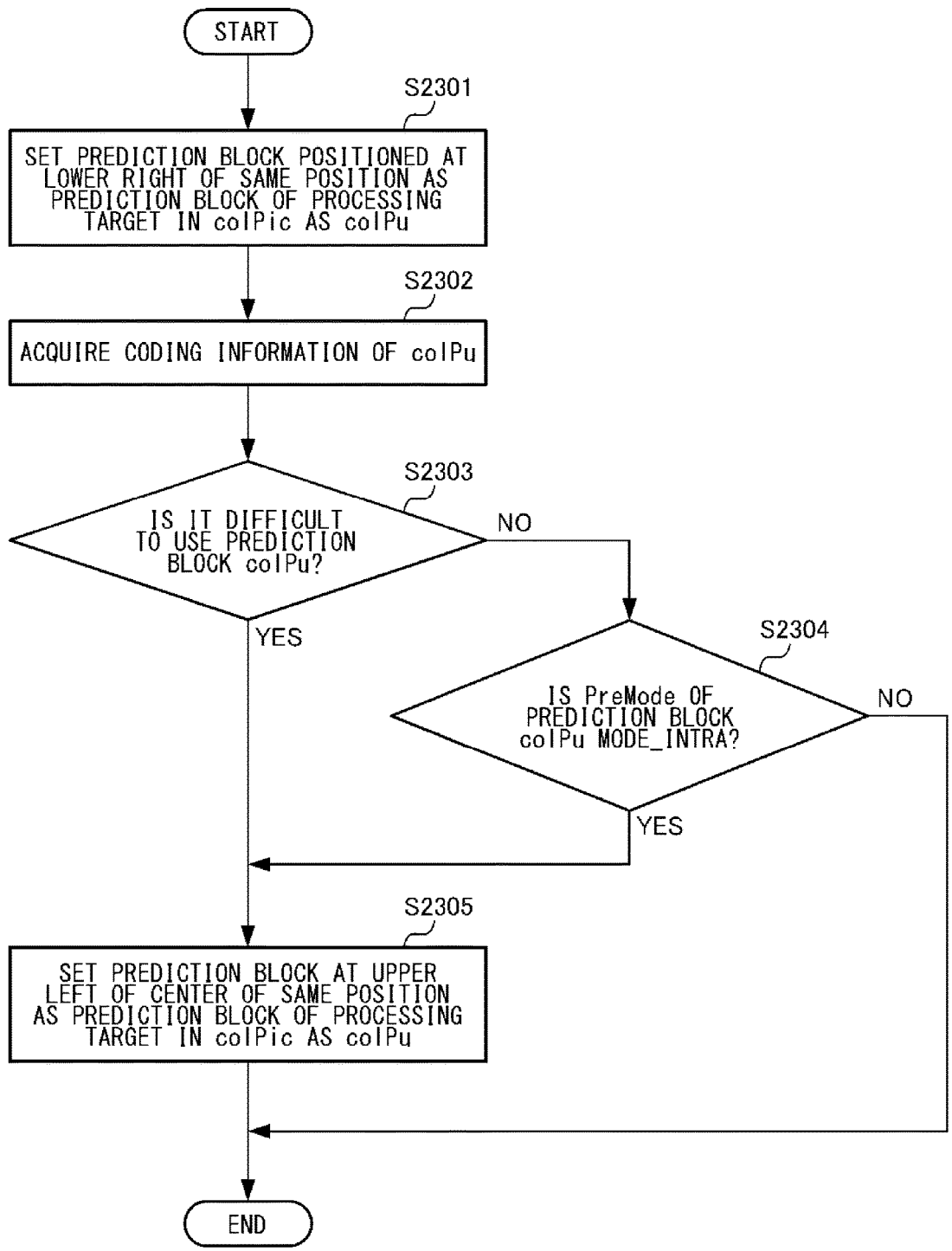
FIG. 26 is a flowchart illustrating a candidate derivation process procedure of a prediction block of a picture of a different time.

FIG. 26 is a flowchart for describing derivation process procedure of the prediction block colPU of the picture colPic of the different time in step S2102 of FIG. 24.

First, a prediction block positioned at the lower right (the outer side) of the same position as the prediction block of the processing target in the picture colPic of the different time is set as the prediction block colPU of the different time (S2301 in FIG. 26). This prediction block corresponds to the prediction block T0 of FIG. 9.

Then, the coding information of the prediction block colPU of the different time is derived (S2302 of FIG. 26). When PredMode of the prediction block colPU of the different time is MODE_INTRA or it is difficult to use the prediction block colPU (S2303 or S2304 of FIG. 26), a prediction block positioned at the upper left of the center of the same position as the prediction block of the processing target in the picture colPic of the different time is set as the prediction block colPU of the different time again (S2305 of FIG. 26). This prediction block corresponds to the prediction block T1 of FIG. 9.

Then, referring back to the flowchart of FIG. 24, a motion vector predictor mvLXCol of LX derived from a prediction block of a different picture at the same position as the prediction block of the coding or decoding target and a flag availableFlagLXCol representing whether coding information of a reference list LX of a prediction block group Col is valid are derived (S2103 of FIG. 24).

Figure 27:
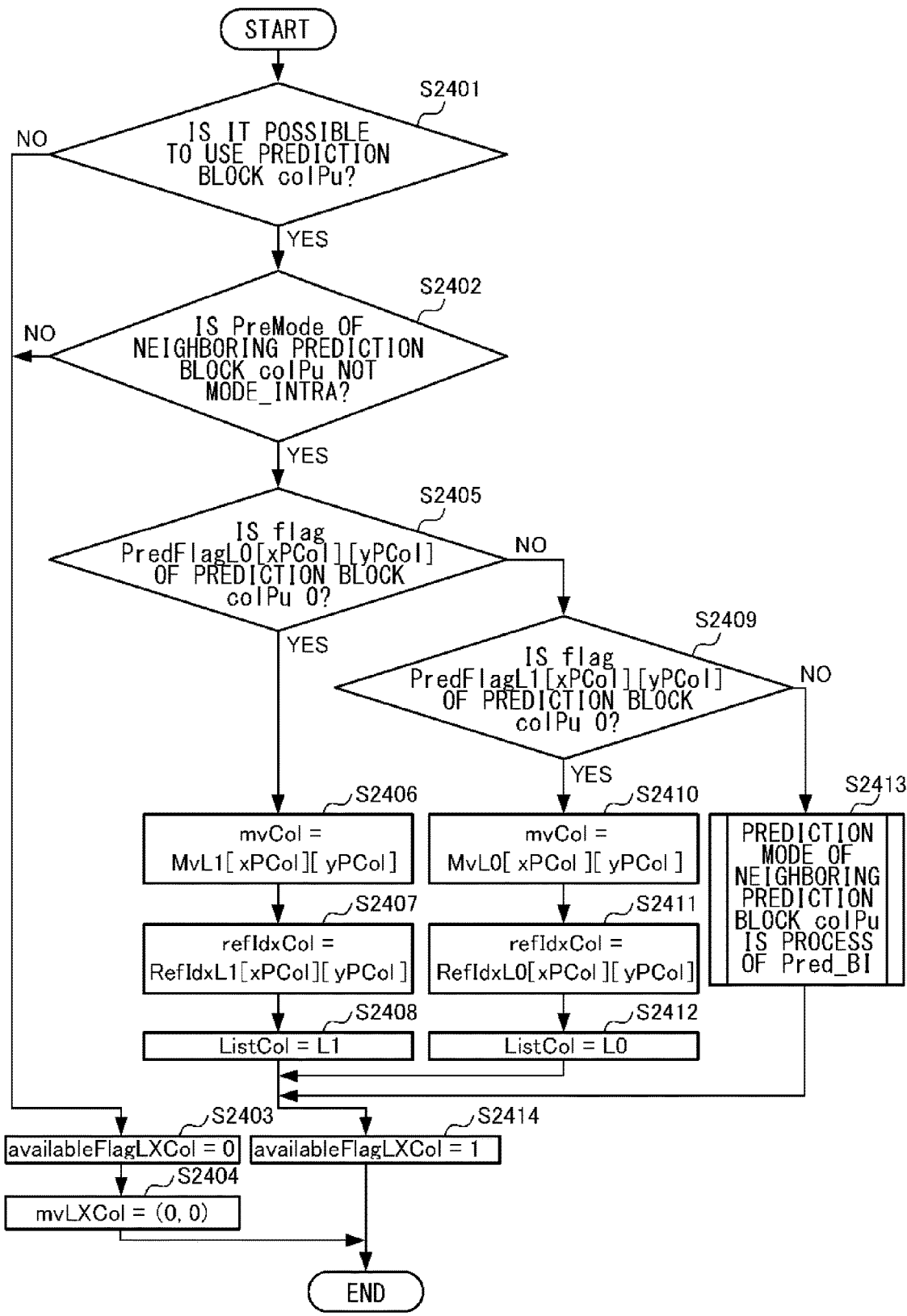
FIG. 27 is a flowchart illustrating a motion vector predictor candidate derivation process procedure.

FIG. 27 is a flowchart for describing a process of deriving the inter prediction information in step S2103 of FIG. 24.

When PredMode of the prediction block colPU of the different time is MODE_INTRA or when it is difficult to use the prediction block colPU (NO in S2401 or NO in S2402 in FIG. 27), availableFlagLXCol is set to 0, mvLXCol is set to (0, 0) (S2403 and S2404 of FIG. 27), and then the process ends.

When it is possible to use the prediction block colPU and PredMode is not MODE_INTRA (YES in S2401 and YES in S2402 in FIG. 27), mvCol and refIdxCol are derived by the following process.

When a flagPredFlagL0[xPCol][yPCol] representing whether the L0 prediction of the prediction block colPU is used is 0 (YES in S2405 of FIG. 27), since the prediction mode of the prediction block colPU is Pred_L1, the motion vector mvCol is set to the same value as MvL1 [xPCol][yPCol] which is the motion vector of L1 of the prediction block colPU (S2406 of FIG. 27), the reference index refIdxCol is set to the same value as a reference index RefIdxL1[xPCol][yPCol] of L1 (S2407 of FIG. 27), and a list ListCol is set to L1 (S2408 of FIG. 27).

However, when the flag PredFlagL0 [xPCol][yPCol] of the L0 prediction of the prediction block colPU is not 0 (NO in S2405 of FIG. 27), it is determined whether an L1 prediction flag PredFlagL1[xPCol][yPCol] of the prediction block colPU is 0. When the L1 prediction flag PredFlagL1 [xPCol][yPCol] of the prediction block colPU is 0 (YES in S2409 of FIG. 27), the motion vector mvCol is set to the same value as MvL0[xPCol][yPCol] which is the motion vector of L0 of the prediction block colPU (S2410 of FIG. 27), the reference index refIdxCol is set to the same value as a reference index RefIdxL0[xPCol][yPCol] of L0 (S2411 of FIG. 27), and a list ListCol is set to L0 (S2412 of FIG. 27).

When both the flag PredFlagL0[xPCol][yPCol] of the L0 prediction of the prediction block colPU and the L1 prediction flag PredFlagL1[xPCol][yPCol] of the prediction block colPU are not 0 (NO in S2405 and NO in S2409 in FIG. 27), since the inter prediction mode of the prediction block colPU is the bi-prediction (Pred_BI), one of the two motion vectors of L0 and L1 is selected (S2413 of FIG. 27).

Figure 28:
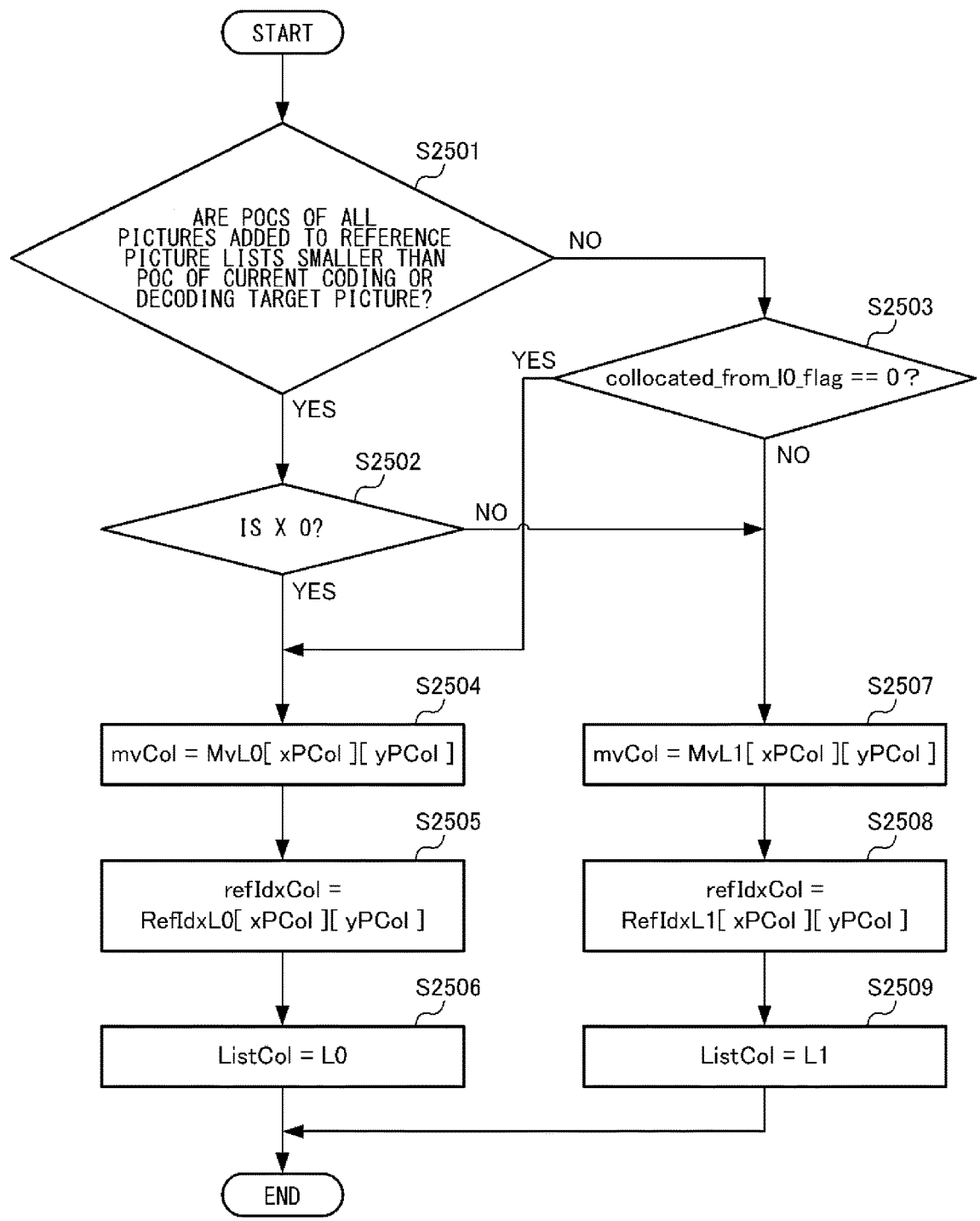
FIG. 28 is a flowchart illustrating a motion vector predictor candidate derivation process procedure.

FIG. 28 is a flowchart illustrating the derivation process procedure of the inter prediction information of the prediction block when the inter prediction mode of the prediction block colPU is the bi-prediction (Pred_BI).

First, it is determined whether the POCs of all pictures added to all reference lists are determined to be smaller than the POC of the current coding or decoding target picture (S2501). In the case in which the POCs of all pictures added to L0 and L1 which are all reference lists of the prediction block colPU are smaller than the POC of the current coding or decoding target picture (YES in S2501), when X is 0, that is, the vector predictor candidate of the motion vector of L0 of the prediction block of the coding or decoding target is derived (YES in S2502), the inter prediction information of L0 of the prediction block colPU is selected, whereas when X is 1, that is, when the vector predictor candidate of the motion vector of L1 of the prediction block of the coding or decoding target is derived (NO in S2502), the inter prediction information of L1 of the prediction block colPU is selected. However, in the case in which at least one of the POCs of the pictures added to all reference lists L0 and L1 of the prediction block colPU is larger than the POC of the current coding or decoding target picture (NO in S2501), when the flag collocated_from_l0_flag is 0 (YES in S2503), the inter prediction information of L0 of the prediction block colPU is selected, whereas when the flag collocated_from_l0_flag is 1 (NO in S2503), the inter prediction information of L1 of the prediction block colPU is selected.

When the inter prediction information of L0 of the prediction block colPU is select (YES in S2502 and YES in S2503), the motion vector mvCol is set to the same value as MvL0[xPCol][yPCol] (S2504), the reference index refIdx-Col is set to the same value as RefIdxL0[xPCol][yPCol] (S2505), and the list ListCol is set to L0 (S2506).

When the inter prediction information of L1 of the prediction block colPU is selected (NO in S2502 and NO in S2503), the motion vector mvCol is set to the same value as MvL1[xPCol][yPCol] (S2507), the reference index refIdx-Col is set to the same value as RefIdxL1[xPCol][yPCol] (S2508), and the list ListCol is set to L1 (S2509).

Referring back to FIG. 27, when it is possible to derive the inter prediction information from the prediction block colPU, availableFlagLXCol is set to 1 (S2414 of FIG. 27).

Then, referring back to the flowchart of FIG. 24, when availableFlagLXCol is 1 (YES in S2104 of FIG. 24), mvLX-Col is scaled as necessary (S2105 of FIG. 24). The scaling process procedure of the motion vector mvLXCol will be described with reference to FIGS. 29 and 30.

Figure 29:
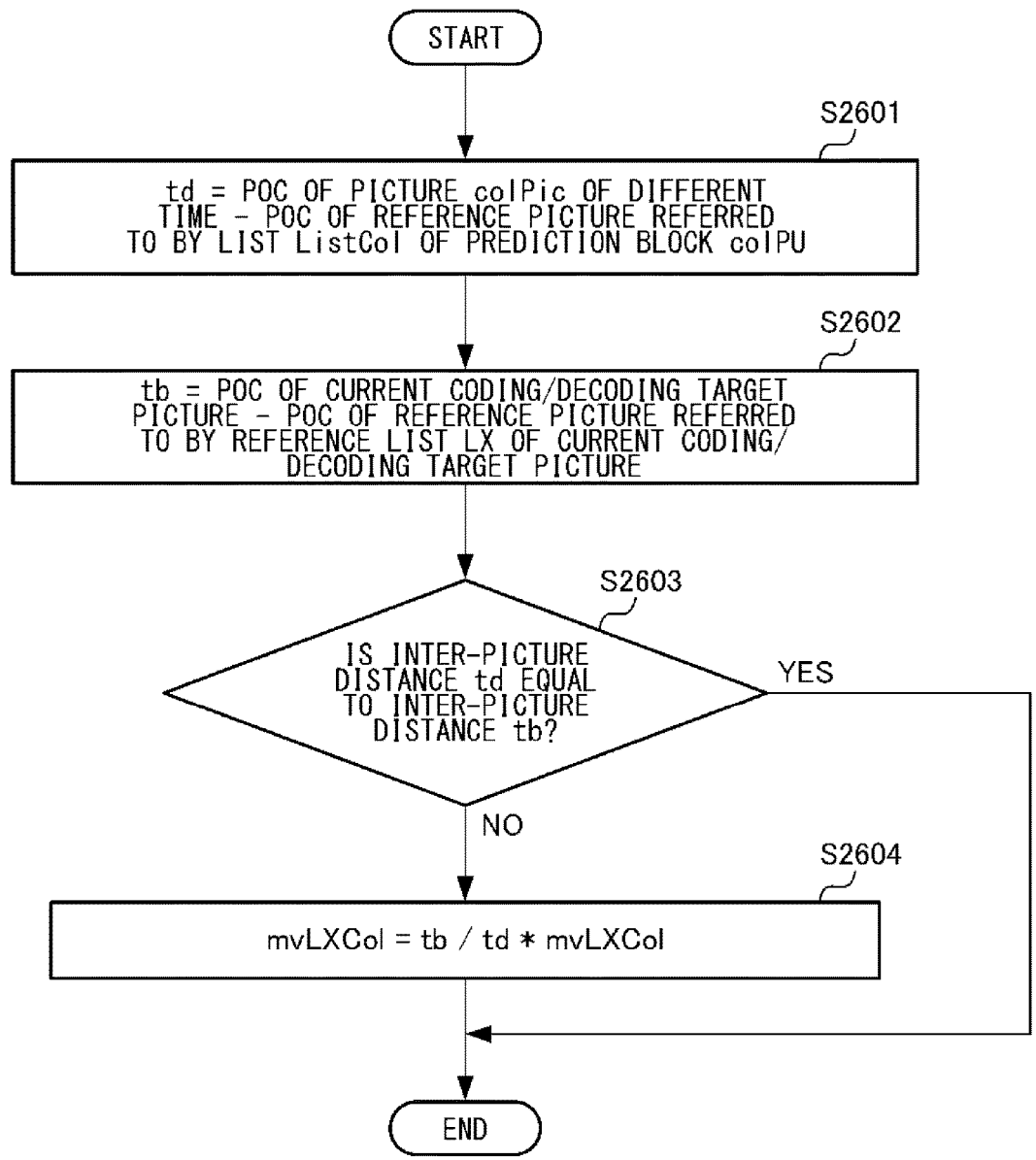
FIG. 29 is a flowchart illustrating a motion vector scaling process procedure.

FIG. 29 is a flowchart illustrating the scaling process procedure of the motion vector in step S2105 of FIG. 24.

The inter-picture distance td is derived by subtracting the POC of the reference picture referred to by the list ListCol of the prediction block colPU from the POC of the picture colPic of the different time (S2601). Further, when the POC of the reference picture referred to by the list ListCol of the prediction block colPU is earlier in the display order than the picture colPic of the different time, the inter-picture distance td has a positive value, whereas when the POC of the reference picture referred to by the list ListCol of the prediction block colPU is later in the display order than the picture colPic of the different time, the inter-picture distance td has a negative value.

*td=POC* of picture *colPic* of different time−*POC* of reference picture referred to by list List*Col* of prediction block *colPU*

The inter-picture distance tb is derived by subtracting the POC of the reference picture referred to by the list LX of the current coding or decoding target picture from the POC of the current coding or decoding target picture (S2602). Further, when the reference picture referred to by the list LX of the current coding or decoding target picture is earlier in the display order than the current coding or decoding target picture, the inter-picture distance tb has a positive value, whereas the reference picture referred to by the list LX of the current coding or decoding target picture is later in the display order than the current coding or decoding target picture, the inter-picture distance tb has a negative value.

*tb=POC* of current coding or decoding target picture−*POC* of reference picture referred to by reference list *LX* of current coding or decoding target picture Then, the inter-picture distance td is compared with the inter-picture distance tb (S2603), and when the inter-picture distance td is equal to the inter-picture distance tb (YES in S2603), the present scaling operation process ends. When the inter-picture distance td is not equal to inter-picture distance tb (NO in S2603), the scaled motion vector mvLX-Col is obtained by performing the scaling operation process by multiplying mvLXCol by the scaling coefficient tb/td through the following formula (S2604).

*mvLXCol=tb/td\*mvLXCol*

Figure 30:
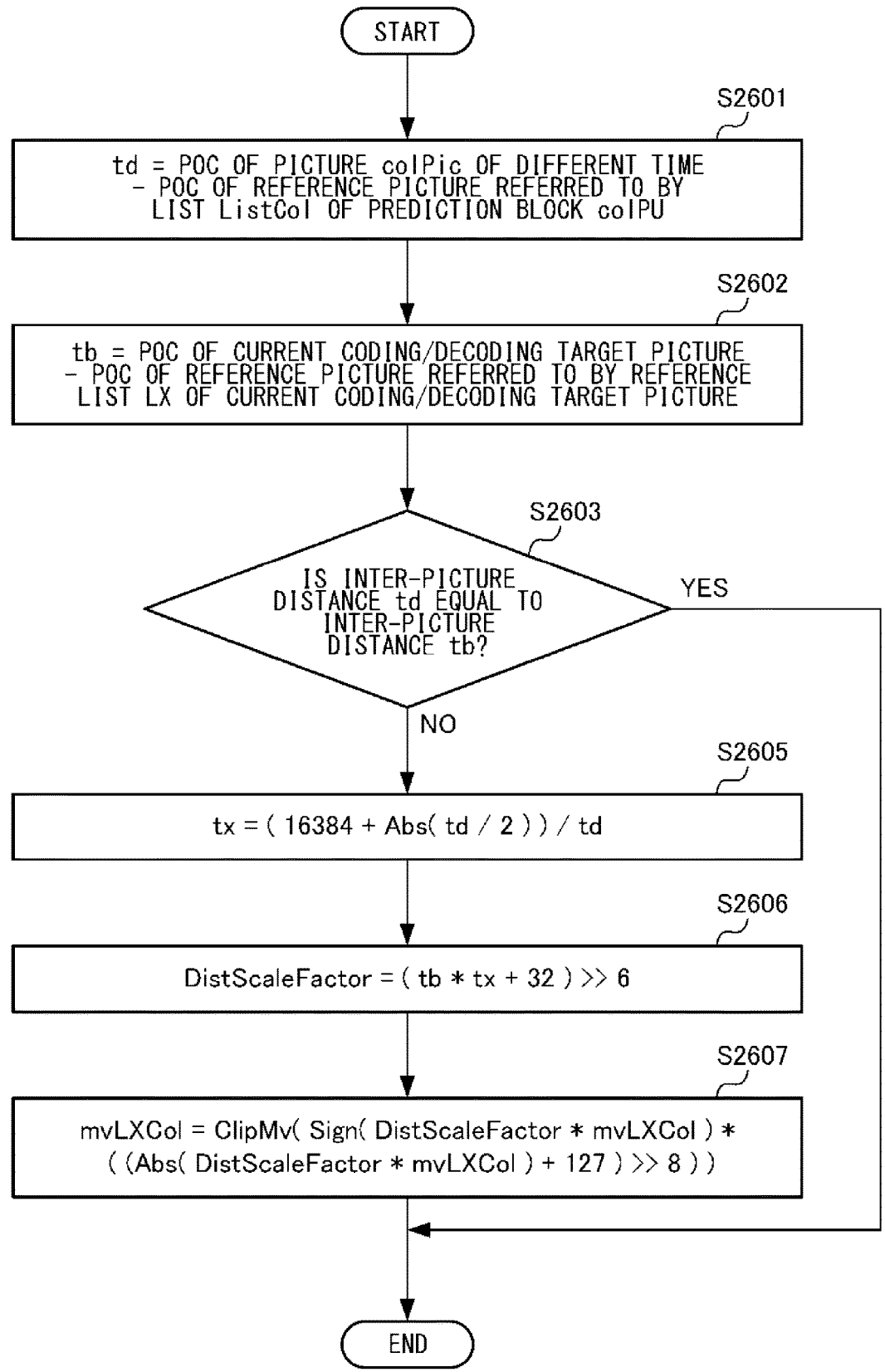
FIG. 30 is a flowchart illustrating a motion vector scaling process procedure by an integer operation.

FIG. 30 illustrates an example of performing the scaling operation of step S2604 through an integer accuracy operation. The process of steps S2605 to S2607 of FIG. 30 corresponds to the process of S2604 of FIG. 29.

First, similarly to the flowchart of FIG. 29, the inter-picture distance td and the inter-picture distance tb are derived (S2601 and S2602).

Then, the inter-picture distance td is compared with the inter-picture distance tb (S2603), and when the inter-picture distance td is equal to the inter-picture distance tb (YES in S2603), the present scaling operation process ends. When the inter-picture distance td is not equal to the inter-picture distance tb (NO in S2603), the variable tx is derived by the following formula (S2605).

*tx*=(16384+*Abs*(*td*/2))/*td*

Then, the scaling coefficient DistScaleFactor is derived by the following formula (S2606).

DistScaleFactor=(*tb\*tx*+32)>>6

Then, the scaled motion vector mvLXN is obtained by the following formula (S2607).

*mvLXN*=Clip*Mv*(Sign(DistScaleFactor\**mvLXN*)\* ((*Abs*(DistScaleFactor\**mvLXN*)+127)>>8))

The process of adding the motion vector predictor candidate to the motion vector predictor list in S304 of FIG. 18 will be described in detail.

The motion vector predictor candidates mvLXA, mvLXB, and mvLXCol of LX derived in S301, S302, and S303 of FIG. 18 are added to the motion vector predictor list mvpListLX of LX (S304). In the embodiment of the present invention, the priority order is given, and the elements having the high priority order are arranged in the front of the motion vector predictor list by adding the motion vector predictor candidates mvLXA, mvLXB, and mvLXCol to the motion vector predictor list mvpListLX of LX in the descending order of the priority orders. When the number of elements in the motion vector predictor list is limited in S306 of FIG. 18, the elements having the high priority order are left by deleting the element arranged in the rear of the motion vector predictor list from the motion vector predictor list.

The motion vector predictor list mvpListLX has a list structure, and is managed by the index i representing the location in the motion vector predictor list, and includes a storage region storing the motion vector predictor candidate corresponding to the index i as an element. A number of the index i starts from 0, and the motion vector predictor candidate is stored in the storage region of the motion vector predictor list mvpListLX. In the subsequent process, the motion vector predictor candidate which is the element of the index i added to the motion vector predictor list mvpListLX is represented by mvpListLX[i].

Figure 31:
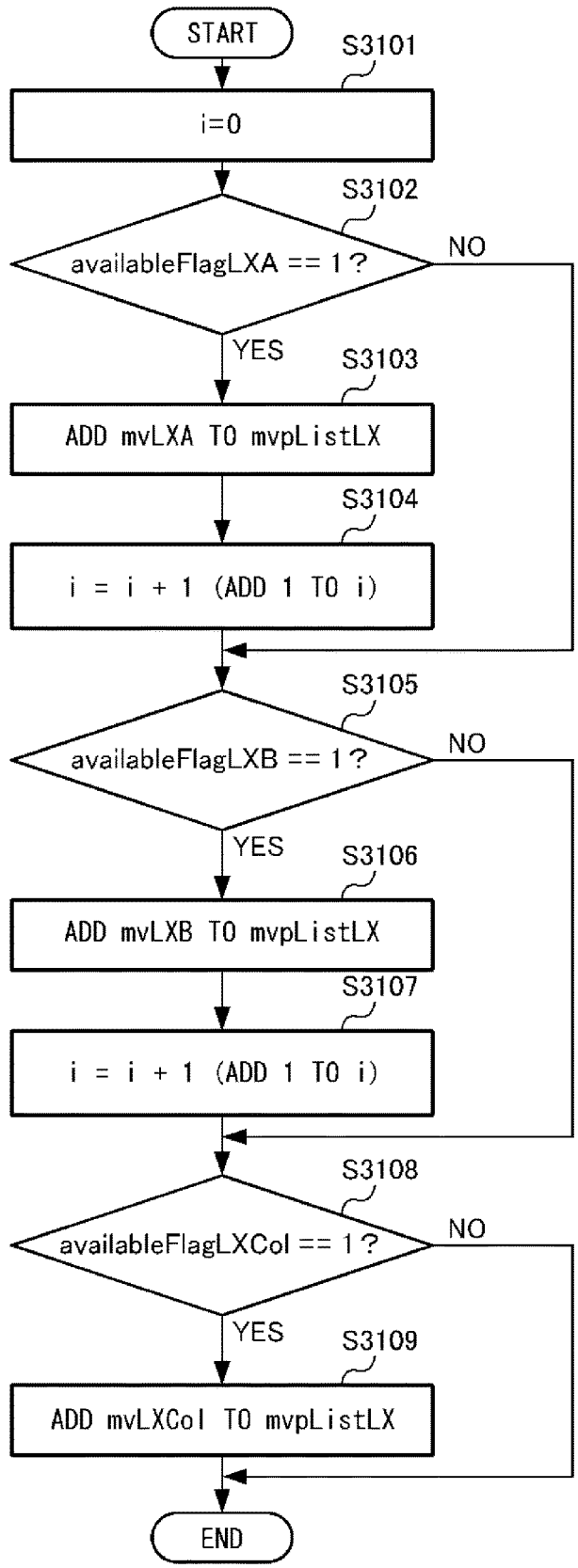
FIG. 31 is a flowchart illustrating a process procedure of adding a motion vector predictor candidate to a motion vector predictor candidate list.

Next, the processing method of adding the motion vector predictor candidates mvLXA, mvLXB, and mvLXCol of LX to the motion vector predictor list mvpListLX of LX in S304 of FIG. 18 will be described in detail. FIG. 31 is a flowchart illustrating the motion vector predictor candidate addition process procedure of step S304 of FIG. 18.

First, the index i of the motion vector predictor list mvpListLX is set to 0 (S3101). When availableFlagLXA is 1 (YES in S3102), updating is performed by adding the motion vector predictor candidate mvLXA of LX to the position corresponding to the index i of the motion vector predictor list mvpListLX (S3103) and adding 1 to the index i (S3104).

Then, when availableFlagLXB is 1 (YES in S3105), updating is performed by adding the motion vector predictor candidate mvLXB of LX to the position corresponding to the index i of the motion vector predictor list mvpListLX-mvpListLX (S3106) and adding 1 to index i (S3107).

Then, when availableFlagLXCol is 1 (YES in S3108), the motion vector predictor candidate mvLXCol of LX is added to the position corresponding to the index i of the motion vector predictor list mvpListLX (S3109), and the process of adding to the motion vector predictor list ends.

In the above process, the motion vector predictor candidates of LX are added to the motion vector predictor list mvpListLX of LX in the order of mvLXA, mvLXB, and mvLXCol, but in the case in which the prediction block having the size smaller than or equal to the specified size and the candidate number is 1, when the partition mode (Part Mode) is the 2N×N partition (PART_2N×N) and the partition index PartIdx is 0 or when the partition mode (Part Mode) is the N×2N partition (PART_N×2N) and the partition index PartIdx is 1, the motion vector predictor candidates of LX are added to the motion vector predictor list mvpListLX in the order of mvLXB, mvLXA, and mvLXCol, and thus in order that the motion vector predictor mvLXB which is likely to have a value close to the motion vector of the prediction block of the coding or decoding target is easily selected, it is added to the front of the motion vector predictor list and thus the coding amount of the motion vector difference can be reduced. As described above, the motion vector predictor candidate number limiting unit 124 sets the priority order of the motion vector predictor candidate remaining in the motion vector predictor candidate list according to the partition mode for partitioning the coding or decoding target block into the prediction blocks.

Figure 4A:
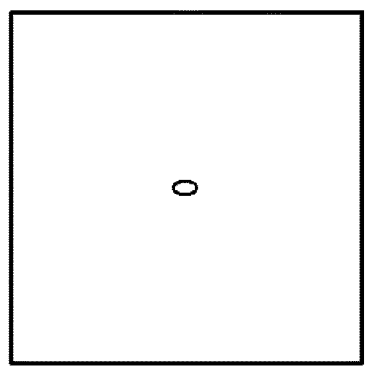
FIGS. 4A-4D are diagrams for describing a partition mode of a prediction block.
Figure 4B:
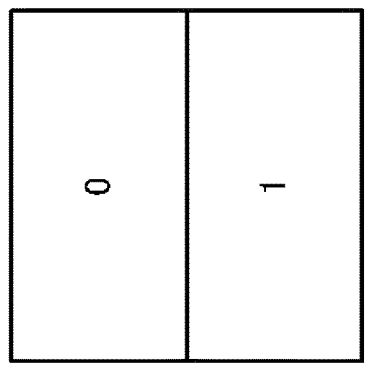

When the partition mode (Part Mode) is the 2N×N partition (PART_2N×N) as illustrated in FIG. 4B, the motion vector of the prediction block at the upper side in which the partition index PartIdx is 0 is likely to have the motion vector value close to the motion vector predictor from the prediction block group at the upper side neighboring the long side, and thus in order that the candidate mvLXB from the prediction block group at the upper side is likely to be preferentially selected, it is added to the front of the motion vector predictor list, and the motion vector of the prediction block at the lower side in which the partition index PartIdx is 1 is likely to have the motion vector value different from the prediction block at the upper side, and thus in order that the motion vector predictor candidate mvLXA from the prediction block group at the left side is likely to be preferentially selected, it is added to the front of the motion vector predictor list.

Figure 4C:
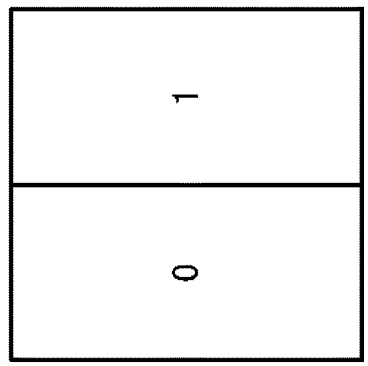
Figure 4D:
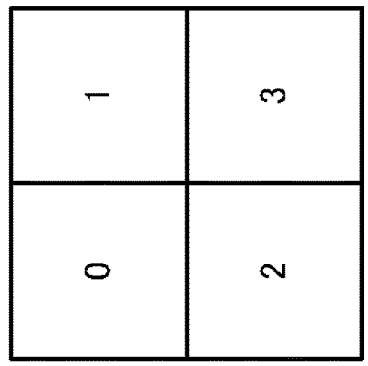

When the partition mode (Part Mode) is the N×2N partition (PART_N×2N) as illustrated in FIG. 4C, the motion vector of the prediction block at the left side in which the partition index PartIdx is 0 is likely to have the motion vector value close to the motion vector predictor from the prediction block group at the left side neighboring the long side, and thus in order that the candidate mvLXA from the prediction block group at the left side is likely to be preferentially selected, it is added to the front of the motion vector predictor list, and the motion vector of the prediction block at the right side in which the partition index PartIdx is 1 is likely to have the motion vector value different from the prediction block at the left side, and thus in order that the motion vector predictor candidate mvLXB from the prediction block group at the upper side is likely to be preferentially selected, it is added to the front of the motion vector predictor list.

Figure 34:
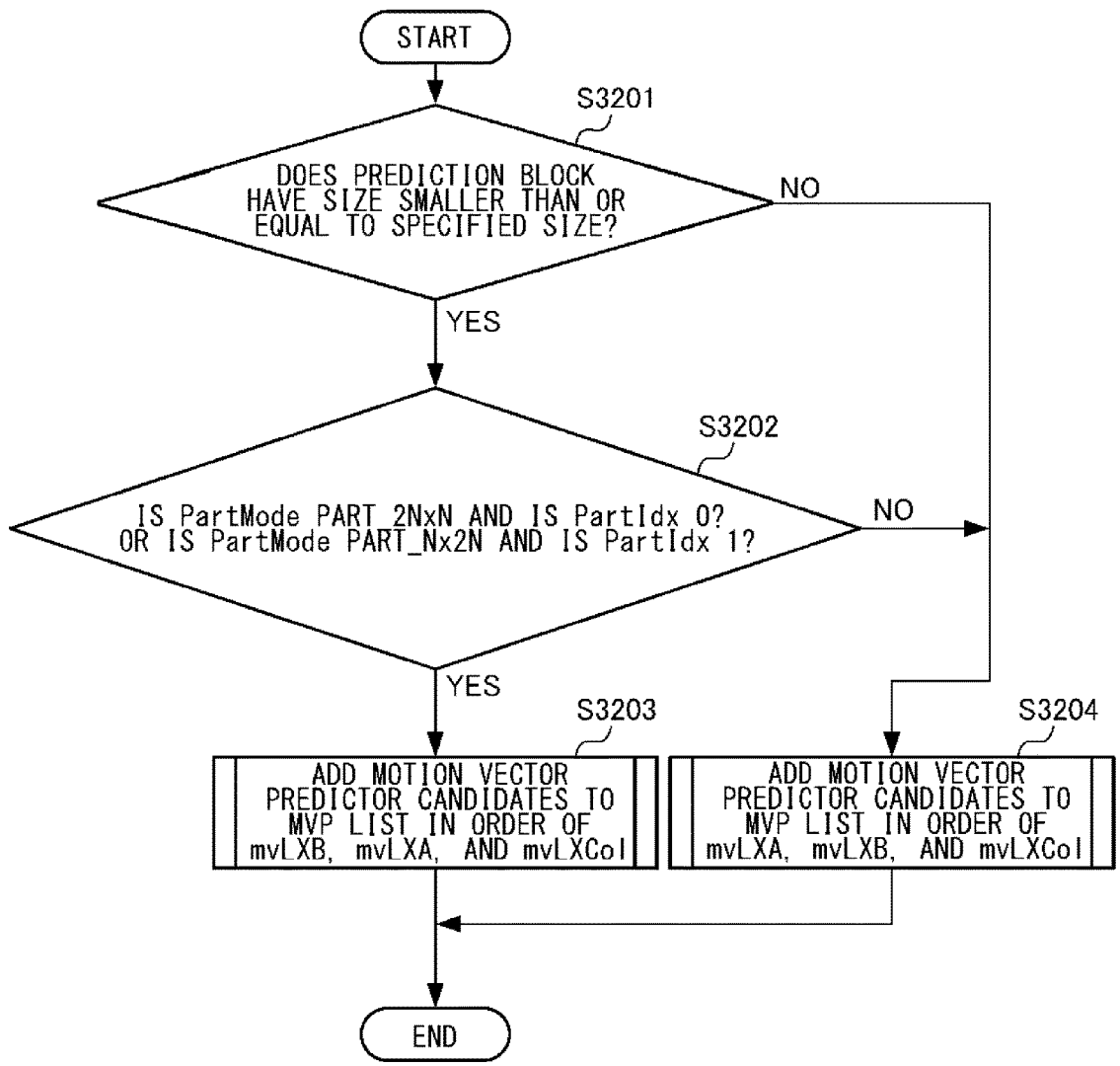
FIG. 34 is a flowchart illustrating a process procedure of adding a motion vector predictor candidate to a motion vector predictor candidate list.

FIG. 34 is a flowchart illustrating an addition process procedure of adaptively changing the order of the motion vector predictor candidates mvLXA, mvLXB, and mvLXCol of LX according to the size of the prediction block, the partition mode (Part Mode), and the partition index PartIdx for addition to the motion vector predictor list mvpListLX of LX.

Figure 35:
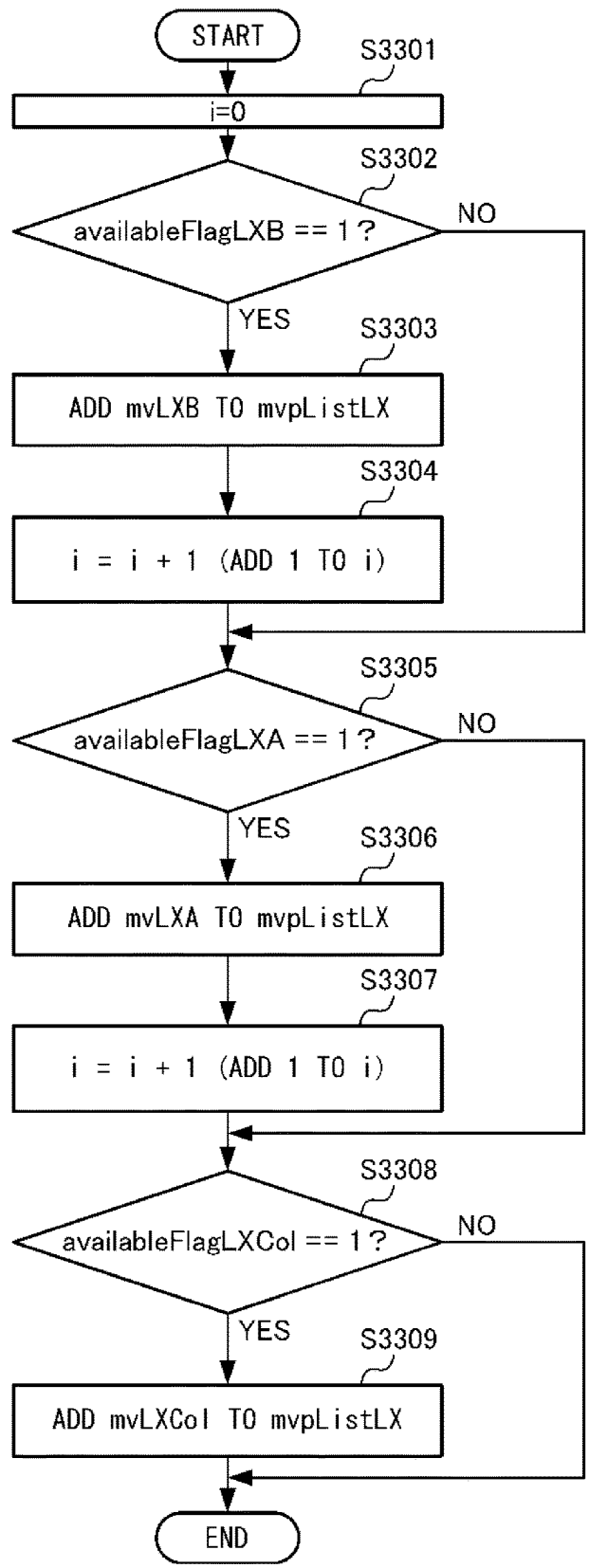
FIG. 35 is a flowchart illustrating a process procedure of adding a motion vector predictor candidate to a motion vector predictor candidate list.
Figure 36A:
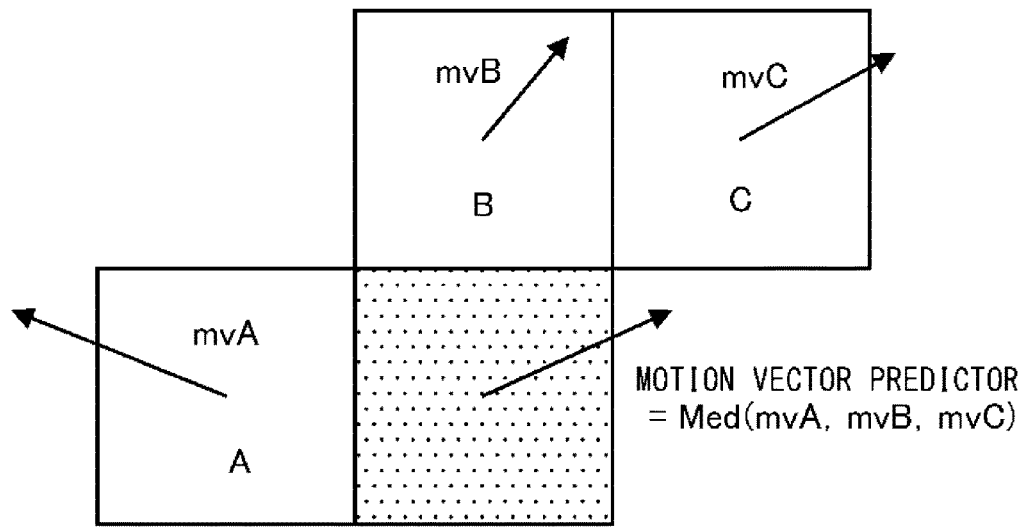
FIGS. 36A and 36B are diagrams for describing a motion vector predictor derivation method according to a related art.
Figure 36B:
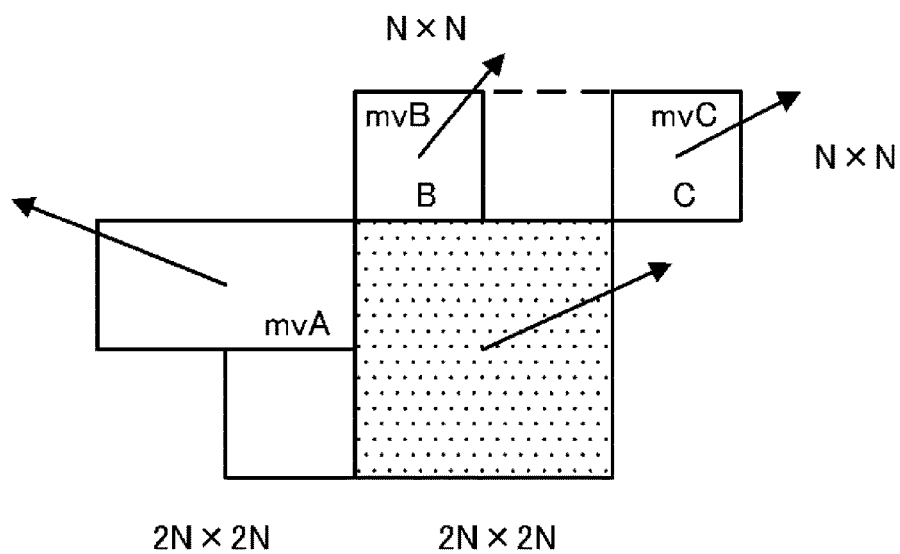

First, when the prediction block has the size smaller than or equal to the specified size (YES in S3201), and the partition mode (Part Mode) is the 2N×N partition (PART_2N×N) and the partition index PartIdx is 0 or the partition mode (Part Mode) is the N×2N partition (PART_N×2N) and the partition index PartIdx is 1 (YES in S3202), the motion vector predictor candidates of LX are added to the motion vector predictor list mvpListLX of LX in the order of mvLXB, mvLXA, and mvLXCol through the process procedure of FIG. 35 (S3203). When the above condition is not satisfied (NO in S3201 or NO in S3202), the motion vector predictor candidates of LX are added to the motion vector predictor list mvpListLX of LX in the order of mvLXA, mvLXB, and mvLXCol through the process procedure of FIG. 31 (S3204).

FIG. 35 is a flowchart illustrating the addition process procedure of adding the motion vector predictor candidates to the motion vector predictor list mvpListLX of LX in the order of mvLXB, mvLXA, and mvLXCol of LX according to the size of the prediction block, the partition mode (Part Mode), and the partition index PartIdx.

First, the index i of the motion vector predictor list mvpListLX is set to 0 (S3301). When availableFlagLXB is 1 (YES in S3302), updating is performed by adding mvLXB to the position corresponding to the index i of the motion vector predictor list mvpListLX (S3303) and adding 1 to the index i (S3304).

Then, when availableFlagLXA is 1 (YES in S3305), updating is performed by adding mvLXA to the position corresponding to the index i of the motion vector predictor list mvpListLXmvpListLX (S3306) and adding 1 to the index i (S3307).

Then, when availableFlagLXCol is 1 (YES in S3308), mvLXCol is added to the position corresponding to the index i of the motion vector predictor list mvpListLX (S3309), and the addition process for the motion vector predictor list ends.

Figure 32:
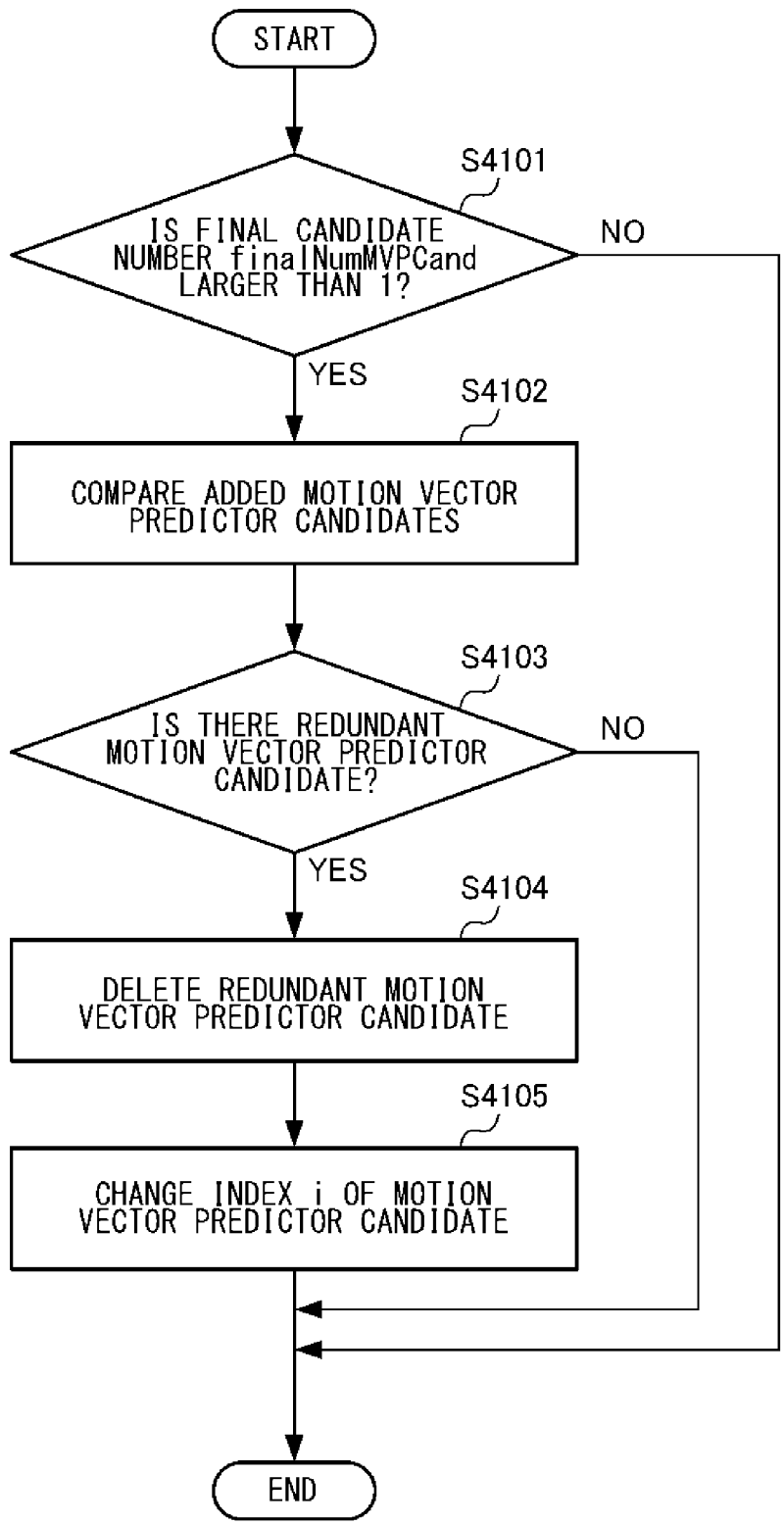
FIG. 32 is a flowchart illustrating a process procedure of deleting a redundant motion vector predictor candidate from a motion vector predictor candidate list.

Next, a method of deleting the redundant motion vector predictor candidate in the motion vector predictor list in S305 of FIG. 18 will be described in detail. FIG. 32 is a flowchart illustrating the motion vector predictor redundancy candidate deletion process procedure of S305 of FIG. 18.

When the final candidate number finalNumMVPCand is larger than 1 (YES in S4101), the motion vector predictor redundancy candidate deleting units 123 and 223 compare the motion vector candidates added to the motion vector predictor list mvpListLX (S4102), and when there are a plurality of motion vector candidates having the same value or close values (YES in S4103), the motion vector candidates are determined to be the redundant motion vector candidates, and deletes the redundant motion vector candidates except the motion vector candidate having the lowest order, that is, having the smallest index i (S4104). Further, after the redundant motion vector candidates are deleted, the storage region of the deleted motion vector predictor candidates in the motion vector predictor list mvpListLX is empty, and is filled in the order of the motion vector predictor candidates having the small index i based on the index i of 0 (S4105). For example, when the motion vector predictor candidate mvListLX[0] having the index i of 0 is deleted, and the motion vector predictor candidates mvListLX[1] and mvListLX[2] having the indices i of 1 and 2 remain, the motion vector predictor candidate mvListLX[1] having the index i of 1 is changed to the motion vector predictor candidate mvListLX[0] having the index i of 0. Further, the motion vector predictor candidate mvListLX[2] having the index i of 2 is changed to the motion vector predictor candidate mvListLX[1] having the index i of 1. Further, the motion vector predictor candidate mvListLX[2] having the index i of 2 is set not to exist.

When the final candidate number finalNumMVPCand is 1 (NO in S4101), the process of deleting the redundant motion vector predictor candidate in S305 is unnecessary, and thus the present redundant candidate deletion process ends. This is because the candidate number is limited to 1 through the process of limiting the number of elements in step S306.

When the size of the prediction block is small, since the number of prediction block per unit area is large, the number of processes of deleting the redundant motion vector predictor candidate is large.

In this regard, in the present embodiment, when the prediction block of the coding or decoding target has the size smaller than or equal to the specified size, the final candidate number finalNumMVPCand is limited to 1, the process of deleting the redundant motion vector predictor candidate is skipped, and thus the processing amount is reduced.

When the final candidate number finalNumMVPCand is 2, all the motion vector predictor candidates mvpLXA, mvpLXB, and mvpLXCol are added to the motion vector predictor list mvpListLX, and so the candidate number is 3, mvpListLX[0] which is an element in which the motion vector predictor index of the motion vector predictor list mvpListLX is 0 is mvpLXA, mvpListLX[1] which is an element in which the motion vector predictor index is 1 is mvpLXB, and mvpListLX[2] which is an element in which the motion vector predictor index is 2 is mvpLXCol. In this case, in order to compare in a round robin manner, in step S4102, it is necessary to compare mvpListLX[0] which is an element in which the motion vector predictor index of the motion vector predictor list mvpListLX is 0 with mvpListLX[1] which is an element in which the motion vector predictor index is 1 and compare mvpListLX[0] which is an element in which the motion vector predictor index of the motion vector predictor list mvpListLX is 0 with mvpListLX[2] which is an element in which the motion vector predictor index is 2, that is, two comparison processes are necessary. However, in order to reduce the processing amount, when the final candidate number finalNumMVPCand is 2, in step S4102, mvpListLX[0] which is an element in which the motion vector predictor index of the motion vector predictor list mvpListLX is 0 may be compared only with mvpListLX[1] which is an element in which the motion vector predictor index is 1, and when it is determined that there are redundant motion vector candidates, the element mvpListLX[1] in which the motion vector predictor index is 1 may be deleted, and when there is the element mvpListLX[2] in which the motion vector predictor index is 2, the corresponding motion vector predictor index may be set to 1 to become the element mvpListLX[1] in which the motion vector predictor index is 1, and then the present process may end. In this case, when a new element mvpListLX[0] in which the motion vector predictor index is 0 is compared with the element mvpListLX[1] in which the motion vector predictor index is 1, there is a possibility that there will be redundancy, but if it is determined that there is redundancy by comparing the two elements, even when one element is deleted and so the candidate number becomes 1, the motion vector having the value of (0, 0) is added as the element mvpListLX[1] in which the motion vector predictor index is 1 in step S306 which will be described later, and so the candidate number becomes 2. Since a merit obtained by deleting one element and adding the motion vector having the value of (0, 0) is considered to be small, the processing amount can be reduced by comparing mvpListLX[0] which is an element in which the motion vector predictor index is 0 only with mvpListLX[1] which is an element in which the motion vector predictor index is 1. Further, since the spatial motion vector predictor candidates mvpLXA and mvpLXB are likely to have the same motion information since the motion vector predictor candidates are derived from the prediction blocks of the same picture, but the temporal motion vector predictor candidate mvpLXCol is likely to have motion information different from the spatial motion vector predictor candidates mvpLXA and mvpLXB since the motion vector predictor candidate is derived from the prediction block of the different picture. Thus, even when a comparison with the temporal motion vector predictor candidate mvpLXCol is omitted, influence thereof is considered to be small. As described above, when the final candidate number is 2, the motion vector predictor candidate in which the motion vector predictor index is 0 is compared with the motion vector predictor candidate in which the motion vector predictor index is 1, and a comparison with the motion vector predictor candidate in which the motion vector predictor index is 2 is omitted, and thus the number of condition determination processes for deleting the redundant candidate can be reduced.

Figure 33:
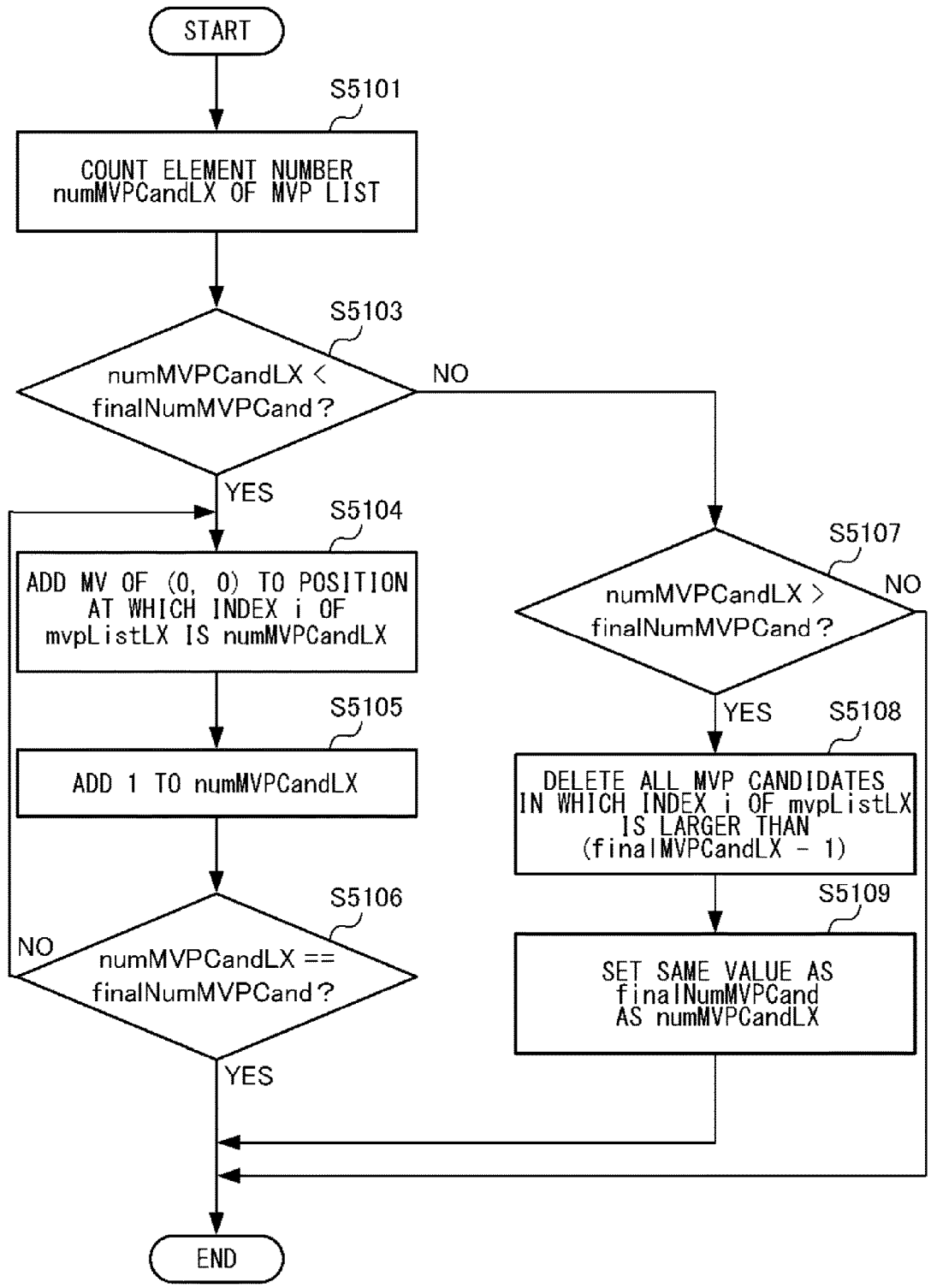
FIG. 33 is a flowchart illustrating a process procedure of limiting a motion vector predictor candidate number.

Next, a method of limiting the motion vector candidate number in the motion vector predictor list in S306 of FIG. 18 will be described in detail. FIG. 33 is a flowchart for describing a motion vector predictor candidate number limiting process procedure of S306 of FIG. 18.

The motion vector predictor candidate number limiting unit 124 and the motion vector predictor candidate number limiting unit 224 limit the motion vector predictor candidate number numMVPCandLX of LX added to the motion vector predictor list mvpListLX of LX to the specified final candidate number finalNumMVPCand.

First, the number of elements added to the motion vector predictor list mvpListLX of LX is counted, and set as the motion vector predictor candidate number numMVPCandLX of LX (S5101).

Then, when the motion vector predictor candidate number numMVPCandLX of LX is smaller than the final candidate number finalNumMVPCand (YES in S5103), the motion vector having the value of (0, 0) is added to the position at which the index of the motion vector predictor list mvpListLX of LX corresponds to numMVPCandLX (S5104), and 1 is added to numMVPCandLX (S5105). When numMVPCandLX and finalNumMVPCand have the same value (YES in S5106), the present limiting process ends, whereas when numMVPCandLX is different from finalNumMVPCand (NO in S5106), the process of steps S5104 and S5105 is repeated until numMVPCandLX is equal to finalNumMVPCand. In other words, MV having the value of (0, 0) is added until the motion vector predictor candidate number numMVPCandLX of LX reaches the final candidate number finalNumMVPCand. As MV having the value of (0, 0) is repeatedly added, the motion vector predictor can be decided although the motion vector predictor index has any value within a range which is larger than or equal to 0 and less than the final candidate number finalNumMVPCand.

Meanwhile, when the motion vector predictor candidate number numMVPCandLX of LX is larger than the final candidate number finalNumMVPCand (NO in S5103 and YES in S5107), all the motion vector predictor candidates in which the index i of the motion vector predictor list mvpListLX of LX is larger than (finalNumMVPCand−1) are deleted (S5108), and the same value as finalNumMVPCand is set as numMVPCandLX (S5109), and then the present limiting process ends.

When the motion vector predictor candidate number numMVPCandLX of LX is equal to the final candidate number finalNumMVPCand (NO in S5103 and NO in S5107), the preset limiting process ends without performing the limiting process.

In the present embodiment, the final candidate number finalNumMVPCand is specified according to the size of the prediction block. This is because when the motion vector predictor candidate number added to the motion vector predictor list varies according to the construction state of the motion vector predictor list, it is difficult to perform entropy decoding on the motion vector predictor index unless the decoding side constructs the motion vector predictor list. Further, when the entropy decoding depends on the construction state of the motion vector predictor list including the motion vector predictor candidate mvLXCol derived from a prediction block of a picture of a different time, there is a problem in that when an error occurs when a bitstream of another picture is decoded, it is difficult to normally continue entropy decoding on a bitstream of a current picture due to influence of the error. When a fixed number is specified as the final candidate number finalNumMVPCand according to the size of a prediction block, it is possible to perform entropy decoding on the motion vector predictor index independently of construction of the motion vector predictor list, and even when an error occurs when a bitstream of another picture is decoded, it is possible to normally continue entropy decoding on a bitstream of a current picture without influence of the error.

The bitstream of the moving picture output by the moving picture coding device according to the embodiment has a specific data format that can be decoded according to a coding method used in the embodiment, and the moving picture decoding device corresponding to the moving picture coding device can decode the bitstream having the specific data format.

When a wired or wireless network is used to exchange the bitstream between the moving picture coding device and the moving picture decoding device, the bitstream may be converted to have a data format appropriate for a transmission form of a communication path and then transmitted. In this case, a moving picture transmitting device that converts the bitstream output by the moving picture coding device into coding data having the data format appropriate for a transmission form of a transmission path and then transmits the coding data to the network and a moving picture receiving device that receives the coding data from the network, reconstructs the bitstream, and supplies the reconstructed bitstream to the moving picture decoding device are provided.

The moving picture transmitting device includes a memory that buffers the bitstream output by the moving picture coding device, a packet processing unit that packetizes the bitstream, and a transmitting unit that transmits the packetized coding data via the network. The moving picture receiving device includes a receiving unit that receives the packetized coding data via the network, a memory that buffers the received coding data, and a packet processing unit that performs packet processing on the coding data to construct the bitstream, and provides the constructed bitstream to the moving picture decoding device.

The process related to coding and decoding described above may be implemented as transmitting, accumulating, and receiving devices using hardware, and may be implemented by firmware stored in a read only memory (ROM), a flash memory, or the like or software of a computer or the like. A firmware program and a software program may be recorded in a computer readable recording medium and provided, may be provided from a server via a wired or wireless network, or may be provided as data broadcasting of digital terrestrial or satellite broadcasting.

The embodiment of the present invention has been described above. The embodiment is an example, and a person skilled in the art may find various modifications or changes on a combination of respective components or processing processes can be made and such modifications or changes fall within the scope of the invention.

[Item 1]

A moving picture coding device that codes a moving picture using a motion vector in units of blocks obtained by partitioning each picture, comprising:

a motion vector predictor candidate constructing unit that derives a plurality of motion vector predictor candidates from a motion vector of one of coded blocks neighboring a coding target block in a same picture as the coding target block and a motion vector of one of blocks of a coded picture different from the coding target block;

a motion vector predictor candidate adding unit that adds a motion vector predictor candidate satisfying a certain condition among the plurality of motion vector predictor candidates to a motion vector predictor candidate list;

a motion vector predictor candidate limiting unit that repeatedly adds a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2);

a motion vector predictor selecting unit that decides a motion vector predictor of the coding target block based on the motion vector predictor candidate list; and a coding unit that codes information representing a position of the decided motion vector predictor in the motion vector predictor candidate list.

[Item 2]

The moving picture coding device according to item 1, wherein the motion vector predictor candidate limiting unit deletes a motion vector predictor candidate exceeding the certain number from the motion vector predictor candidate list constructed by the motion vector predictor candidate adding unit.

[Item 3]

The moving picture coding device according to item 1 or 2, wherein the motion vector predictor candidate constructing unit derives first and second motion vector predictor candidates from the motion vector of one of the coded blocks neighboring the coding target block in the same picture as the coding target block, and derives a third motion vector predictor candidate from the motion vector of one of the blocks of the coded picture different from the coding target block, the motion vector predictor candidate adding unit adds the first to third motion vector predictor candidates satisfying a certain condition to the motion vector predictor candidate list, and the moving picture coding device further includes a motion vector predictor candidate redundancy determining unit that deletes the second motion vector predictor candidate from the motion vector predictor candidate list when the first and second motion vector predictor candidates added to the motion vector predictor candidate list by the motion vector predictor candidate adding unit have the same values.

[Item 4]

A moving picture coding device that codes a moving picture using a motion vector in units of blocks obtained by partitioning each picture, comprising:

a motion vector predictor candidate constructing unit that performs prediction based on a motion vector of one of coded blocks neighboring a coding target block in a same picture as the coding target block to construct a plurality of motion vector predictor candidates, and adds the plurality of motion vector predictor candidates to a motion vector predictor candidate list;

a motion vector predictor candidate number limiting unit that limits the number of the motion vector predictor candidates added to the motion vector predictor candidate list to a maximum candidate number according to a size of a prediction block;

a motion vector predictor selecting unit that decides a motion vector predictor of the coding target block based on the motion vector predictor candidate list; and a coding unit that codes information representing a position of the decided motion vector predictor in the motion vector predictor candidate list.

[Item 5]

A moving picture coding method of coding a moving picture using a motion vector in units of blocks obtained by partitioning each picture, comprising:

a motion vector predictor candidate constructing step of deriving a plurality of motion vector predictor candidates from a motion vector of one of coded blocks neighboring a coding target block in a same picture as the coding target block and a motion vector of one of blocks of a coded picture different from the coding target block;

a motion vector predictor candidate adding step of adding a motion vector predictor candidate satisfying a certain condition among the plurality of motion vector predictor candidates to a motion vector predictor candidate list;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2);

a motion vector predictor selecting step of deciding a motion vector predictor of the coding target block based on the motion vector predictor candidate list; and a coding step of coding information representing a position of the decided motion vector predictor in the motion vector predictor candidate list.

[Item 6]

A moving picture coding program of coding a moving picture using a motion vector in units of blocks obtained by partitioning each picture and causing a computer to execute:

a motion vector predictor candidate constructing step of deriving a plurality of motion vector predictor candidates from a motion vector of one of coded blocks neighboring a coding target block in a same picture as the coding target block and a motion vector of one of blocks of a coded picture different from the coding target block;

a motion vector predictor candidate adding step of adding a motion vector predictor candidate satisfying a certain condition among the plurality of motion vector predictor candidates to a motion vector predictor candidate list;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2);

a motion vector predictor selecting step of deciding a motion vector predictor of the coding target block based on the motion vector predictor candidate list; and a coding step of coding information representing a position of the decided motion vector predictor in the motion vector predictor candidate list.

[Item 7]

A transmitting device, comprising:

a packet processing unit that packetizes a bitstream coded by a moving picture coding method of coding a moving picture using a motion vector in units of blocks obtained by partitioning each picture and obtains coding data; and a transmitting unit that transmits the packetized coding data, wherein the moving picture coding method includes a motion vector predictor candidate constructing step of deriving a plurality of motion vector predictor candidates from a motion vector of one of coded blocks neighboring a coding target block in a same picture as the coding target block and a motion vector of one of blocks of a coded picture different from the coding target block, a motion vector predictor candidate adding step of adding a motion vector predictor candidate satisfying a certain condition among the plurality of motion vector predictor candidates to a motion vector predictor candidate list, a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), a motion vector predictor selecting step of deciding a motion vector predictor of the coding target block based on the motion vector predictor candidate list, and a coding step of coding information representing a position of the decided motion vector predictor in the motion vector predictor candidate list.

[Item 8]

The transmitting device according to item 7, wherein the motion vector predictor candidate limiting step includes deleting a motion vector predictor candidate exceeding the certain number from the motion vector predictor candidate list constructed by the motion vector predictor candidate adding step.

[Item 9]

The transmitting device according to item 7 or 8, wherein the motion vector predictor candidate constructing step includes deriving first and second motion vector predictor candidates from the motion vector of one of the coded blocks neighboring the coding target block in the same picture as the coding target block, and deriving a third motion vector predictor candidate from the motion vector of one of the blocks of the coded picture different from the coding target block, the motion vector predictor candidate adding step includes adding the first to third motion vector predictor candidates satisfying a certain condition to the motion vector predictor candidate list, and the moving picture coding method further includes a motion vector predictor candidate redundancy determining step of deleting the second motion vector predictor candidate from the motion vector predictor candidate list when the first and second motion vector predictor candidates added to the motion vector predictor candidate list by the motion vector predictor candidate adding step have the same values.

[Item 10]

A transmission method, comprising:

a packet processing step of packetizing a bitstream coded by a moving picture coding method of coding a moving picture using a motion vector in units of blocks obtained by partitioning each picture and obtaining coding data; and a transmitting step of transmitting the packetized coding data, wherein the moving picture coding method includes a motion vector predictor candidate constructing step of deriving a plurality of motion vector predictor candidates from a motion vector of one of coded blocks neighboring a coding target block in a same picture as the coding target block and a motion vector of one of blocks of a coded picture different from the coding target block, a motion vector predictor candidate adding step of adding a motion vector predictor candidate satisfying a certain condition among the plurality of motion vector predictor candidates to a motion vector predictor candidate list, a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), a motion vector predictor selecting step of deciding a motion vector predictor of the coding target block based on the motion vector predictor candidate list, and a coding step of coding information representing a position of the decided motion vector predictor in the motion vector predictor candidate list.

[Item 11]

A transmission program causing a computer to execute:

a packet processing step of packetizing a bitstream coded by a moving picture coding method of coding a moving picture using a motion vector in units of blocks obtained by partitioning each picture and obtaining coding data; and a transmitting step of transmitting the packetized coding data, wherein the moving picture coding method includes a motion vector predictor candidate constructing step of deriving a plurality of motion vector predictor candidates from a motion vector of one of coded blocks neighboring a coding target block in a same picture as the coding target block and a motion vector of one of blocks of a coded picture different from the coding target block, a motion vector predictor candidate adding step of adding a motion vector predictor candidate satisfying a certain condition among the plurality of motion vector predictor candidates to a motion vector predictor candidate list, a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2), a motion vector predictor selecting step of deciding a motion vector predictor of the coding target block based on the motion vector predictor candidate list, and a coding step of coding information representing a position of the decided motion vector predictor in the motion vector predictor candidate list.

[Item 12]

A moving picture decoding device that decodes a bitstream obtained by coding a moving picture using a motion vector in units of blocks obtained by partitioning each picture, comprising:

a decoding unit that decodes information representing a position of a motion vector predictor to be selected in a motion vector predictor candidate list;

a motion vector predictor candidate constructing unit that derives a plurality of motion vector predictor candidates from a motion vector of one of decoded blocks neighboring a decoding target block in a same picture as the decoding target block and a motion vector of one of blocks in a decoded picture different from the decoding target block;

a motion vector predictor candidate adding unit that adds a motion vector predictor candidate satisfying a certain condition among the plurality of motion vector predictor candidates to a motion vector predictor candidate list;

a motion vector predictor candidate limiting unit that repeatedly adds a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting unit that selects a motion vector predictor of the decoding target block from the motion vector predictor candidate list based on the decoded information representing the position of the motion vector predictor to be selected.

[Item 13]

The moving picture decoding device according to item 12, wherein the motion vector predictor candidate limiting unit deletes a motion vector predictor candidate exceeding a certain number from the motion vector predictor candidate list constructed by the motion vector predictor candidate adding unit.

[Item 14]

The moving picture decoding device according to item 12 or 13, wherein the motion vector predictor candidate constructing unit derives first and second motion vector predictor candidates from the motion vector of one of the decoded blocks neighboring the decoding target block in the same picture as the decoding target block, and derives a third motion vector predictor candidate from the motion vector of one of the blocks in the decoded picture different from the decoding target block, the motion vector predictor candidate adding unit adds the first to third motion vector predictor candidates satisfying a certain condition to the motion vector predictor candidate list, and the moving picture decoding device further includes a motion vector predictor candidate redundancy determining unit that deletes the second motion vector predictor candidate from the motion vector predictor candidate list when the first and second motion vector predictor candidates added to the motion vector predictor candidate list by the motion vector predictor candidate adding unit have the same values.

[Item 15]

A moving picture decoding device that decodes a bitstream obtained by coding a moving picture using a motion vector in units of blocks obtained by partitioning each picture, comprising:

a decoding unit that decodes information representing a position of a motion vector predictor to be selected in a motion vector predictor candidate list;

a motion vector predictor candidate constructing unit that performs prediction based on a motion vector of one of decoded blocks neighboring a decoding target block in a same picture as the decoding target block to construct a plurality of motion vector predictor candidates, and adds the plurality of motion vector predictor candidates to a motion vector predictor candidate list;

a motion vector predictor candidate number limiting unit that limits the number of the motion vector predictor candidates added to the motion vector predictor candidate list to a maximum candidate number according to a size of a prediction block; and a motion vector predictor selecting unit that selects a motion vector predictor of the decoding target block from the motion vector predictor candidate list based on the decoded information representing the position of the motion vector predictor to be selected in the motion vector predictor candidate list.

[Item 16]

A moving picture decoding method of decoding a bitstream obtained by coding a moving picture using a motion vector in units of blocks obtained by partitioning each picture, comprising:

a decoding step of decoding information representing a position of a motion vector predictor to be selected in a motion vector predictor candidate list;

a motion vector predictor candidate constructing step of deriving a plurality of motion vector predictor candidates from a motion vector of one of decoded blocks neighboring a decoding target block in a same picture as the decoding target block and a motion vector of one of blocks in a decoded picture different from the decoding target block;

a motion vector predictor candidate adding step of adding a motion vector predictor candidate satisfying a certain condition among the plurality of motion vector predictor candidates to a motion vector predictor candidate list;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting step of selecting a motion vector predictor of the decoding target block from the motion vector predictor candidate list based on the decoded information representing the position of the motion vector predictor to be selected.

[Item 17]

A moving picture decoding program of decoding a bitstream obtained by coding a moving picture using a motion vector in units of blocks obtained by partitioning each picture and causing a computer to execute:

a decoding step of decoding information representing a position of a motion vector predictor to be selected in a motion vector predictor candidate list;

a motion vector predictor candidate constructing step of deriving a plurality of motion vector predictor candidates from a motion vector of one of decoded blocks neighboring a decoding target block in a same picture as the decoding target block and a motion vector of one of blocks in a decoded picture different from the decoding target block;

a motion vector predictor candidate adding step of adding a motion vector predictor candidate satisfying a certain condition among the plurality of motion vector predictor candidates to a motion vector predictor candidate list;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting step of selecting a motion vector predictor of the decoding target block from the motion vector predictor candidate list based on the decoded information representing the position of the motion vector predictor to be selected.

[Item 18]

A receiving device that receives and decodes a bitstream obtained by coding a moving picture, comprising:

a receiving unit that receives coding data obtained by packetizing a bitstream obtained by coding a moving picture using a motion vector in units of blocks obtained by partitioning each picture;

a reconstructing unit that performs packet processing on the received coding data and reconstructs an original bitstream;

a decoding unit that decodes information representing a position of a motion vector predictor to be selected in a motion vector predictor candidate list from the reconstructed bitstream;

a motion vector predictor candidate constructing unit that derives a plurality of motion vector predictor candidates from a motion vector of one of decoded blocks neighboring a decoding target block in a same picture as the decoding target block and a motion vector of one of blocks in a decoded picture different from the decoding target block;

a motion vector predictor candidate adding unit that adds a motion vector predictor candidate satisfying a certain condition among the plurality of motion vector predictor candidates to a motion vector predictor candidate list;

a motion vector predictor candidate limiting unit that repeatedly adds a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting unit that selects a motion vector predictor of the decoding target block from the motion vector predictor candidate list based on the decoded information representing the position of the motion vector predictor to be selected.

[Item 19]

The receiving device according to item 18, wherein the motion vector predictor candidate limiting unit deletes a motion vector predictor candidate exceeding a certain number from the motion vector predictor candidate list constructed by the motion vector predictor candidate adding unit.

[Item 20]

The receiving device according to item 18 or 19, wherein the motion vector predictor candidate constructing unit derives first and second motion vector predictor candidates from the motion vector of one of the decoded blocks neighboring the decoding target block in the same picture as the decoding target block, and derives a third motion vector predictor candidate from the motion vector of one of the blocks in the decoded picture different from the decoding target block, the motion vector predictor candidate adding unit adds the first to third motion vector predictor candidates satisfying a certain condition to the motion vector predictor candidate list, and the receiving device further includes a motion vector predictor candidate redundancy determining unit that deletes the second motion vector predictor candidate from the motion vector predictor candidate list when the first and second motion vector predictor candidates added to the motion vector predictor candidate list by the motion vector predictor candidate adding unit have the same values.

[Item 21]

A reception method of receiving and decoding a bitstream obtained by coding a moving picture, comprising:

a receiving step of receiving coding data obtained by packetizing a bitstream obtained by coding a moving picture using a motion vector in units of blocks obtained by partitioning each picture;

a reconstructing step of performing packet processing on the received coding data and reconstructing an original bitstream;

a decoding step of decoding information representing a position of a motion vector predictor to be selected in a motion vector predictor candidate list from the reconstructed bitstream;

a motion vector predictor candidate constructing step of deriving a plurality of motion vector predictor candidates from a motion vector of one of decoded blocks neighboring a decoding target block in a same picture as the decoding target block and a motion vector of one of blocks in a decoded picture different from the decoding target block;

a motion vector predictor candidate adding step of adding a motion vector predictor candidate satisfying a certain condition among the plurality of motion vector predictor candidates to a motion vector predictor candidate list;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting step of selecting a motion vector predictor of the decoding target block from the motion vector predictor candidate list based on the decoded information representing the position of the motion vector predictor to be selected.

[Item 22]

A reception program of receiving and decoding a bitstream obtained by coding a moving picture and causing a computer to execute:

a receiving step of receiving coding data obtained by packetizing a bitstream obtained by coding a moving picture using a motion vector in units of blocks obtained by partitioning each picture;

a reconstructing step of performing packet processing on the received coding data and reconstructing an original bitstream;

a decoding step of decoding information representing a position of a motion vector predictor to be selected in a motion vector predictor candidate list from the reconstructed bitstream;

a motion vector predictor candidate constructing step of deriving a plurality of motion vector predictor candidates from a motion vector of one of decoded blocks neighboring a decoding target block in a same picture as the decoding target block and a motion vector of one of blocks in a decoded picture different from the decoding target block;

a motion vector predictor candidate adding step of adding a motion vector predictor candidate satisfying a certain condition among the plurality of motion vector predictor candidates to a motion vector predictor candidate list;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2);

a motion vector predictor selecting step of selecting a motion vector predictor of the decoding target block from the motion vector predictor candidate list based on the decoded information representing the position of the motion vector predictor to be selected.

[Item 23]

A moving picture decoding device that decodes a bitstream obtained by coding a moving picture using a motion vector in units of blocks obtained by partitioning each picture, comprising:

a decoding unit that decodes information representing a position of a motion vector predictor to be selected in a motion vector predictor candidate list;

a motion vector predictor candidate constructing unit that derives first and second motion vector predictor candidates from a motion vector of one of decoded blocks neighboring a decoding target block in a same picture as the decoding target block, and derives a third motion vector predictor candidate from a motion vector of one of blocks of a decoded picture different from the decoding target block;

a motion vector predictor candidate adding unit that adds the first to third motion vector predictor candidates satisfying a certain condition to a motion vector predictor candidate list;

a motion vector predictor candidate redundancy determining unit that deletes the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting unit that repeatedly adds a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting unit that selects a motion vector predictor of the decoding target block from the motion vector predictor candidate list based on the decoded information representing the position of the motion vector predictor to be selected.

[Item 24]

The moving picture decoding device according to item 23, wherein the motion vector predictor candidate limiting unit deletes a motion vector predictor candidate exceeding a certain number from the motion vector predictor candidate list constructed by the motion vector predictor candidate adding unit.

[Item 25]

A moving picture decoding method of decoding a bitstream obtained by coding a moving picture using a motion vector in units of blocks obtained by partitioning each picture, comprising:

a decoding step of decoding information representing a position of a motion vector predictor to be selected in a motion vector predictor candidate list;

a motion vector predictor candidate constructing step of deriving first and second motion vector predictor candidates from a motion vector of one of decoded blocks neighboring a decoding target block in a same picture as the decoding target block, and deriving a third motion vector predictor candidate from a motion vector of one of blocks of a decoded picture different from the decoding target block;

a motion vector predictor candidate adding step of adding the first to third motion vector predictor candidates satisfying a certain condition among the plurality of motion vector predictor candidates to a motion vector predictor candidate list;

a motion vector predictor candidate redundancy determining step of deleting the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting step of selecting a motion vector predictor of the decoding target block from the motion vector predictor candidate list based on the decoded information representing the position of the motion vector predictor to be selected.

[Item 26]

A moving picture decoding program of decoding a bitstream obtained by coding a moving picture using a motion vector in units of blocks obtained by partitioning each picture and causing a computer to execute:

a decoding step of decoding information representing a position of a motion vector predictor to be selected in a motion vector predictor candidate list;

a motion vector predictor candidate constructing step of deriving first and second motion vector predictor candidates from a motion vector of one of decoded blocks neighboring a decoding target block in a same picture as the decoding target block, and deriving a third motion vector predictor candidate from a motion vector of one of blocks of a decoded picture different from the decoding target block;

a motion vector predictor candidate adding step of adding the first to third motion vector predictor candidates satisfying a certain condition among the plurality of motion vector predictor candidates to a motion vector predictor candidate list;

a motion vector predictor candidate redundancy determining step of deleting the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting step of selecting a motion vector predictor of the decoding target block from the motion vector predictor candidate list based on the decoded information representing the position of the motion vector predictor to be selected.

[Item 27]

A receiving device that receives and decodes a bitstream obtained by coding a moving picture, comprising:

a receiving unit that receives coding data obtained by packetizing a bitstream obtained by coding a moving picture using a motion vector in units of blocks obtained by partitioning each picture;

a reconstructing unit that performs packet processing on the received coding data and reconstructs an original bitstream;

a decoding unit that decodes information representing a position of a motion vector predictor to be selected in a motion vector predictor candidate list from the reconstructed bitstream;

a motion vector predictor candidate constructing unit that derives first and second motion vector predictor candidates from a motion vector of one of decoded blocks neighboring a decoding target block in a same picture as the decoding target block, and derives a third motion vector predictor candidate from a motion vector of one of blocks of a decoded picture different from the decoding target block;

a motion vector predictor candidate adding unit that adds the first to third motion vector predictor candidates satisfying a certain condition to a motion vector predictor candidate list;

a motion vector predictor candidate redundancy determining unit that deletes the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting unit that repeatedly adds a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting unit that selects a motion vector predictor of the decoding target block from the motion vector predictor candidate list based on the decoded information representing the position of the motion vector predictor to be selected.

[Item 28]

The receiving device according to item 27, wherein the motion vector predictor candidate limiting unit deletes a motion vector predictor candidate exceeding a certain number from the motion vector predictor candidate list constructed by the motion vector predictor candidate adding unit.

[Item 29]

A reception method of receiving and decoding a bitstream obtained by coding a moving picture, comprising:

a receiving step of receiving coding data obtained by packetizing a bitstream obtained by coding a moving picture using a motion vector in units of blocks obtained by partitioning each picture;

a reconstructing step of performing packet processing on the received coding data and reconstructing an original bitstream;

a decoding step of decoding information representing a position of a motion vector predictor to be selected in a motion vector predictor candidate list from the reconstructed bitstream;

a motion vector predictor candidate constructing step of deriving first and second motion vector predictor candidates from a motion vector of one of decoded blocks neighboring a decoding target block in a same picture as the decoding target block, and deriving a third motion vector predictor candidate from a motion vector of one of blocks of a decoded picture different from the decoding target block;

a motion vector predictor candidate adding step of adding the first to third motion vector predictor candidates satisfying a certain condition among the plurality of motion vector predictor candidates to a motion vector predictor candidate list;

a motion vector predictor candidate redundancy determining step of deleting the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting step of selecting a motion vector predictor of the decoding target block from the motion vector predictor candidate list based on the decoded information representing the position of the motion vector predictor to be selected.

[Item 30]

A reception program of receiving and decoding a bitstream obtained by coding a moving picture and causing a computer to execute:

a receiving step of receiving coding data obtained by packetizing a bitstream obtained by coding a moving picture using a motion vector in units of blocks obtained by partitioning each picture;

a reconstructing step of performing packet processing on the received coding data and reconstructing an original bitstream;

a decoding step of decoding information representing a position of a motion vector predictor to be selected in a motion vector predictor candidate list from the reconstructed bitstream;

a motion vector predictor candidate constructing step of deriving first and second motion vector predictor candidates from a motion vector of one of decoded blocks neighboring a decoding target block in a same picture as the decoding target block, and deriving a third motion vector predictor candidate from a motion vector of one of blocks of a decoded picture different from the decoding target block;

a motion vector predictor candidate adding step of adding the first to third motion vector predictor candidates satisfying a certain condition among the plurality of motion vector predictor candidates to a motion vector predictor candidate list;

a motion vector predictor candidate redundancy determining step of deleting the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting step of selecting a motion vector predictor of the decoding target block from the motion vector predictor candidate list based on the decoded information representing the position of the motion vector predictor to be selected.

What is claimed is:

1. A moving picture decoding device that decodes a bitstream obtained by coding a moving picture using a motion vector in units of blocks obtained by partitioning each picture, comprising:

a decoding unit that decodes information representing a motion vector predictor index to be selected in a motion vector predictor candidate list;

a motion vector predictor candidate constructing unit that derives first and second motion vector predictor candidates from a motion vector of one of decoded blocks neighboring a decoding target block in a same picture as the decoding target block, and derives a third motion vector predictor candidate from a motion vector of one of blocks of a decoded picture different from the decoding target block;

a motion vector predictor candidate adding unit that adds the first to third motion vector predictor candidates satisfying a certain condition to a motion vector predictor candidate list;

a redundant motion vector predictor candidate determining unit that deletes the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting unit that repeatedly adds a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting unit that selects a motion vector predictor of the decoding target block from the motion vector predictor candidate list based on the decoded information representing the motion vector predictor index to be selected.

2. A moving picture decoding method of decoding a bitstream obtained by coding a moving picture using a motion vector in units of blocks obtained by partitioning each picture, comprising:

a decoding step of decoding information representing a motion vector predictor index to be selected in a motion vector predictor candidate list;

a motion vector predictor candidate constructing step of deriving first and second motion vector predictor candidates from a motion vector of one of decoded blocks neighboring a decoding target block in a same picture as the decoding target block, and deriving a third motion vector predictor candidate from a motion vector of one of blocks of a decoded picture different from the decoding target block;

a motion vector predictor candidate adding step of adding the first to third motion vector predictor candidates satisfying a certain condition among the plurality of motion vector predictor candidates to a motion vector predictor candidate list;

a redundant motion vector predictor candidate determining step of deleting the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting step of selecting a motion vector predictor of the decoding target block from the motion vector predictor candidate list based on the decoded information representing the motion vector predictor index to be selected.

3. A non-transitory computer readable medium storing a moving picture decoding program of decoding a bitstream obtained by coding a moving picture using a motion vector in units of blocks obtained by partitioning each picture, the moving picture decoding program causing a computer to execute:

a decoding step of decoding information representing a motion vector predictor index to be selected in a motion vector predictor candidate list;

a motion vector predictor candidate constructing step of deriving first and second motion vector predictor candidates from a motion vector of one of decoded blocks neighboring a decoding target block in a same picture as the decoding target block, and deriving a third motion vector predictor candidate from a motion vector of one of blocks of a decoded picture different from the decoding target block;

a motion vector predictor candidate adding step of adding the first to third motion vector predictor candidates satisfying a certain condition among the plurality of motion vector predictor candidates to a motion vector predictor candidate list;

a redundant motion vector predictor candidate determining step of deleting the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting step of selecting a motion vector predictor of the decoding target block from the motion vector predictor candidate list based on the decoded information representing the motion vector predictor index to be selected.

4. A receiving device that receives and decodes a bitstream obtained by coding a moving picture, comprising:

a receiving unit that receives coding data obtained by packetizing a bitstream obtained by coding a moving picture using a motion vector in units of blocks obtained by partitioning each picture;

a reconstructing unit that performs packet processing on the received coding data and reconstructs an original bitstream;

a decoding unit that decodes information representing a motion vector predictor index to be selected in a motion vector predictor candidate list from the reconstructed bitstream;

a motion vector predictor candidate constructing unit that derives first and second motion vector predictor candidates from a motion vector of one of decoded blocks neighboring a decoding target block in a same picture as the decoding target block, and derives a third motion vector predictor candidate from a motion vector of one of blocks of a decoded picture different from the decoding target block;

a motion vector predictor candidate adding unit that adds the first to third motion vector predictor candidates satisfying a certain condition to a motion vector predictor candidate list;

a redundant motion vector predictor candidate determining unit that deletes the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting unit that repeatedly adds a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting unit that selects a motion vector predictor of the decoding target block from the motion vector predictor candidate list based on the decoded information representing the motion vector predictor index to be selected.

5. A receiving method that receives and decodes a bitstream obtained by coding a moving picture, comprising:

a receiving step of receiving coding data obtained by packetizing a bitstream obtained by coding a moving picture using a motion vector in units of blocks obtained by partitioning each picture;

a reconstructing step of performing packet processing on the received coding data and reconstructs an original bitstream;

a decoding step of decoding information representing a motion vector predictor index to be selected in a motion vector predictor candidate list from the reconstructed bitstream;

a motion vector predictor candidate constructing step of deriving first and second motion vector predictor candidates from a motion vector of one of decoded blocks neighboring a decoding target block in a same picture as the decoding target block, and derives a third motion vector predictor candidate from a motion vector of one of blocks of a decoded picture different from the decoding target block;

a motion vector predictor candidate adding step of adding the first to third motion vector predictor candidates satisfying a certain condition to a motion vector predictor candidate list;

a redundant motion vector predictor candidate determining step of deleting the second motion vector predictor candidate from the motion vector predictor candidate list when the first and second motion vector predictor candidates added to the motion vector predictor candidate list by the motion vector predictor candidate adding unit have the same values;

a motion vector predictor candidate limiting step of repeatedly adding a motion vector predictor candidate having a same value to the motion vector predictor candidate list until the number of motion vector predictor candidates reaches a certain number when the number of the motion vector predictor candidates added to the motion vector predictor candidate list is smaller than the certain number (a natural number larger than or equal to 2); and a motion vector predictor selecting step of selecting a motion vector predictor of the decoding target block from the motion vector predictor candidate list based on the decoded information representing the motion vector predictor index to be selected.

* * * * *